US011748763B2

(12) United States Patent
Cartwright et al.

(10) Patent No.: US 11,748,763 B2
(45) Date of Patent: Sep. 5, 2023

(54) SYSTEMS, METHODS, APPARATUSES AND COMPUTER PROGRAM PRODUCTS FOR MANAGING AND SYNCHRONIZING INDEPENDENT COMPUTING RESOURCES

(71) Applicant: Assurant, Inc., New York, NY (US)

(72) Inventors: Charles Daniel Cartwright, Dunwoody, GA (US); Piyush Gupta, Marietta, GA (US); Gilberto Jose Almonte, Jr., Palmetto Bay, FL (US)

(73) Assignee: Assurant, Inc., New York, NY (US)

( * ) Notice: Subject to any disclaimer, the term of this patent is extended or adjusted under 35 U.S.C. 154(b) by 152 days.

(21) Appl. No.: 17/085,752

(22) Filed: Oct. 30, 2020

(65) Prior Publication Data

US 2021/0133761 A1    May 6, 2021

Related U.S. Application Data

(60) Provisional application No. 62/928,428, filed on Oct. 31, 2019.

(51) Int. Cl.
*G06Q 30/00* (2023.01)
*G06F 16/27* (2019.01)
(Continued)

(52) U.S. Cl.
CPC ......... *G06Q 30/012* (2013.01); *G06F 9/546* (2013.01); *G06F 16/27* (2019.01); *G06Q 20/127* (2013.01);
(Continued)

(58) Field of Classification Search
CPC .............. G06Q 30/012; G06Q 20/127; G06Q 30/0185; G06Q 10/10; G06Q 40/08;
(Continued)

(56) References Cited

U.S. PATENT DOCUMENTS 5,276,876 A * 1/1994 Coleman ................ G06F 9/466
718/104
5,758,083 A * 5/1998 Singh .................... H04L 41/042
370/254
(Continued)

FOREIGN PATENT DOCUMENTS

CN        1187729 A  *  7/1998  .......... H04M 1/6505
CN     104267375 A  *  1/2015  ............... G01S 5/14
(Continued)

OTHER PUBLICATIONS

Antonio Scarfo, "New Security Perspective Around BYOD", 2012, 2012 Seventh Interational Conference on Broadband, Wireless Computing, Communications and Applications, pp. 446-451. (Year: 2012).*
(Continued)

*Primary Examiner* — Tan D Nguyen
(74) *Attorney, Agent, or Firm* — Alston & Bird LLP

(57) ABSTRACT

Various embodiments of the present disclosure are directed to improved systems, apparatuses, methods, and computer program products for managing and synchronizing independent computing resources. In this regard, embodiments may manage and/or synchronize computing resources, data, and the like between the embodiments and various independent third-party systems, while handling transmission errors that occur during synchronization. In an example context, embodiments manage synchronization of subscriber profiles between the various systems. Some embodiments manage computing resources for processing one or more unprocessed actions of various types, for example by scaling executed process instances based on an action queue length and a queue length minimum threshold and/or queue length maximum threshold.

20 Claims, 12 Drawing Sheets

(51) Int. Cl.

| | |
|---|---|
| *G06F 9/54* | (2006.01) |
| *G06Q 20/12* | (2012.01) |
| *H04L 67/1095* | (2022.01) |
| *H04L 67/306* | (2022.01) |
| *H04L 67/53* | (2022.01) |
| *G06Q 10/10* | (2023.01) |
| *G06Q 40/08* | (2012.01) |
| *G06Q 30/012* | (2023.01) |
| *G06Q 30/018* | (2023.01) |

(52) U.S. Cl.
CPC ..... *G06Q 30/0185* (2013.01); *H04L 67/1095* (2013.01); *H04L 67/306* (2013.01); *H04L 67/53* (2022.05); *G06Q 10/10* (2013.01); *G06Q 40/08* (2013.01)

(58) Field of Classification Search
CPC ..... G06F 9/546; G06F 16/27; H04L 67/1095; H04L 67/306; H04L 67/53; H04L 67/567
See application file for complete search history.

(56) References Cited

U.S. PATENT DOCUMENTS

| | | | |
|---|---|---|---|
| 6,438,563 B1 | 8/2002 | Kawagoe | |
| 2003/0120614 A1* | 6/2003 | Shumpert | G06Q 20/3821 705/76 |
| 2007/0119923 A1* | 5/2007 | Garrison | G06Q 20/4014 235/380 |
| 2010/0268557 A1 | 10/2010 | Faith et al. | |
| 2012/0252403 A1 | 10/2012 | Becerra et al. | |
| 2015/0046989 A1* | 2/2015 | Oberheide | G06F 21/31 726/6 |
| 2016/0065417 A1* | 3/2016 | Sapuram | H04L 41/50 709/223 |
| 2020/0322800 A1* | 10/2020 | Ozanian | G06N 3/04 |

FOREIGN PATENT DOCUMENTS

| | | | | |
|---|---|---|---|---|
| CN | 105592482 A | * | 5/2016 | |
| EP | 2187610 A1 | | 5/2010 | |
| EP | 2741217 A1 | * | 6/2014 | ............ G06F 16/27 |
| JP | 2000-163344 A | | 6/2000 | |
| JP | 2014-517946 A | | 7/2014 | |
| WO | WO-0109795 A1 | * | 2/2001 | ............ G07B 15/00 |
| WO | WO-2005013099 A2 | * | 2/2005 | ............ G10L 15/22 |
| WO | WO-2005107417 A2 | * | 11/2005 | ............... G06F 8/65 |
| WO | WO-2006082310 A1 | * | 8/2006 | ........... G06Q 20/388 |
| WO | WO-2015036783 A1 | * | 3/2015 | ......... G06F 13/1689 |

OTHER PUBLICATIONS

William Lumpkins, "The Internet of Things Meets Cloud Computing", Apr. 2013, IEEE Consumer Electronics Magazine, pp. 47-51. (Year: 2013).*

Luong Nguyen, "Optimal Auction For Edge Computing Resource Management in Mobile Blockchain Networks: A Deep Learning Approach", 2018, iEEE, pp. 1-6. (Year: 2018).*

Farzad Shafiei, "Multi-Enterprise Collaborative Enterprise Resource Planning and Decision Support Systems", 2004, Proceedings of the 37th Hawaii International Conference on System Sciences, pp. 1-10. (Year: 2004).*

Muhammad Shiraz, "A Review on Distributed Application Processing Frameworks in Smart Mobile Devices for Mobile Cloud Computing," 2013, IEEE Communications Surveys & Tutorials, vol. 15, No. 3, pp. 1294-1313. (Year: 2013).*

EPO, Extended European Search Report for EP No. 20204906.0 dated Mar. 24, 2021, Mar. 24, 2021.

Disclosed Anonymously, iP.com—Systems, Method, Apparatus, and Computer Program Product for Insurance and Replacement of a Mobile Device, May 8, 2013.

Extended European Search Report for EP Application No. 22191393.2 dated Oct. 27, 2022 (6 pages).

Decision to grant a European patent received for European Application No. 20204906.0, dated Jul. 28, 2022, 2 pages.

Communication about intention to grant a European patent received for European Application No. 20204906.0, dated Mar. 28, 2022, 6 pages.

* cited by examiner

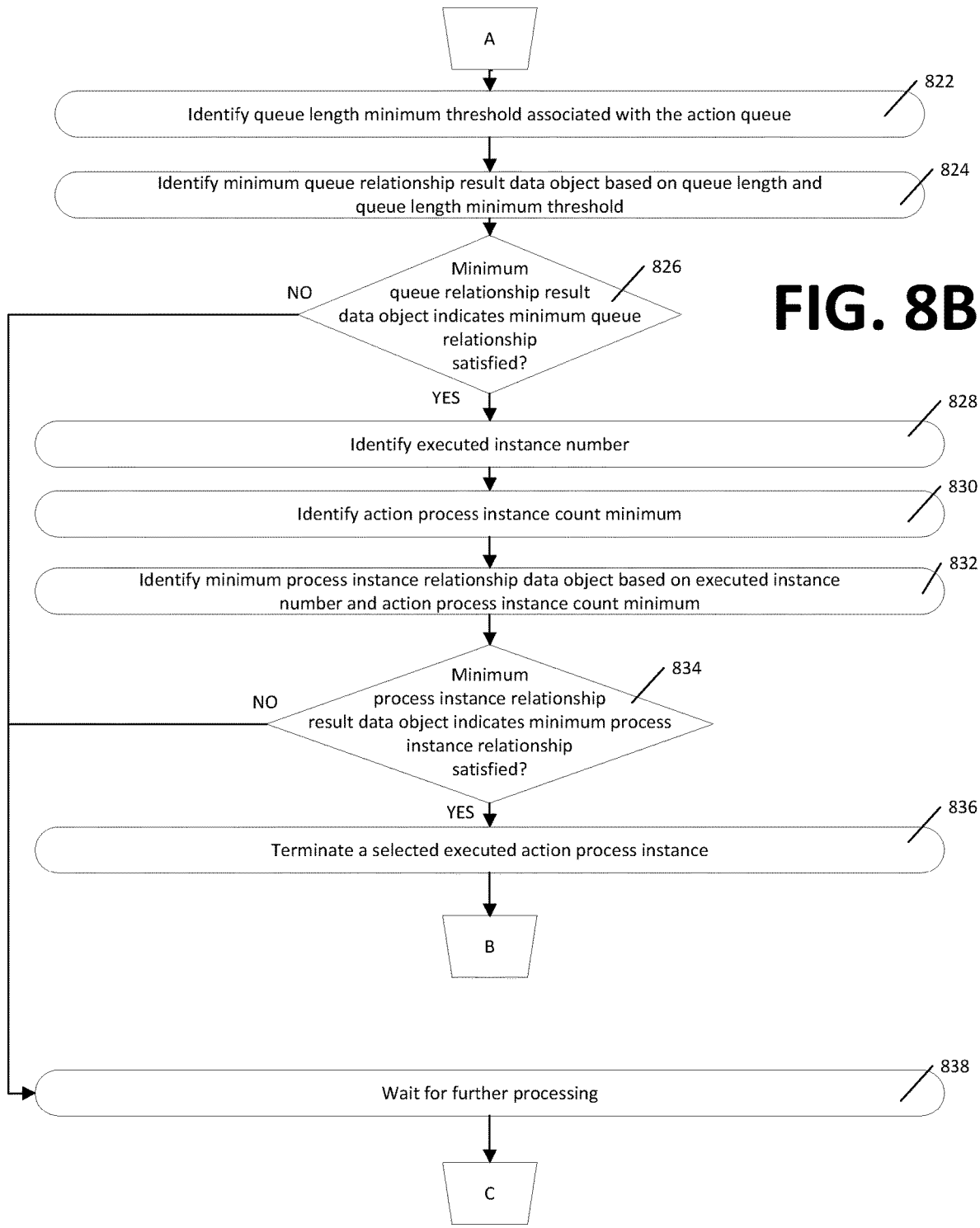

SYSTEMS, METHODS, APPARATUSES AND COMPUTER PROGRAM PRODUCTS FOR MANAGING AND SYNCHRONIZING INDEPENDENT COMPUTING RESOURCES

CROSS-REFERENCE TO RELATED APPLICATIONS

This application claims the benefit of U.S. Provisional Application No. 62/928,428, filed Oct. 31, 2019, the contents of which are incorporated herein by reference in their entirety.

TECHNOLOGICAL FIELD

The present disclosure relates, generally, to systems, methods, and apparatuses for device protection program management, and more specifically, to the operation of independent computing systems in parallel while reducing synchronization errors and computational inefficiency.

BACKGROUND

Various computing systems, such as those associated with device protection program management, must allow convenient access to subscribers and operate efficiently, while communicating and synchronizing bulk data with one or more third-party computing systems. Additionally, communication errors received in response to failed transmissions between various systems can cause systems to terminate, or otherwise fail to function efficiently. Applicant has identified a number of deficiencies and problems associated with such systems. Solutions including embodiments of the present disclosure solve many of these identified problems, many examples of which are described in detail herein.

BRIEF SUMMARY

In general, embodiments of the present disclosure provided herein include systems, methods, apparatuses, and computer program products for managing and synchronizing independent computing resources. Further, at least some embodiments are provided for processing actions for managing and synchronizing independent computing resources in a robust and/or efficient manner. Other systems, apparatuses, methods, and computer program products, and similar features, will be, or will become, apparent to one with skill in the art upon examination of the following figures and detailed description. It is intended that all such additional systems, apparatuses, methods, computer program products, and features be included within this description, be within the scope of this disclosure, and be protected by the following claims.

In accordance with one aspect of the present disclosure, a first example system to detect a network communication synchronization error is provided. In at least one example embodiment, the first example system includes at least one processor and at least one memory, the at least one memory comprising computer coded instructions therein. The computer coded instructions are configured to, when executed by the at least one processor, cause the first example system to receive an enrollment management request comprising subscriber data object indicative of a device protection program and comprising a subscriber identifier data object. The first example system is further configured to transmit a third-party enrollment status request data object to a third-party device management system, the third-party enrollment status request data object associated with the subscriber identifier data object. The first example system is further configured to receive a third-party enrollment status response data object from the third-party device management system, the third-party enrollment status response data object comprising third-party enrollment status data object. The first example system is further configured to compare the third-party enrollment status response data object data with a second enrollment status data object in the system. The first example system is further configured to detect a network communication synchronization error based on a difference between the third-party enrollment status data object and an enrollment status in the device protection program management system. The first example system is further configured to initiate a system synchronization event based on the network communication synchronization error.

Additionally or alternatively, in some example embodiments of the first example system, the enrollment management request data object comprises an enrollment subscription request or an enrollment cancellation request data object, and, to cause the system to initiate the system synchronization event, the system is configured to identify a DPPMS subscriber profile data object based on the subscriber identifier data object; and update the DPPMS subscriber profile data object based on the third-party enrollment status response data object.

Additionally or alternatively, in some example embodiments of the first example system, the system is configured to compare the third-party enrollment status data object with the second enrollment status data object in real-time.

Additionally or alternatively, in some example embodiments of the first example system, the enrollment management request data object comprises an enrollment subscription request, the identified third-party enrollment status is indicative that the third-party device management system does not include a third-party subscriber profile data object associated with the subscriber identifier data object, and, to cause the system to initiate the system synchronization event, the system is configured to transmit, to the third-party device management system, a third-party subscriber enrollment request data object configured to cause the third-party device management system to create the third-party subscriber profile data object associated with the subscriber identifier data object.

Additionally or alternatively, in some example embodiments of the first example system, the enrollment management request data object comprises an enrollment cancellation request data object, the identified third-party enrollment status is indicative that the third-party device management system includes a third-party subscriber profile data object associated with the subscriber identifier data object, and, to initiate the system synchronization event, the system is configured to transmit, to the third-party device management system, a third-party subscriber cancellation request data object configured to cause the third-party device management system to cancel the third-party subscriber profile data object associated with the subscriber identifier data object.

Additionally or alternatively, in some example embodiments of the first example system, the system is further configured to attempt to transmit a third-party enrollment management request data object to the third-party device management system; receive a transmission error in response to the attempt to transmit the third-party enrollment management request data object to the third-party device management system indicative of an error in communicating with the third-party device management system; identify an error classification associated with the transmission error, wherein the error classification comprises a retriable error; determine a request retry time; transmit a second third-party enrollment status request data object to the third-party device management system after the request retry time has elapsed; receive a second third-party enrollment status response data object from the third-party device management system; analyze, in real time, the second third-party enrollment status response data object to identify a second third-party enrollment status associated with the subscriber identifier data object; and initiate a second system synchronization event based on the second identified third-party enrollment status data object.

Additionally or alternatively, in some example embodiments of the first example system, the third-party device management system comprises a second third-party device management system, and the system is configured to receive the enrollment management request from a first third-party device management system.

Additionally or alternatively, in some example embodiments of the first example system, the system is further configured to identify the third-party device management system based on the subscriber identifier data object.

Additionally or alternatively, in some example embodiments of the first example system, the system further configured to receive a queue length associated with an action queue, the action queue comprising at least the third-party enrollment status request; identify a queue length threshold; identify a queue relationship based on the queue length and the queue length threshold; determine the queue relationship satisfies the queue length threshold; identify an executed action process instance set comprising at least one executed action process instance; and update the executed action process instance set based on the queue length.

In accordance with another aspect of the present disclosure, a first example computer-implemented method to detect a network communication synchronization error is provided. The computer-implemented method includes operations to be performed by computing hardware, software, firmware, and/or a combination thereof, as described herein. In at least one example embodiment, the first example computer-implemented method includes receiving an enrollment management request comprising subscriber data object indicative of a device protection program and comprising a subscriber identifier data object. The first example computer-implemented method further includes transmitting a third-party enrollment status request data object to a third-party device management system, the third-party enrollment status request data object associated with the subscriber identifier data object. The first example computer-implemented method further includes receiving a third-party enrollment status response data object from the third-party device management system, the third-party enrollment status response data object comprising third-party enrollment status data object. The first example computer-implemented method further includes comparing the third-party enrollment status response data object data with a second enrollment status data object in the system. The first example computer-implemented method further includes detecting a network communication synchronization error based on a difference between the third-party enrollment status data object and an enrollment status in the device protection program management system. The first example computer-implemented method further includes initiating a system synchronization event based on the network communication synchronization error.

Additionally or alternatively, in some example embodiments of the first example computer-implemented method, the enrollment management request data object comprises an enrollment subscription request or an enrollment cancellation request data object, and initiating a system synchronization event comprises identifying a DPPMS subscriber profile data object based on the subscriber identifier data object; and updating the DPPMS subscriber profile data object based on the third-party enrollment status response data object.

Additionally or alternatively, in some example embodiments of the first example computer-implemented method, comparing the third-party enrollment status data object with the second enrollment status data object is performed in real-time.

Performing this comparison in real-time is particularly advantageous in that it contributes to reduce the workload and usage of the communication network resources, in comparison to a conventional scenario, wherein batches of enrollments requests are performed simultaneously at a particular time, for instance once a week. Similarly, avoiding processing of actions (e.g., enrollment requests and/or claims associated with a device protection program) in circumstances where the real-time enrollment status does not support such processing contributes to reduce the workload and usage of computing resources, which can be significant in circumstances where batches of requests are received simultaneously and/or circumstances where processing such actions requires utilization of significant computing resources across one or more sub-systems.

In this context, the expression "real-time" should be interpreted as being equivalent to "on-demand", i.e. upon request, more particularly upon receiving the enrollment management request data object, for instance whenever a claim pertaining to a device protection program is issued by a subscriber's device.

Performing this comparison on-demand enables to identify in real-time, whether the enrollment status data on the third-party management system coincides with the enrollment status data stored on the device protection program management system (DPPMS), i.e. whether the DPPMS is synchronized with the third-party management system, so that the synchronization event can be initiated in case these data do not coincide, before using the data for instance to process a claim. Ensuring that there is no synchronization error before using the enrollment status data of a subscriber, for instance before handling a claim, contributes to make the status data consistent amongst several servers on the communication network and thus improves the reliability of the device protection program.

Additionally or alternatively, in some example embodiments of the first example computer-implemented method, the enrollment management request data object comprises an enrollment subscription request, the identified third-party enrollment status is indicative that the third-party device management system does not include a third-party subscriber profile data object associated with the subscriber identifier data object, and initiating the system synchronization event comprises transmitting, to the third-party device management system, a third-party subscriber enrollment request data object configured to cause the third-party device management system to create the third-party subscriber profile data object associated with the subscriber identifier data object.

Additionally or alternatively, in some example embodiments of the first example computer-implemented method, the enrollment management request data object comprises an enrollment cancellation request data object, and the identified third-party enrollment status is indicative that the third-party device management system includes a third-party subscriber profile data object associated with the subscriber identifier data object, and initiating the system synchronization event comprises transmitting, to the third-party device management system, a third-party subscriber cancellation request data object configured to cause the third-party device management system to cancel the third-party subscriber profile data object associated with the subscriber identifier data object.

Additionally or alternatively, in some example embodiments of the first example computer-implemented method, the computer-implemented method further comprising attempting to transmit a third-party enrollment management request data object to the third-party device management system; receiving a transmission error in response to the attempt to transmit the third-party enrollment management request data object to the third-party device management system indicative of an error in communicating with the third-party device management system; identifying an error classification associated with the transmission error, wherein the error classification comprises a retriable error; determining a request retry time; transmitting a second third-party enrollment status request data object to the third-party device management system after the request retry time has elapsed; receiving a second third-party enrollment status response data object from the third-party device management system; analyzing, in real time, the second third-party enrollment status response data object to identify a second third-party enrollment status associated with the subscriber identifier data object; and initiating a second system synchronization event based on the second identified third-party enrollment status data object.

Additionally or alternatively, in some example embodiments of the first example computer-implemented method, the third-party device management system comprises a second third-party device management system, and receiving the enrollment management request is from a first third-party device management system.

Additionally or alternatively, in some example embodiments of the first example computer-implemented method, the computer-implemented method further includes identifying the third-party device management system based on the subscriber identifier data object.

Additionally or alternatively, in some example embodiments of the first example computer-implemented method, the computer-implemented method further includes receiving a queue length associated with an action queue, the action queue comprising at least the third-party enrollment status request; identifying a queue length threshold; identifying a queue relationship based on the queue length and the queue length threshold; determining the queue relationship satisfies the queue length threshold; identifying an executed action process instance set comprising at least one executed action process instance; and updating the executed action process instance set based on the queue length.

Additionally or alternatively, in some example embodiments of the first computer-implemented method, receiving the enrollment management request object comprises receiving a batch set of enrollment management request data objects from a third-party device management system at a predetermined time, the batch set of enrollment management request data objects comprising at least the enrollment management request data object.

Additionally or alternatively, in some example embodiments of the first computer-implemented method, the enrollment management request data object is received directly via an interface of the device protection program management system.

Additionally or alternatively, in some example embodiments of the first computer-implemented method, the subscriber identifier data object embodies an IMEI (standing for International Mobile Equipment Identifier) that uniquely identifies a particular device; and the third-party enrollment status request data object comprises the IMEI for the particular device.

Additionally or alternatively, in some example embodiments of the first computer-implemented method, the third-party device management system comprises a trusted third-party device management system, and initiating the system synchronization event comprises updating at least one DPPMS subscriber profile data object to match the third-party enrollment status response data object.

In accordance with another aspect of the present disclosure, a first example apparatus to detect a network communication synchronization error is provided. In at least one example embodiment, the first example apparatus comprises at least one processor and at least one memory including computer program code, the at least one memory and the computer program code configured to, with the at least one processor, cause the apparatus to perform any one of the embodiments of the first computer-implemented method as described here above.

In accordance with another aspect of the present disclosure, a first example computer program product to detect a network communication synchronization error is provided. In at least one example embodiment, the first example computer program product includes at least one non-transitory computer-readable storage medium having computer program instructions thereon, the computer program instructions, in execution with a processor, configured for receiving an enrollment management request comprising subscriber data object indicative of a device protection program and comprising a subscriber identifier data object. The first example computer program is further configured for transmitting a third-party enrollment status request data object to a third-party device management system, the third-party enrollment status request data object associated with the subscriber identifier data object. The first example computer program is further configured for receiving a third-party enrollment status response data object from the third-party device management system, the third-party enrollment status response data object comprising third-party enrollment status data object. The first example computer program is further configured for comparing the third-party enrollment status response data object data with a second enrollment status data object in the system. The first example computer program is further configured for detecting a network communication synchronization error based on a difference between the third-party enrollment status data object and an enrollment status in the device protection program management system. The first example computer program is further configured for initiating a system synchronization event based on the network communication synchronization error.

Additionally or alternatively, in some example embodiments of the first example computer program product, the enrollment management request data object comprises an enrollment subscription request or an enrollment cancellation request data object, and initiating a system synchronization event comprises identifying a DPPMS subscriber profile data object based on the subscriber identifier data object; and updating the DPPMS subscriber profile data object based on the third-party enrollment status response data object.

Additionally or alternatively, in some example embodiments of the first example computer program product, comparing the third-party enrollment status data object with the second enrollment status data object is performed in real-time.

Additionally or alternatively, in some example embodiments of the first example computer program product, the enrollment management request data object comprises an enrollment subscription request, the identified third-party enrollment status is indicative that the third-party device management system does not include a third-party subscriber profile data object associated with the subscriber identifier data object, and initiating the system synchronization event comprises transmitting, to the third-party device management system, a third-party subscriber enrollment request data object configured to cause the third-party device management system to create the third-party subscriber profile data object associated with the subscriber identifier data object.

Additionally or alternatively, in some example embodiments of the first example computer program product, the enrollment management request data object comprises an enrollment cancellation request data object, the identified third-party enrollment status is indicative that the third-party device management system includes a third-party subscriber profile data object associated with the subscriber identifier data object, and initiating the system synchronization event comprises transmitting, to the third-party device management system, a third-party subscriber cancellation request data object configured to cause the third-party device management system to cancel the third-party subscriber profile data object associated with the subscriber identifier data object.

Additionally or alternatively, in some example embodiments of the first example computer program product, the computer program product further comprising computer program instructions for attempting to transmit a third-party enrollment management request data object to the third-party device management system; receiving a transmission error in response to the attempt to transmit the third-party enrollment management request data object to the third-party device management system indicative of an error in communicating with the third-party device management system; identifying an error classification associated with the transmission error, wherein the error classification comprises a retriable error; determining a request retry time; transmitting a second third-party enrollment status request data object to the third-party device management system after the request retry time has elapsed; receiving a second third-party enrollment status response data object from the third-party device management system; analyzing, in real time, the second third-party enrollment status response data object to identify a second third-party enrollment status associated with the subscriber identifier data object; and initiating a second system synchronization event based on the second identified third-party enrollment status data object.

Additionally or alternatively, in some example embodiments of the first example computer program product, the third-party device management system comprises a second third-party device management system, receiving the enrollment management request is from a first third-party device management system.

Additionally or alternatively, in some example embodiments of the first example computer program product, the computer program product further comprising computer program instructions for identifying the third-party device management system based on the subscriber identifier data object.

Additionally or alternatively, in some example embodiments of the first example computer program product, the computer program product further comprising computer program instructions for receiving a queue length associated with an action queue, the action queue comprising at least the third-party enrollment status request; identifying a queue length threshold; identifying a queue relationship based on the queue length and the queue length threshold; determining the queue relationship satisfies the queue length threshold; identifying an executed action process instance set comprising at least one executed action process instance; and updating the executed action process instance set based on the queue length.

In accordance with one aspect of the present disclosure, a second example system to detect a network transmission error is provided. In at least one embodiment comprising computer coded instructions on at least one memory that, in execution with at least one processor, configure the system to attempt to transmit a third-party enrollment management request data object from the system to a third-party device management system. The second example system is further configured to detect a transmission error associated with the attempted transmission to the third-party device management system indicative of the occurrence of at least one error during the attempted transmission. The second example system is further configured to identify an error classification associated with the transmission error. The second example system is further configured to identify an error handling instruction set based on the error classification. The second example system is further configured to execute the error handling instruction set.

Additionally or alternatively, in some example embodiments of the second example system, to identify the error classification, the system is configured to identify a trained error classification machine learning model; and identify the error classification using the trained error classification machine learning model.

Additionally or alternatively, in some example embodiments of the second example system, the identified error classification is a retriable error, and to execute the error handling instruction set, the system is configured to identify an escalation queue; and add the retriable error to the escalation queue.

Additionally or alternatively, in some example embodiments of the second example system, the identified error classification is a retriable error, and to execute the error handling instruction set, the system is configured to identify a retry maximum threshold; identify a retry attempt number; determine a retry relationship between the retry maximum threshold and the retry attempt number; determine the retry relationship satisfies a retry maximum threshold; determine a request retry time; and add the failed transmission to a request queue to attempt to re-transmit the failed transmission after the request retry time has elapsed.

Additionally or alternatively, in some example embodiments of the second example system, to determine the request retry time, the system is configured to update the request retry time based on the retry attempt number. Additionally or alternatively, in some example embodiments of the second example system, to determine the request retry time, the system is configured to update the request retry time based on an exponential back off.

Additionally or alternatively, in some example embodiments of the second example system, the identified error classification comprises an escalation error, and to execute the error handling instruction set, the system is configured to add the failed transmission to a transmission queue.

Additionally or alternatively, in some example embodiments of the second example system, the identified error classification identified from the error classification set is the escalation error, and to execute the error handling instruction set, the system is configured to transmit an error escalation request to a third-party error handling system.

Additionally or alternatively, in some example embodiments of the second example system, the system is further configured to receive a queue length associated with an action queue associated with the third-party enrollment request data object; identify a queue length threshold; identify a queue relationship based on the queue length and the queue length threshold; determine the queue relationship satisfies the queue length threshold; identify an executed action process instance set comprising at least one executed action process instance; and update the executed action process instance set based on the queue length.

In accordance with another aspect of the present disclosure, a second example computer-implemented method to detect a network transmission error, the computer-implemented method is provided, in at least some embodiments for implementation via the computing hardware, software, and/or firmware described herein. The second example computer-implemented method includes attempting to transmit a third-party enrollment management request data object to a third-party device management system. The second computer-implemented method further includes detecting a transmission error associated with the attempted transmission to the third-party device management system indicative of the occurrence of at least one error during the attempted transmission. The second computer-implemented method further includes identifying an error classification associated with the transmission error. The second computer-implemented method further includes identifying an error handling instruction set based on the error classification. The second computer-implemented method further includes executing the error handling instruction set.

Additionally or alternatively, in some example embodiments of the second example computer-implemented method, identifying the error classification comprises identifying a trained error classification machine learning model; and identifying the error classification using the trained error classification machine learning model.

Additionally or alternatively, in some example embodiments of the second example computer-implemented method, the identified error classification a retriable error, and executing the error handling instruction set comprises identifying an escalation queue; and adding the retriable error to the escalation queue.

Additionally or alternatively, in some example embodiments of the second example computer-implemented method, the identified error classification is a retriable error, and executing the error handling instruction set comprises identifying a retry maximum threshold; identifying a retry attempt number; determining a retry relationship between the retry maximum threshold and the retry attempt number; determining the retry relationship satisfies a retry maximum threshold; determining a request retry time; and adding the failed transmission to a request queue to attempt to re-transmit the failed transmission after the request retry time has elapsed.

Additionally or alternatively, in some example embodiments of the second example computer-implemented method, determining the request retry time comprises updating the request retry time based on the retry attempt number.

Additionally or alternatively, in some example embodiments of the second example computer-implemented method, determining the request retry time comprises updating the request retry time based on an exponential back off.

Additionally or alternatively, in some example embodiments of the second example computer-implemented method, the identified error classification comprises an escalation error, and executing the error handling instruction set comprises adding the failed transmission to a transmission queue.

Additionally or alternatively, in some example embodiments of the second example computer-implemented method, the identified error classification identified from the error classification set is the escalation error, and executing the error handling instruction set comprises transmitting an error escalation request to a third-party error handling system.

Additionally or alternatively, in some example embodiments of the second example computer-implemented method, the computer-implemented method further comprising receiving a queue length associated with an action queue associated with the third-party enrollment request data object; identifying a queue length threshold; identifying a queue relationship based on the queue length and the queue length threshold; determining the queue relationship satisfies the queue length threshold; identifying an executed action process instance set comprising at least one executed action process instance; and updating the executed action process instance set based on the queue length.

In accordance with another aspect of the present disclosure, a second example computer program product to detect a network transmission error is provided. In at least one example embodiment, the second example computer program product includes computer program instructions thereon, the computer program instructions configured for attempting to transmit a third-party enrollment management request data object to a third-party device management system. The second computer program product is further configured for detecting a transmission error associated with the attempted transmission to the third-party device management system indicative of the occurrence of at least one error during the attempted transmission. The second computer program product is further configured for identifying an error classification associated with the transmission error. The second computer program product is further configured for identifying an error handling instruction set based on the error classification. The second computer program product is further configured for executing the error handling instruction set.

Additionally or alternatively, in some example embodiments of the second example computer program product, identifying the error classification comprises identifying a trained error classification machine learning model; and identifying the error classification using the trained error classification machine learning model.

Additionally or alternatively, in some example embodiments of the second example computer program product, the identified error classification is a retriable error, and executing the error handling instruction set comprises identifying an escalation queue; and adding the retriable error to the escalation queue.

Additionally or alternatively, in some example embodiments of the second example computer program product, the identified error classification is a retriable error, and executing the error handling instruction set comprises identifying a retry maximum threshold; identifying a retry attempt number; determining a retry relationship between the retry maximum threshold and the retry attempt number; determining the retry relationship satisfies a retry maximum threshold; determining a request retry time; and adding the failed transmission to a request queue to attempt to re-transmit the failed transmission after the request retry time has elapsed.

Additionally or alternatively, in some example embodiments of the second example computer program product, determining the request retry time comprises updating the request retry time based on the retry attempt number. Additionally or alternatively, in some example embodiments of the second example computer program product, determining the request retry time comprises updating the request retry time based on an exponential back off.

Additionally or alternatively, in some example embodiments of the second example computer program product, the identified error classification comprises an escalation error, and executing the error handling instruction set comprises adding the failed transmission to a transmission queue.

Additionally or alternatively, in some example embodiments of the second example computer program product, the identified error classification identified from the error classification set is the escalation error, and executing the error handling instruction set comprises transmitting an error escalation request to a third-party error handling system.

Additionally or alternatively, in some example embodiments of the second example computer program product, the computer program product further comprising computer program instructions for receiving a queue length associated with an action queue associated with the third-party enrollment request data object; identifying a queue length threshold; identifying a queue relationship based on the queue length and the queue length threshold; determining the queue relationship satisfies the queue length threshold; identifying an executed action process instance set comprising at least one executed action process instance; and updating the executed action process instance set based on the queue length.

In accordance with yet another aspect of the present disclosure, a third example system to fulfill a claim for an unregistered device is provided. The third example system is configured by computer coded instructions to receive a claim data object associated with a subscriber identifier data object, the claim data object comprising a device identification data object. The third example system is further configured to query a device protection program subscriber database associated with the system for a subscriber profile data object associated with the subscriber identifier data object. The third example system is further configured to receive result data indicative that the device protection program database does not include the subscriber profile data object. The third example system is further configured to transmit a third-party enrollment status request to a third-party device management system, the third-party enrollment status request data object comprising the subscriber identifier data object and the device identification data object. The third example system is further configured to receive a third-party enrollment status response data object from the third-party device management system indicating a third-party enrollment status associated with the subscriber identifier data object, wherein the third-party enrollment status is indicative of a third-party subscriber profile data object stored in the third-party device management system. The third example system is further configured to initiate a claim processing instruction set associated with the claim data object without the subscriber profile data object.

Additionally or alternatively, in some example embodiments of the third example system, the system is further configured to identify a fraud protection instruction set comprising at least one fraud protection event to retrieve real-time device information; and execute the fraud protection instruction set.

Additionally or alternatively, in some example embodiments of the third example system, the system is further configured to receive a queue length associated with an action queue, the action queue comprising at least a subset of the claim data objects; identify a queue length threshold; identify a queue relationship based on the queue length and the queue length threshold; determine the queue relationship satisfies the queue length threshold; identify an executed action process instance set comprising at least one executed action process instance; and update the executed action process instance set based on the queue length.

Additionally or alternatively, in some example embodiments of the third example system, the claim data object is received from a first third-party device management system, and the third-party enrollment status request is transmitted to a second third-party device management system. Additionally or alternatively, in some example embodiments of the third example system, the system is further configured to identify the third-party device management system based on the subscriber identifier data object.

Additionally or alternatively, in some example embodiments of the third example system, the claim data object is received from a first third-party device management system comprising a third-party carrier device management system or a third-party vendor device management system, the third-party enrollment status request is transmitted to a second third-party device management system, and the claim data object includes a claim type identifier data object, and the system is further configured to, in a circumstance where the claim type identifier data object represents a device loss claim or a device stolen claim: retrieve a device location application status associated with a device location application, wherein the device location application status indicates the device location application is accessible; retrieve a device loss status associated with the device location application; and determine the device loss status is set to a lost state, where the claim processing instruction set is initiated in response to the determination that the device loss status is set to a lost state; and, in a circumstance where the claim type identifier data object represents a device damage claim: retrieve a device location application status associated with the device location application; and determine the device location application status indicates the device location application is inaccessible, wherein the claim processing instruction set is initiated in response to the determination that the device location application status indicates the device location application is inaccessible.

Additionally or alternatively, in some example embodiments of the third example system, the claim data object is received from a first third-party device management system comprising a third-party carrier device management system or a third-party vendor device management system, the third-party enrollment status request is transmitted to a second third-party device management system, and the claim data object includes a claim type identifier data object, and the system is further configured to, in a circumstance where the claim type identifier data object represents a device loss claim or a device stolen claim: retrieve a device location application status associated with a device location application, wherein the device location application status indicates the device location application is inaccessible, wherein the claim processing instruction set is initiated in response to the determination that the device location application status indicates the device location application is inaccessible; and, in a circumstance where the claim type identifier data object represents a device damage claim: retrieve a device location application status associated with the device location application; and determine the device location application status indicates the device location application is inaccessible, wherein the claim processing instruction set is initiated in response to the determination that the device location application status indicates the device location application is inaccessible.

Additionally or alternatively, in some example embodiments of the third example system, the claim data object is received from a first third-party device management system comprising a third-party manufacturer device management system, the third-party enrollment status request is transmitted to a second third-party device management system, and wherein the claim data object includes a claim type identifier data object, and the system is further configured to, in a circumstance where the claim type identifier data object represents a device loss claim or a device stolen claim: retrieve a device location application status associated with a device location application, wherein the device location application status indicates the device location application is accessible, wherein the claim processing instruction set is initiated in response to the determination that the device location application status indicates the device location application is inaccessible; and, in a circumstance where the claim type identifier data object represents a device damage claim: retrieve a device location application status associated with the device location application; and determine the device location application status indicates the device location application is inaccessible, wherein the claim processing instruction set is initiated in response to the determination that the device location application status indicates the device location application is inaccessible.

Additionally or alternatively, in some example embodiments of the third example system, the system is further configured to receive a transmission error that causes the system to not store the subscriber profile data object to the device protection program database. Additionally or alternatively, in some example embodiments of the third example system, the system is further configured to initiate a system synchronization event based on the third-party enrollment status response data object. In accordance with another aspect of the present disclosure, a third example computer-implemented method to fulfill a claim for an unregistered device is provided. The third example computer-implemented method includes operations to be performed by computing hardware, software, firmware, and/or a combination thereof, as described herein. In some embodiments, the computer-implemented method includes the operations performed by the third example apparatus described above. For example, in at least one embodiment, the third example computer-implemented method includes at least receiving a claim data object associated with a subscriber identifier data object, the claim data object comprising a device identification data object; querying a device protection program subscriber database associated with the system for a subscriber profile data object associated with the subscriber identifier data object; receiving result data indicative that the device protection program database does not include the subscriber profile data object; transmitting a third-party enrollment status request to a third-party device management system, the third-party enrollment status request data object comprising the subscriber identifier data object and the device identification data object; receiving a third-party enrollment status response data object from the third-party device management system indicating a third-party enrollment status associated with the subscriber identifier data object, wherein the third-party enrollment status is indicative of a third-party subscriber profile data object stored in the third-party device management system; and initiating a claim processing instruction set associated with the claim data object without the subscriber profile data object. Additionally or alternatively, the third example computer-implemented method may include any of the above described operations performed by any of the embodiments of the configured third example apparatus.

In some embodiments, the third example computer-method further may comprise any one of the following features:

- identifying a fraud protection instruction set comprising at least one fraud protection event to retrieve real-time device information; and executing the fraud protection instruction set;
- receiving a queue length associated with an action queue, the action queue comprising at least a subset of the claim data objects; identifying a queue length threshold; identifying a queue relationship based on the queue length and the queue length threshold; determining the queue relationship satisfies the queue length threshold; identifying an executed action process instance set comprising at least one executed action process instance; and updating the executed action process instance set based on the queue length;
- the claim data object is received from a first third-party device management system, and wherein the third-party enrollment status request is transmitted to a second third-party device management system;
- identifying the third-party device management system based on the subscriber identifier data object;
- the claim data object is received from a first third-party device management system comprising a third-party carrier device management system or a third-party vendor device management system, the third-party enrollment status request is transmitted to a second third-party device management system, and wherein the claim data object includes a claim type identifier data object, the computer-implemented method further comprising: in a circumstance where the claim type identifier data object represents a device loss claim or a device stolen claim: retrieving a device location application status associated with a device location application, wherein the device location application status indicates the device location application is accessible; retrieving device loss status associated with the device location application; and determining the device loss status is set to a lost state, wherein the claim processing instruction set is initiated in response to the determination that the device loss status is set to a lost state; and in a circumstance where the claim type identifier data object represents a device damage claim: retrieving a device location application status associated with the device location application; and determining the device location application status indicates the device location application is inaccessible, wherein the claim processing instruction set is initiated in response to the determination that the device location application status indicates the device location application is inaccessible;

the claim data object is received from a first third-party device management system comprising a third-party carrier device management system or a third-party vendor device management system, the third-party enrollment status request is transmitted to a second third-party device management system, and wherein the claim data object includes a claim type identifier data object, the computer-implemented method further comprising: in a circumstance where the claim type identifier data object represents a device loss claim or a device stolen claim: retrieving a device location application status associated with a device location application, wherein the device location application status indicates the device location application is inaccessible, wherein the claim processing instruction set is initiated in response to the determination that the device location application status indicates the device location application is inaccessible; and in a circumstance where the claim type identifier data object represents a device damage claim: retrieving a device location application status associated with the device location application; and determining the device location application status indicates the device location application is inaccessible, wherein the claim processing instruction set is initiated in response to the determination that the device location application status indicates the device location application is inaccessible;

the claim data object is received from a first third-party device management system comprising a third-party manufacturer device management system, the third-party enrollment status request is transmitted to a second third-party device management system, and wherein the claim data object includes a claim type identifier data object, the computer-implemented method further comprising: in a circumstance where the claim type identifier data object represents a device loss claim or a device stolen claim: retrieving a device location application status associated with a device location application, wherein the device location application status indicates the device location application is accessible, wherein the claim processing instruction set is initiated in response to the determination that the device location application status indicates the device location application is inaccessible; and in a circumstance where the claim type identifier data object represents a device damage claim: retrieving a device location application status associated with the device location application; and determining the device location application status indicates the device location application is inaccessible, wherein the claim processing instruction set is initiated in response to the determination that the device location application status indicates the device location application is inaccessible;

the computer-implemented method further comprises receiving a transmission error that causes the system to not store the subscriber profile data object to the device protection program database;

the computer-implemented method further comprises initiating a system synchronization event based on the third-party enrollment status response data object;

In accordance with another aspect of the present disclosure, a third example computer program product to fulfill a claim for an unregistered device is provided. The third example computer program product includes computer program instructions stored on at least one non-transitory computer readable storage medium. In some embodiments, the third example computer program product includes computer program instructions configured for performing the operations performed by the third example apparatus described above. For example, in at least one embodiment, the third example computer program product is configured for at least receiving a claim data object associated with a subscriber identifier data object, the claim data object comprising a device identification data object; querying a device protection program subscriber database associated with the system for a subscriber profile data object associated with the subscriber identifier data object; receiving result data indicative that the device protection program database does not include the subscriber profile data object; transmitting a third-party enrollment status request to a third-party device management system, the third-party enrollment status request data object comprising the subscriber identifier data object and the device identification data object; receiving a third-party enrollment status response data object from the third-party device management system indicating a third-party enrollment status associated with the subscriber identifier data object, wherein the third-party enrollment status is indicative of a third-party subscriber profile data object stored in the third-party device management system; and initiating a claim processing instruction set associated with the claim data object without the subscriber profile data object. Additionally or alternatively, the third example computer program product may be configured for any of the above described operations performed by any of the embodiments of the configured third example apparatus.

In particular, the third example computer program product may further comprise computer program instructions for:
identifying a fraud protection instruction set comprising at least one fraud protection event to retrieve real-time device information; and executing the fraud protection instruction set;

receiving a queue length associated with an action queue, the action queue comprising at least a subset of the claim data objects; identifying a queue length threshold; identifying a queue relationship based on the queue length and the queue length threshold; determining the queue relationship satisfies the queue length threshold; identifying an executed action process instance set comprising at least one executed action process instance; and updating the executed action process instance set based on the queue length.

In some embodiments of the third example computer program product, the claim data object is received from a first third-party device management system, and the third-party enrollment status request is transmitted to a second third-party device management system.

In some embodiments, the third example computer program product may further comprise computer program instructions for identifying the third-party device management system based on the subscriber identifier data object.

In some embodiments of the third example computer program product, the claim data object is received from a first third-party device management system comprising a third-party carrier device management system or a third-party vendor device management system. For example, the third-party enrollment status request is transmitted to a second third-party device management system, and the claim data object includes a claim type identifier data object. In that case, the third example computer program product further comprises computer program instructions for: in a circumstance where the claim type identifier data object represents a device loss claim or a device stolen claim: retrieving a device location application status associated with a device location application, wherein the device location application status indicates the device location application is accessible; retrieving device loss status associated with the device location application; and determining the device loss status is set to a lost state, wherein the claim processing instruction set is initiated in response to the determination that the device loss status is set to a lost state; and in a circumstance where the claim type identifier data object represents a device damage claim: retrieving a device location application status associated with the device location application; and determining the device location application status indicates the device location application is inaccessible, wherein the claim processing instruction set is initiated in response to the determination that the device location application status indicates the device location application is inaccessible.

In some embodiments of the third example computer program product, wherein the claim data object is received from a first third-party device management system comprising a third-party carrier device management system or a third-party vendor device management system, the third-party enrollment status request is transmitted to a second third-party device management system, and wherein the claim data object includes a claim type identifier data object, the third example computer program product further comprises computer program instructions for: in a circumstance where the claim type identifier data object represents a device loss claim or a device stolen claim: retrieving a device location application status associated with a device location application, wherein the device location application status indicates the device location application is inaccessible, wherein the claim processing instruction set is initiated in response to the determination that the device location application status indicates the device location application is inaccessible; and in a circumstance where the claim type identifier data object represents a device damage claim: retrieving a device location application status associated with the device location application; and determining the device location application status indicates the device location application is inaccessible, wherein the claim processing instruction set is initiated in response to the determination that the device location application status indicates the device location application is inaccessible.

In some embodiments of the third example computer program product, wherein the claim data object is received from a first third-party device management system comprising a third-party manufacturer device management system, the third-party enrollment status request is transmitted to a second third-party device management system, and wherein the claim data object includes a claim type identifier data object, the third example computer program product further comprises computer program instructions for: in a circumstance where the claim type identifier data object represents a device loss claim or a device stolen claim: retrieving a device location application status associated with a device location application, wherein the device location application status indicates the device location application is accessible, wherein the claim processing instruction set is initiated in response to the determination that the device location application status indicates the device location application is inaccessible; and in a circumstance where the claim type identifier data object represents a device damage claim: retrieving a device location application status associated with the device location application; and determining the device location application status indicates the device location application is inaccessible, wherein the claim processing instruction set is initiated in response to the determination that the device location application status indicates the device location application is inaccessible.

Additionally or alternatively, the third example computer program product further comprises computer program instructions for receiving a transmission error that causes the system to not store the subscriber profile data object to the device protection program database. Additionally or alternatively, the third example computer program product further comprises computer program instructions for initiating a system synchronization event based on the third-party enrollment status response data object.

In accordance with yet another aspect of the present disclosure, a fourth example system is provided, including at least one processor and at least one memory with computer-coded instructions thereon for execution. In at least one example embodiment, the fourth example system is configured by the computer-coded instructions to receive a queue length associated with an action queue. The fourth example system is further configured to identify a queue length threshold. The fourth example system is further configured to identify a queue relationship based on the queue length and the queue length threshold. The fourth example system is further configured to determine the queue relationship satisfies the queue length threshold. The fourth example system is further configured to identify an executed action process instance set comprising at least one executed action process instance. The fourth example system is further configured to update the executed action process instance set based on the queue length.

Additionally or alternatively, in some example embodiments of the fourth example system, the queue length threshold comprises a queue length maximum threshold and the queue relationship comprises a maximum queue relationship, the system is further configured to identify an executed instance number associated with the executed action process instance set; identify an action process instance count maximum; determine a maximum process instance relationship based on the executed instance number and the action process instance count maximum threshold; and determine the maximum process instance relationship satisfies the action process instance count maximum threshold, wherein to cause the system to update the executed action process instance set, the system is configured to execute a new action process instance and add the new action process instance to the executed action process instance set.

Additionally or alternatively, in some example embodiments of the fourth example system, the queue length threshold comprises a queue length minimum threshold and the queue relationship comprises a minimum queue relationship, and the system is further configured to identify an executed instance number associated with the executed action process instance set; identify an action process instance count minimum; determine a minimum process instance relationship based on the executed instance number and the action process instance count minimum; and determine the minimum process instance relationship satisfies the action process instance count minimum, where to cause the system to update the executed action process instance set, the system is configured to terminate a selected executed action process instance from the executed action process instance set.

Additionally or alternatively, in some example embodiments of the fourth example system, to update the executed action process instance set, the system is configured to identify an action type associated with at least one unprocessed action in the action queue, the action type associated with a first action priority; identify an executed action process instance comprising an executed process thread configured for processing a second action type associated with a second action priority, wherein the first action priority is determined to be a greater priority than the second action priority; delete the process thread from the executed action process instance; and execute a new process thread on the executed action process instance, the new process thread configured for processing unprocessed actions associated the first action type.

In accordance with another aspect of the present disclosure, a fourth example computer-implemented method is provided. The fourth example computer-implemented method includes operations to be performed by computing hardware, software, firmware, and/or a combination thereof, as described herein. In some embodiments, the computer-implemented method includes the operations performed by the fourth example apparatus described above. For example, in at least one embodiment, the fourth example computer-implemented method includes at least receiving a queue length associated with an action queue; identifying a queue length threshold; identifying a queue relationship based on the queue length and the queue length threshold; determining the queue relationship satisfies the queue length threshold; identifying an executed action process instance set comprising at least one executed action process instance; and updating the executed action process instance set based on the queue length. Additionally or alternatively, the fourth example computer-implemented method may include any of the above described operations performed by any of the above-described embodiments of the configured fourth example apparatus.

In some embodiments of the fourth example computer-implemented method, wherein the queue length threshold comprises a queue length maximum threshold and the queue relationship comprises a maximum queue relationship, the computer-implemented method further comprises: identifying an executed instance number associated with the executed action process instance set; identifying an action process instance count maximum; determining a maximum process instance relationship based on the executed instance number and the action process instance count maximum threshold; and determining the maximum process instance relationship satisfies the action process instance count maximum threshold, wherein to updating the executed action process instance set comprises executing a new action process instance and adding the new action process instance to the executed action process instance set.

In some embodiments of the fourth example computer-implemented method, wherein the queue length threshold comprises a queue length minimum threshold and the queue relationship comprises a minimum queue relationship, the computer-implemented method further comprises: identifying an executed instance number associated with the executed action process instance set; identifying an action process instance count minimum; determining a minimum process instance relationship based on the executed instance number and the action process instance count minimum; and determining the minimum process instance relationship satisfies the action process instance count minimum, wherein updating the executed action process instance set comprises terminating a selected executed action process instance from the executed action process instance set.

In some embodiments of the fourth example computer-implemented method, updating the executed action process instance set comprises: identifying an action type associated with at least one unprocessed action in the action queue, the action type associated with a first action priority; identifying an executed action process instance comprising an executed process thread configured for processing a second action type associated with a second action priority, wherein the first action priority is determined to be a greater priority than the second action priority; deleting the process thread from the executed action process instance; and executing a new process thread on the executed action process instance, the new process thread configured for processing unprocessed actions associated the first action type.

In accordance with another aspect of the present disclosure, a fourth example computer program product is provided. The fourth example computer program product includes computer program instructions stored on at least one non-transitory computer readable storage medium. In some embodiments, the fourth example computer program product includes computer program instructions configured for performing the operations performed by the fourth example apparatus described above. For example, in at least one embodiment, the fourth example computer program product is configured for at least receiving a queue length associated with an action queue; identifying a queue length threshold; identifying a queue relationship based on the queue length and the queue length threshold; determining the queue relationship satisfies the queue length threshold; identifying an executed action process instance set comprising at least one executed action process instance; and updating the executed action process instance set based on the queue length. Additionally or alternatively, the fourth example computer program product may be configured for any of the above described operations performed by embodiments of the configured fourth example apparatus.

In some embodiments, wherein the queue length threshold comprises a queue length maximum threshold and the queue relationship comprises a maximum queue relationship, the fourth example computer program product further comprises computer program instructions for: identifying an executed instance number associated with the executed action process instance set; identifying an action process instance count maximum; determining a maximum process instance relationship based on the executed instance number and the action process instance count maximum threshold; and determining the maximum process instance relationship satisfies the action process instance count maximum threshold, wherein to updating the executed action process instance set comprises: executing a new action process instance; and adding the new action process instance to the executed action process instance set.

In some embodiments, wherein the queue length threshold comprises a queue length minimum threshold and the queue relationship comprises a minimum queue relationship, the fourth example computer program product further comprises computer program instructions for: identifying an executed instance number associated with the executed action process instance set; identifying an action process instance count minimum; determining a minimum process instance relationship based on the executed instance number and the action process instance count minimum; and determining the minimum process instance relationship satisfies the action process instance count minimum, wherein updating the executed action process instance set comprises terminating a selected executed action process instance from the executed action process instance set.

In some embodiments of the fourth example computer program product, updating the executed action process instance set comprises: identifying an action type associated with at least one unprocessed action in the action queue, the action type associated with a first action priority; identifying an executed action process instance comprising an executed process thread configured for processing a second action type associated with a second action priority, wherein the first action priority is determined to be a greater priority than the second action priority; deleting the process thread from the executed action process instance; and executing a new process thread on the executed action process instance, the new process thread configured for processing unprocessed actions associated the first action type.

BRIEF DESCRIPTION OF DRAWINGS

FIGS. 8A and 8B illustrate flowcharts depicting operations performed in accordance with an example embodiment of the present disclosure.

DETAILED DESCRIPTION

Figure 1:
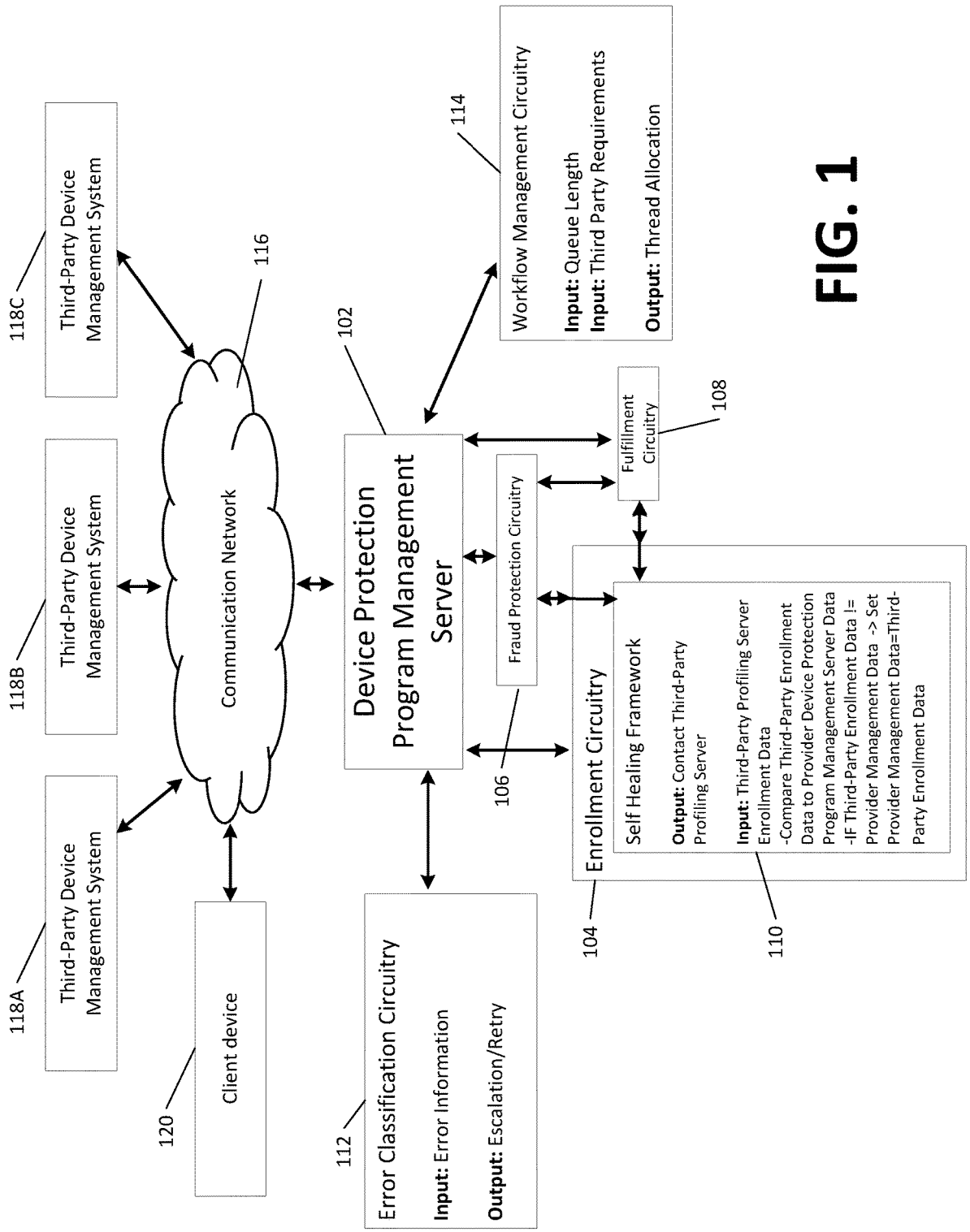
FIG. 1 illustrates an example system within which embodiments of the present disclosure may operate.

Embodiments of the present disclosure now will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Device protection programs protect subscribers in the event a subscriber device is damaged, broken, lost, stolen, or otherwise affected. While many third-parties may offer enrollment to one or more device protection programs, not all third-parties also fulfill or otherwise handle claims associated with all claims brought associated with a device protection program. Accordingly, while third-parties may enroll new subscribers associated with one or more device protection programs, such third-parties rely on device protection program management systems (DPPMS) controlled by a provider entity to actively fulfill claims. In some embodiments, a provider entity associated with a DPPMS may provide supplemental device protection in addition to protection provided by a third-party, which may require a high degree of cooperation between the computing systems of the DPPMS and computing systems of the primary device protection provider. As described herein, the inventors have identified a number of solutions to problems related to the management of multiple, independently-operated computing systems and databases, including DPPMS and third-party systems, that require large volume updating and processing operations with frequent changes while keeping the independent computing systems synchronized and consistent and without overly burdening any individual system with redundant or unnecessary tasks.

A DPPMS may interact with one or more third-party systems, each third-party system associated with a third-party entity. A corresponding third-party entity may indicate a level of control over the subscriber device (e.g., only software, software and hardware, firmware, or the like). Some third-party systems are associated with a mobile carrier, for example, where the mobile carrier controls only specific software and/or firmware associated with the subscriber device. Other third-party systems are associated with a device manufacturer, for example, where the device manufacturer controls software, firmware and/or hardware associated with the subscriber device. Some third-party systems include a third-party device management system, configured to maintain subscriber profile data objects associated with subscribers associated with, or enrolled in, one or more device protection programs through the third-party device management system. Users may subscribe new or existing devices to a device protection program, and/or cancel enrollment in a device protection program for one or more subscriber devices that are currently enrolled. The third-party device management system may then communicate with the DPPMS to provide one or more enrollment management request data objects associated with subscriber changes that occurred via the third-party device management system. In other embodiments, the user may subscribe and/or cancel enrollment in a device protection program via the DPPMS directly, or a second third-party device management system. For example, the subscription or cancellation may originate via a carrier system and be communicated from the carrier system to a manufacturer system (or the reverse), before being forwarded to the DPPMS. Enrollment management request data objects may be used to synchronize subscriber enrollment data between the DPPMS and one or more third-party systems, each of which may independently maintain one or more data objects associated with a device and subscriber.

In some embodiments, one or more third-party systems are configured to receive device incident data from a subscriber (for example, information indicating a loss, theft, damage, or another covered event associated with a subscriber device). A subscriber may report an incident either directly to the DPPMS or via the third-party system. For example, the subscriber may report an incident via a reporting interface associated with the third-party system (e.g., a web interface or mobile application), or via a call center request. Some third-party systems are configured to authenticate a user associated with the reported incident. For example, a third-party system may authenticate a user by requiring the user to provide a username and password, and subsequently authenticate utilizing a pre-determined two-factor authentication method. A third-party system may provide information indicating the user was successfully authenticated to the DPPMS, for example in the form of a third-party user identity authentication token. The third-party user identity authentication token may be included as part of third-party case information associated with a third-party case to validate that the user that reported the device incident associated with the third-party case was successfully authenticated by the third-party system.

In response to reported incidents, a third-party, such as a device manufacturer, may initiate a third-party case associated with the reported incident, for example via the third-party device management system, such as a device manager profiling system. Accordingly, the third-party device management system may retrieve, receive, and/or otherwise store information associated with the reported incident, subscriber device, subscriber, or the like. In some embodiments, the information may be stored such that it is accessible associated with the third-party case. The third-party device management system may, for example, retrieve real-time device information associated with a subscriber device, and store the real-time device information in a third-party case.

A DPPMS may receive enrollment management request data objects from the third-party device management system associated with new and/or cancelled subscribers, or from a second third-party device management system associated with the first third-party device management system and DPPMS. For example, the first third-party device management system may be a manufacturer system associated with a mobile devices particular mobile device type, and the second third-party device management system may be a carrier system for receiving subscription enrollment and cancellation associated with their mobile devices. The enrollment management request data object may indicate a new subscriber enrolled through the third-party device management system, and include information associated with the new subscriber to a device protection program, such as a subscriber identifier data object that uniquely identifies the subscriber profile data object, subscriber device identifier, subscriber name (if any), subscriber contact information, and/or the like. Additionally or alternatively, an enrollment management request data object indicating a new subscriber enrolled through the third-party device management system may include a third-party identity authentication token for use in verifying that the third-party device management system successfully authenticated the subscriber.

Alternatively, the enrollment management request data object may indicate a subscriber cancelled their enrollment in a device protection program through the third-party device management system, and include information associated with the cancelled subscriber to the device protection program, such as a subscriber identifier data object that uniquely identifies the subscriber profile data object, subscriber device identifier, and/or the like. Additionally or alternatively an enrollment management request data object indicating a subscriber cancelled enrollment through the third-party device management system may include a third-party identity authentication token for use in verifying that the third-party device management system successfully authenticated the subscriber.

An example DPPMS includes one or more action queues for storing unprocessed actions and/or requests received from a third-party system, such as a third-party device management system. A DPPMS may, based on the enrollment management request data object received, identify and perform an enrollment protocol comprising an instruction set associated with the enrollment management request data object.

In an example system, a DPPMS receives enrollment management request data objects from a particular third-party device management system at one or more pre-determined times (e.g., every week at a particular time on a particular day of the week). Accordingly, the DPPMS may store received enrollment management request data objects in an action queue. The DPPMS may execute and maintain one or more action processes, where each action process includes one or more executed process threads configured to process the unprocessed actions (e.g., the enrollment management request data objects) from the action process queue.

For example, in an example system, a DPPMS may initiate one or more action instance processes configured to process unprocessed actions stored in an action queue. Action instance processes may be configured to process a single unprocessed action type (e.g., unprocessed enrollment management request data objects) or various unprocessed action types (e.g., unprocessed enrollment management request data objects, unprocessed claims, and the like).

Additionally or alternatively, an example embodiment DPPMS is configured to manage a third-party case by creating, maintaining, and processing a claim corresponding to the third-party case. For example, the DPPMS may receive third-party case information from a third-party system, such as a device manufacturer system or a mobile carrier system. Additionally, the DPPMS may receive user case information associated with the third-party case (e.g., an incident date, a user description of the incident, etc.).

The DPPMS may use the third-party case information and user case information to generate a claim associated with the third-party case. The claim may include some or all of the combination of third-party case information and user case information. In some embodiments, the DPPMS may add the claim to an action queue for fulfilment. The action queue for processing claims and the action queue for processing enrollment management request data objects may be separate. Additionally or alternatively, the DPPMS may include one or more action process instances for processing claims from a corresponding action queue.

The DPPMS may receive new third-party cases from one or more third-party systems. For example, the DPPMS may communicate with one or more device manufacturer systems and one or more mobile carrier systems. Each third-party system may be configured to initiate a new third-party case in response to an incident report submitted by a user, for example through an interface associated with the third-party system. Additionally or alternatively, a third-party system, such as a device manufacturer system, may be configured to perform user authentication. Accordingly, in some embodiments, the DPPMS is configured to receive user authentication information, such as a user authentication token, as part of third-party case information or additional to the transmission of third-party case information. The user authentication information may be used to validate that the third-party system authenticated the third-party resource.

After receiving third-party case information, the DPPMS may be configured to receive user case information associated with the third-party case. For example, the user may input information regarding the incident (e.g., the incident date, the incident time, a description of the incident, etc.) via an interface generated by the DPPMS or an associated system. In some embodiments, the DPPMS generates a claim based on the third-party case information and user case information.

A DPPMS may then store claims for processing and fulfilment in an action queue. The DPPMS may initiate and/or maintain one or more executed action processing instances configured to process unprocessed claims. The DPPMS may include one or more modules and/or subsystems configured to identify a fraud risk associated with the claim. Based on at least the fraud risk, the claim may be authorized (if deemed not fraudulent) or denied (if deemed fraud).

Alternatively or additionally, in some embodiments, the DPPMS may identify claim requirements associated with a given claim. Each claim requirement may require further action by the user. For example, the claim requirements for a given claim may include user acknowledgement of one or more disclaimers associated with the claim. In some embodiments, the DPPMS must receive all information associated with the claim, such as the user requirements, within a pre-determined claim completion time period (e.g., 30 days). If claim requirements, and/or other information associated with the claim, are not received from a user within the pre-determined claim completion time period, the DPPMS may automatically close the claim for lack of action.

When a DPPMS authorizes, denies, or closes a claim, the DPPMS may be configured to set a corresponding claim status associated with the claim. For example, when a claim is authorized, the DPPMS may set a corresponding claim status for that claim to "Authorized". Alternatively, when a claim is denied or closed for lack of action, the DPPMS may set a corresponding claim status for that claim to "Denied" or "Closed," respectively.

In some embodiments, the DPPMS is configured to cause one or more third-party systems to update a third-party case based on the set claim status. A DPPMS may be controlled by a particular entity, for example a provider entity, who may create, control, and otherwise utilize a DPPMS for multiple functions associated with device protection programs to ensure that such systems handle claims in a robust and efficient manner while also ensuring that claims are verified as non-fraudulent.

In an example context, for example, the DPPMS manages device protection programs for devices, such as insurance, warranties, and/or the like for mobile devices. In such a context, the DPPMS communicates with one or more third-party systems, for example a first third-party system of a carrier system and a second third-party system of a manufacturer system, to manage enrollment subscribers to various device protection programs. Users may manage their subscription to a device protection program that is fulfilled via the DPPMS or associated entity. By enrolling in a device subscription program, a user may submit a claim related to that device protection program when a device covered by the device protection program is damaged, lost, stolen, or the like (e.g., another event resulting in diminished functionality or other inability to access the device) in return for one or more fee(s). The claim can be processed by the DPPMS and/or associated systems to determine whether to fulfil a claim (providing a new device, repairing an existing device, or the like) or refuse the claim as fraudulent or unfulfillable (e.g., the user is not covered for the event).

In such circumstances, the DPPMS performs the required fulfilment actions in response to legitimate user claims. The DPPMS may query to determine whether a user is enrolled in a device protection program at the time of the claim. However, a user may enroll in a device protection program at various times, including at the time of device purchase, particular events, or in some circumstances at any desired time, and similarly may cancel enrollment at particular times or alternatively at any time of their choosing. Further, the users may enroll in, or cancel enrollment in, the device protection program via any of the carrier system, the manufacturer system, or directly via the DPPMS. Thus, the databases of subscribers maintained by the DPPMS may not be up-to-date at the time the DPPMS is determining whether to fulfill a received claim, and/or identify how to fulfill a received claim.

Accordingly, a DPPMS may construct and maintain a database of subscriber profile data objects separate from the third-party systems with which the DPPMS interfaces, where each subscriber profile data object is enrolled in at least one device protection program. The DPPMS may manage subscriber profile data objects that enroll and/or cancel enrollment through one or more third-party systems. The DPPMS communicates with the one or more third-party systems, such as one or more third-party device management systems to determine a third-party enrollment status associated with a subscriber profile data object, to receive enrollment management request data objects (such as new subscriber enrollment requests or new subscriber cancellation requests) from the one or more third-party device management systems. Subscriber profile data objects may be associated with a human subscriber, a subscriber device, and/or both.

However, subscriber profile data objects in the DPPMS may not exactly match the enrollment status with regard to corresponding third-party subscriber profile data objects stored in a third-party system. When a new subscriber enrolls in a device protection program, or cancels their enrollment in a device protection program, via a third-party device management system, the DPPMS may not be updated until a later time. In this regard, one or more the third-party device management system(s) may hold enrollment management request data objects to prevent constantly utilizing significant network resources and other computing resources to communicate with the DPPMS. For example, some third-party device management systems may transmit new enrollment management request data objects to the DPPMS in batches, for example at a predetermined time, such as once a week at a specific time. In other words, the DPPMS receives a batch set of enrollment management request data objects from the third-party device management system at the predetermined time. Accordingly, when a user changes their enrollment status (e.g., newly subscribers or cancels) as to a device protection program, the corresponding DPPMS may not reflect this status until the third-party device management system notifies the DPPMS of new enrollment management request data objects, for example via a batch transmittal of new enrollment management request data objects.

Failures in communications between systems may further problems in ensuring the DPPMS reflects accurate subscriber enrollment. Transmission errors, including signal errors and errors in processing received enrollment requests, may cause a DPPMS to fail to update based on information received from a third-party device management system without the third-party device management system detecting that such an error has occurred. Particularly in the context of device protection program enrollment, for example, one or more third-party device management systems may transmit enrollment management request data objects to the DPPMS to update a database, list, or other datastore of subscriber profile data objects. However, the DPPMS may fail to receive the transmission, for example due to a network failure or network interface failure of a component of the DPPMS. Additionally or alternatively, a transmission error may occur when the DPPMS is unable to process the received transmission due to data corruption or inconsistency. In such a circumstance, the third-party device management system may not, or may be unable to, detect the error, and may continue operating under the assumption that the DPPMS has properly updated its enrollment database without such updates being successful. Thus, the subscriber profile data objects maintained by the DPPMS and the third-party device management system may not be synchronized, and the systems may be unable to detect such a circumstance.

If a DPPMS does not reflect the proper enrollment status associated with a subscriber to a device protection program, the DPPMS may improperly handle claims or other transactions associated with the device protection program. For example, if a DPPMS includes a subscriber profile data object associated with a subscriber to a device protection program that cancelled their enrollment in the device protection program via a third-party device management system, the DPPMS may improperly fulfill the claim. Alternatively, if a DPPMS does not include a subscriber profile data object associated with a subscriber to a device protection program, when the subscriber has enrolled in the device protection program via a third-party device management system, the may improperly not fulfill the claim.

Accordingly, various embodiments of the disclosure relate to methods, computer program products, and systems for subscriber enrollment management, via a DPPMS, configured to verify subscriber enrollment status with a third-party device management system in real-time. Specifically, some embodiments of the present disclosure are configured to transmit an enrollment status request to a third-party device management system, receive a third-party enrollment status response data object from the third-party device management system, and analyze the third-party enrollment status response data object to identify a third-party enrollment status associated with a subscriber, or subscriber identifier data object, in real-time. Additionally, some embodiments are configured to initiate a system synchronization event based on the identified third-party enrollment status. Thus, embodiments of the present disclosure provide a solution to the improper synchronization between a DPPMS and one or more third-party device management systems.

Unlike conventional server-client or master-slave architectures, the DPPMS separates control of the data between the networked systems. The DPPMS does not automatically trust the data its previously stored data, or the data previously stored by other third-party device management systems networked with the DPPMS. Due to the nature of data transmissions to the DPPMS, specific transmissions from a third-party device management system may be trusted and used to update the DPPMS, subsystems thereof, or other third-party device management systems.

Additionally, due to the nature receiving batch transmittals, systems may inefficiently utilize processing resources based on the amount of unprocessed actions (e.g., claims, enrollment management request data objects, and/or the like). Upon batch transmittal, unprocessed actions may be placed in an action queue for processing. However, insufficient resources may be allocated to processing maintaining action process instances configured to process the unprocessed actions in each action queue, such that wait times for processing unprocessed actions may be greater than a target processing time. Accordingly, the DPPMS may function inefficiently. Similarly, in some circumstances, an action queue may have more processing resources allocated to it than necessary, such as when action queue lengths are short. In such a circumstance, processing resources are wasted, leading to overall system inefficiencies.

Accordingly, various embodiments of the disclosure relate to methods, computer program products, and systems for utilizing a scaling service for managing one or more process instances associated with an action queue. Some embodiments of the present disclosure are configured to, based on a queue length and an identified queue relationship, update an executed action process instance set. For example, some embodiments identify a maximum queue relationship based on a queue length and a queue length maximum threshold, and based on the maximum queue relationship, update the executed action process instance set by executing a new action process instance, including at least one processing thread configured to process unprocessed actions stored in the action queue. Additionally or alternatively, some embodiments identify a minimum queue relationship based on the queue length and a queue length minimum threshold, and based on the minimum queue relationship, update the executed action process instance set by terminating a selected executed action process instance from the executed action process instance set. Thus, embodiments of the present disclosure provide a solution to the DPPMS processing resource inefficiencies.

Additionally, transmissions between a DPPMS and a third-party system may fail. Sometimes, such transmission failures may result from lost connections, power outages, or other technical and/or communication-based errors. A DPPMS may receive a transmission error in response to a failed transmission. Without robust means of handling the received transmission error, the DPPMS may continue to be out-of-sync with one or more third-party device management systems, and/or function inefficiently.

Accordingly, various embodiments of the disclosure relate to methods, computer program products, and systems for robustly handling transmission errors received, by a DPPMS, in response to a failed transmission to a third-party device management system. Some embodiments are configured to receive a transmission error, identify an error classification associated with the transmission error, identify an error handling instruction set associated with the error classification, where the error handling instruction set represents an error handling protocol including at least one error handling event, and executing the error handling instructions set to initiate at least one error handling event. In some embodiments, the error classification is one from an identified error classification set, which may include a "retriable error" classification and a "escalation error" classification. An example embodiment is configured to, when a transmission error is classified as a retriable error, at least, identify a retry maximum threshold, identify a retry attempt number, determine a retry relationship between the retry maximum threshold and the retry attempt number, determine the retry relationship satisfies the retry maximum threshold, determine a request retry time, and add the failed transmission to a request queue for re-transmission after the request retry time has elapsed. Additionally or alternatively, an example embodiment is configured to, when a transmission error is classified as an escalation error, add the transmission error to an escalation queue. Thus, embodiments of the present disclosure improve DPPMS error handling.

As described above, a DPPMS may manage subscriber enrollment associated with one or more device protection programs and manage claims associated with one or more device protection programs. For example, subscribers to a device protection program may submit a claim regarding a damaged, lost, stolen, or otherwise affected subscriber device. In some circumstances, a claim may be fraudulent. For example, a subscriber may submit a claim that a subscriber device was stolen. If the claim is legitimate, the claim may be fulfilled associated with a corresponding device protection program (e.g., the subscriber may be provided a replacement device). However, if the claim is fraudulent (e.g., the subscriber has access to the device), the DPPMS should not fulfill the claim. The DPPMS may utilize information known at the time the claim is received or being processed, however, such information may be insufficient to allow the DPPMS to determine if the claim is fraudulent.

Accordingly, various embodiments of the disclosure relate to methods, computer program products, and systems for executing a fraud protection protocol comprising an instruction set in response to receiving a claim. Some embodiment systems identify a fraud protection protocol that includes an instruction set for at least one fraud protection event based on real-time device information. Some embodiment systems retrieve real-time device information associated with a subscriber device associated with the claim. For example, some embodiments retrieve information associated with a device location application, where the device location application is configured to allow a user to receive a subscriber device location upon access. In an embodiment system, the fraud protection protocol includes a real-time device information event that retrieves, from a third-party device management system for example, the most recent device location application usage to determine if the subscriber associated with the claim attempted to locate the subscriber device associated with the claim. Some embodiment systems are configured to make a fraud determination (e.g., determine whether the claim is fraudulent or is not fraudulent), based on at least the real-time device information.

Definitions

As used herein, the terms "data", "content", "information", and similar terms may be used interchangeably to refer to data capable of being captured, transmitted, received, displayed, and/or stored in accordance with various example embodiments. Thus, use of any such terms should not be taken to limit the spirit and scope of the disclosure. Further, where a computing device is described herein to receive data from another computing device, it will be appreciated that the data may be received directly from another computing device, or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to another computing device or it may be sent indirectly via one or more intermediary computing devices, such as, for example, one or more servers, relays, routers, network access points, base stations, and/or the like.

The term "device protection program" refers to a coverage or protection program for one or more user devices (e.g., subscriber devices as defined herein). The device protection program may facilitate a device replacement, repair, or other fulfillment option in response to damage, failure, and/or loss of the subscriber device. A device protection program may allow a subscriber to submit a claim to repair, replace, or otherwise alter a subscriber device to restore the device to a working condition or replace the device, in exchange for payment in advance, often at a fixed rate at pre-determined intervals (e.g., monthly or yearly). In some instances, a device protection program may include primary or supplemental insurance, an extended warranty, or other coverage for a device's potential loss or impairment. In some embodiments, a device protection program may cover multiple devices associated with a single user.

The term "subscriber device" refers to an electronic computing device, component, or system associated with a user to be enrolled, or currently enrolled in, an associated device protection program. In some embodiments, a subscriber device is associated with one or more identifiers that uniquely identify the subscriber device, including, without limitation, a DPPMS-managed identifier, international mobile equipment identifier (IMEI), serial number, and subscriber identity module (SIM) number. Examples of subscriber devices include one of the following devices associated with a device protection program: a personal device, enterprise device, mobile phone (such as a smart phone), personal computer, laptop computer, tablet, a household appliance, networking equipment, an automobile, and the like.

The term "subscriber identifier data object" refers to a text string, numerical value, code, or other data type comprising a unique identifier associated with a particular subscriber profile data object subscribed to a device protection program and/or a particular device subscribed to a device protection program. An example subscriber identifier data object is an alphanumeric string associated with a particular subscription to a device protection program associated with a particular subscriber device. In some embodiments, a subscriber identifier data object is at least one from the group including an IMEI, Internet Protocol address (IP or IP number), other device identifier, a randomly generated numeric and/or alphanumeric unique identifier, and the like.

The term "subscriber information" refers to data or information, which may be employed by a device protection program management system, associated with a subscriber device and/or subscriber user associated with a particular device protection program. The subscriber information may include a subscriber identifier data object, subscriber name, subscriber contact information, and/or the like. In some embodiments, subscriber information is only associated with a particular subscriber device, or associated with a particular group of subscriber devices, and does not include any information about a corresponding subscriber user (e.g., a human owner and/or controller of the subscriber device(s)). In some such embodiments, a received claim data object associated with the subscriber device may require supplemental information identifying a user associated with the subscriber device. In another example embodiment, subscriber information includes a subscriber identifier data object that uniquely identifies the subscriber and/or subscriber device associated with the device protection program.

The term "subscriber profile data object" refers to a stored information set that includes information about a subscription to a device protection program associated with a user or a particular subscriber device. In some embodiments, a subscriber profile data object includes one or more of: an entity or user name, one or more contact information identifiers (e.g., email, phone number, address, and the like), a device type, a device identifier (e.g., an IMEI), a subscriber identifier data object, a subscription identifier, or other subscriber information. A subscriber profile data object includes information for analysis when a claim data object is received associated with the subscriber profile data object (e.g., a claim data object requesting repair and/or replacement of a subscriber device associated with the subscriber profile data object). In some embodiments, where the subscriber profile data object only identifies a subscriber device (or subscriber device group), additional information may be required associated with a submitted claim data object to facilitate processing. For example, in some embodiments, in a circumstance where the claim data object originates via a claims processing call center system, at least billing and shipping information associated with the claim data object must be submitted for processing. Additionally or alternatively, in some embodiments, in a circumstance where the claim data object originates via a web portal (for example, submitted by a user via a client device), at least information identifying a particular owner of a subscriber device, billing information, shipping information, and/or additional claim information, may be submitted via the web portal for processing.

The term "enrollment management request data object" refers to data or information, received by a device protection program management system to modify a subscriber profile data object. An example enrollment management request data object represents a request to create, in the device protection program management system, a new subscriber profile data object associated with a selected device protection program. In some embodiments, an example enrollment management request data object includes an "enrollment subscription request data object," which represents a request to enroll a new subscriber associated with a selected device protection program. In some embodiments, an enrollment subscription request data object includes at least (1) a device identifier (e.g., an IMEI, MSN, MEID, or the like), and/or (2) a subscriber profile identifier (e.g., an account number), where such information can be used to identify a particular subscriber profile data object for handling future submitted claim data object(s). In another example enrollment management request data object represents a request to cancel, in the device protection program management system, an enrolled DPPMS subscriber profile data object associated with a selected device protection program. For example, in some embodiments, an enrollment management request data object includes an enrollment cancellation request data object, which represents a request to cancel an enrolled subscriber associated with a selected device protection program. In some embodiments, an enrollment management request data object includes subscriber information that identifies a corresponding subscriber profile data object. In some embodiments, an enrollment management request data object includes subscriber information that identifies a corresponding subscriber device.

The terms "device protection program management system" and "DPPMS" refers to a hardware and/or software system, or a combination of hardware and software, controlled by a provider entity and configured to facilitate a device protection program and may be configured to communicate and synchronize with one or more third party systems. The device protection program management system may perform one or more subscriber enrollment of DPPMS subscriber profile data objects associated with a device protection program, fraud protection of claims associated with a device protection program, and/or fulfillment of subscriber claims associated with a device protection program. In an example embodiment, a device protection program management system includes at least an enrollment management subsystem, a fraud protection subsystem, and a fulfillment subsystem. In some embodiments, a device protection program management system includes a payment subsystem and/or a policy subsystem. In some embodiments, the DPPMS includes or is communicable with a payment subsystem or equivalent service. In some embodiments, the DPPMS includes a payment system as a subsystem of one of the enrollment management subsystem, fraud protection subsystem, or fulfillment subsystem. In some embodiments, the DPPMS includes a policy subsystem, or equivalent service, as a subsystem of one of the enrollment management subsystem, fraud protection subsystem, or fulfillment subsystem.

The term "DPPMS subscriber profile data object" refers to a subscriber profile data object, or equivalent information, stored on a DPPMS, subsystem therein, or associated datastore. In an example embodiment, one or more databases are configured to store a DPPMS subscriber profile data object in a particular format, a stored information set that includes information about a subscription to a device protection program associated with a user or a client device.

The term "third-party device management system" refers to a third-party managed hardware and/or software system configured to provide third-party information and/or services. In some example contexts, for example, a third-party system is, at least, configured to store, retrieve, access, and/or otherwise manage one or subscriber profile data objects. In some embodiments, a third-party profiling system is one subsystem in a third-party device management system for managing the subscriber profile data object. In some embodiments, a third-party device management system may be configured to store, retrieve, access, and/or otherwise manage equivalent information to a third-party subscriber profile data object. In some embodiments, a DPPMS is configured to communicate with a third-party device management system, or multiple third-party device management systems, through use of an application program interface (API). In particular, the enrollment management request data objects may be directly received via this interface. Other types of interface than an API could be used.

The term "third-party subscriber profile data object" refers to a subscriber profile data object, or equivalent information, stored on a third-party device management system. An example third-party subscriber profile data object is a carrier subscriber profile data object maintained by a mobile carrier when a user enrolls in a device protection program through the mobile carrier at the time a new user device is purchased.

It should be appreciated that, in some embodiments, multiple systems store multiple instances of a single subscriber profile data object or multiple profile data objects related to a subscriber or subscriber device. For example, in some embodiments, a DPPMS and third party may each have profiles related to a particular subscriber or subscriber device, such as multiple protection programs associated with the same device (e.g., a warranty provided by a manufacturer and an extended warranty or insurance coverage provided by a provider entity via the DPPMS). In some embodiments, a third party may store a subscriber profile data object that is unrelated to a protection product (e.g., a carrier providing wired or wireless telecommunications service to a subscriber device or a retailer storing customer information associated with a subscriber device). Further, in some embodiments where multiple systems store multiple instances of a single subscriber profile data object, each instance is stored in a format independent from the format of the other instances. For example, in an example embodiment, a DPPMS stores a DPPMS subscriber profile data object associated with a selected subscription to a device protection program, and a third-party device management system stores a third-party subscriber profile data object associated with the same subscription to the device protection program. In this example embodiment, the DPPMS subscriber profile data object may be stored according to a first profile format, and the third-party subscriber profile data object may be stored according to a second profile format.

The term "third-party enrollment status" refers to data or information that indicates whether a third-party subscriber profile data object exists in a third-party device management system. In some embodiments, a third-party enrollment status indicates whether a particular third-party profile associated with particular identifying information (e.g., subscriber information) exists in a third-party device management system.

The term "third-party enrollment status request data object" refers to a data or information, sent by a DPPMS to a third-party device management system, requesting to identify if the third-party device management system includes a stored third-party subscriber profile data object associated with a particular subscriber identifier data object. A particular third-party enrollment status request data object cause a third-party device management system to query a third-party profile database for an associated third-party subscriber profile data object. In some embodiments, multiple attempts to transmit a third-party enrollment status request data object are made, such that each attempt is identifiable based on an attempt number associated with the transmission (e.g., a first third-party enrollment status request data object, a second third-party enrollment status request data object, a third third-party enrollment status request data object, and so on).

The term "third-party enrollment status response data object" refers to data or information, sent by a third-party device management system to a DPPMS in response to a third-party enrollment status request data object that includes a third-party enrollment status. In some embodiments, a third-party enrollment status response data object includes a third-party subscriber profile data object, or equivalent information, associated with the third-party enrollment status request data object.

The term "third-party subscriber enrollment request data object" refers to data or information, sent by a DPPMS to a third-party device management system, configured to cause the third-party device management system to create or update a third-party subscriber profile data object based on the third-party subscriber enrollment request data object. In some embodiments, a third-party subscriber enrollment request data object includes subscriber information and causes the third-party device management system to create or update the third-party subscriber profile data object based on the subscriber information. In some embodiments, multiple attempts to transmit a third-party subscriber enrollment request data object are made, such that each attempt is identifiable based on an attempt number associated with the transmission (e.g., a first third-party subscriber enrollment request data object, a second third-party subscriber enrollment request data object, a third third-party subscriber enrollment request data object, and so on).

The term "third-party subscriber enrollment response" refers to data or information, sent by a third-party device management system to a DPPMS in response to a third-party subscriber enrollment request data object that indicates whether the third-party device management system successfully created a third-party subscriber profile data object.

The term "third-party subscriber cancellation request data object" refers to data or information, sent by a DPPMS to a third-party device management system, configured to cause the system to cancel, such as by deleting, a third-party subscriber profile data object. In some embodiments, a third-party subscriber enrollment request data object includes subscriber information and causes the third-party device management system to identify and delete a third-party subscriber profile data object associated with the subscriber information.

The term "third-party subscriber cancellation response" refers to data or information, sent by a third-party device management system to a DPPMS in response to a third-party subscriber cancellation request data object that indicates whether the third-party device management system successfully cancelled a third-party subscriber profile data object.

The term "third-party enrollment management request data object" refers generally to a third-party subscriber enrollment request data object, a third-party subscriber cancellation request data object, or to data or information equivalent of either request.

The term "third-party enrollment management response" refers generally to a third-party subscriber enrollment response, a third-party subscriber cancellation response, or to data or information equivalent of either response.

The term "transmission error" refers to an incomplete, unreadable, corrupted, or incorrect communication between a DPPMS and a third-party system. An example transmission error is an incomplete or corrupted third-party subscriber enrollment request data object between a DPPMS and a third-party device management system. Another example transmission error is an incomplete third-party subscriber cancellation request data object between a DPPMS and a third-party device management system. Other non-limiting examples of a transmission error include a third-party system error (e.g., indicating the third-party system is unable to receive and/or respond to a request), protection program overlap error (e.g., indicating, when a subscriber enrollment request is sent associated with a device protection program, that the subscriber is already enrolled in the device protection program or an associate device protection program), request processing error (e.g., indicating a transmitted request data object could not be processed at this time), and/or a request timeout error (e.g., indicating that response signals associated with a request data object have not been received for longer than a request timeout threshold).

The term "third-party subscriber cancellation response" refers to data or information, sent by a third-party device management system to a DPPMS in response to a third-party subscriber enrollment request data object that indicates whether the third-party device management system successfully cancelled a third-party subscriber profile data object.

The term "third-party subscriber enrollment error" refers to data or information, received by a DPPMS in response to a third-party subscriber enrollment request data object, that indicates transmission of a third-party subscriber enrollment request data object to a third-party device management system was unsuccessful, incomplete, or otherwise failed.

The term "transmission error data object" refers to data or information, received by a DPPMS in response to a transmission error, indicating that an earlier attempted transmission to a third-party system failed. In some embodiments, a DPPMS receives a transmission error in response to transmitting a third-party enrollment status request data object. In some embodiments, a DPPMS receives a transmission error data object in response to a third-party subscriber enrollment request data object. In some embodiments, a transmission error includes information indicative of the transmission error, such as information identifying a specific third-party enrollment status request data object that failed, or a specific third-party subscriber enrollment request data object that failed). In some embodiments, the transmission error data object is generated by the DPPMS in response to the DPPMS detecting a transmission error when sending information to or receiving information from a third-party system. For example, if a third-party system initiates communication with a DPPMS but the message is incomplete or insufficient information is received, a transmission error data object may be generated.

The term "error classification set" refers to one or more pre-defined error classifications that a received error may be associated with. An example error classification set includes a "retriable error", and an "escalation error". In a particular example, an error that is identified as a retriable error is associated with a first error handling instructions set (e.g., determining a request retry time and attempting a subsequent transmission of a failed request after the retry time elapses) and an escalation error is associated with a second error handling instructions set (e.g., transmitting an error report to a particular subsystem of the DPPMS, or to a third-party system, for manual intervention).

The term "error classification data object" refers to an identifier associated with an error received by a DPPMS that identifies an error type and corresponding error handling instructions set representing an error handling protocol. In an example embodiment, a particular error classification identifies a retriable error, and a second error classification identifies an escalation error.

The term "request retry time" refers to a length of time that must elapse between subsequent transmission attempts, such as a third-party enrollment status request data object or a third-party subscriber enrollment request data object, in response to a retriable error received after a failed transmission from a DPPMS to a third-party device management system.

The term "retry attempt number" refers to a number of transmission attempts, or failed transmission attempts, of a request between a DPPMS and a third-party device management system. In an example embodiment, a DPPMS tracks a retry attempt number, such that the number of failed transmissions is identifiable using the retry attempt number.

The term "retry maximum threshold" refers to a maximum number of retransmission attempts allowed corresponding to a particular retriable error. In an example embodiment, a DPPMS sets a determinable retry maximum threshold (e.g., a retry maximum of 10) such that the DPPMS may not attempt to retransmit a failed transmission more than a retry maximum threshold.

The term "retry relationship" refers to a comparison or other relationship between a retry attempt number and a retry threshold. A retry relationship, in some embodiments, is associated with a "retry relationship result data object," which refers to electronically managed data, for example a Boolean data value, indicating whether a DPPMS, for example, determined a retry relationship is satisfied. In some embodiments, a retry relationship is embodied by a "retry maximum relationship" that represents a comparison between a retry attempt count and a retry maximum threshold, such that a corresponding retry relationship result data object indicates the relationship is satisfied when the retry attempt count is less than, or less than or equal to, the retry maximum threshold. In another particular example, a retry relationship is embodied by a "retry minimum relationship" that represents a comparison between a retry attempt count and a retry minimum threshold, such that a corresponding retry relationship result data object indicates the relationship is satisfied when the retry attempt count is greater than, or greater than or equal to, the retry minimum threshold.

The term "error handling instructions set" refers to computer code instructions and/or electronic data representing one or more actions a DPPMS performs in response to receiving an error in response to an attempted transmission to a third-party device management system. In some embodiments, a different error handling instructions set is associated with each distinct error classification. In some embodiments, an error handling instructions set defines a retry protocol including one or more attempts to retry a failed transmission. For example, in an example embodiment, a request retry time is determined by exponential back off, such that a request retry time for subsequent transmission attempts is determined by doubling the previous request retry time (e.g., wait 5 minutes before retransmission attempt number 1, wait 10 minutes before retransmission attempt number 2, wait 20 minutes between retransmission attempt number 3, wait 40 minutes between retransmission attempt number 4, and so on). Alternatively or additionally, other error handling instructions set include determining a retry maximum threshold. For example, in some embodiments, a DPPMS is configured to, in accordance with an identified error handling instructions set, determine a retry maximum threshold and track a retry attempt number such that a retry relationship is determinable based on the retry attempt number and the retry maximum threshold. In an example embodiment, a DPPMS is configured to determine if a retry relationship satisfies a retry maximum threshold. For example, in an example embodiment, a retry relationship satisfies a retry maximum threshold when a retry attempt number is equal to the retry maximum threshold. In some embodiments, the error handling instructions set may define an error handling protocol including various operations that are variable and dependent upon the DPPMS and/or third-party system. In some embodiments, a server load may be used to determine the operations performed of an error handling protocol depending on whether either system is saturated or whether a response time is too long from either system. In some embodiments, the third-party system may instruct the DPPMS to set or modify an error handling protocol.

The term "error handling event" refers to a data transmission, data transformation, or other action a DPPMS performs as part of an initiated error handling instructions set. In some embodiments a particular error handling instruction set embodies multiple error handling events defining an error handling protocol for responding to a retriable error received in response to a failed transmission (e.g., a third-party subscriber enrollment error received in response to a failed third-party subscriber enrollment request data object). An example error handling instructions set represents the following error handling events: [1] identifying a retry maximum threshold [2] identifying a retry attempt number [3] determining a retry relationship based on the retry attempt number and the retry maximum threshold [4] determining if the retry relationship satisfies the retry maximum threshold (e.g., by comparing to see if the retry attempt number is equivalent to the identified retry maximum threshold) and, if it does not, [5] retransmitting the failed transmission, or if it does [6] adding the retriable error to an error escalation queue.

The term "escalation queue" refers to a stored set of transmission errors, such as escalation errors and/or retriable errors escalated in accordance with an error handling instructions set. In some embodiments, an escalation queue is stored in a datastore associated with a DPPMS. In some embodiments, a DPPMS creates and manages an escalation queue configured to store one or more third-party transmission errors. In some embodiments, an escalation queue stores a third-party transmission error until a determined time where a DPPMS transmits the third-party transmission error, or equivalent information, to one or more third-party error handling systems. In some embodiments, an escalation queue stores a third-party transmission error until a human operator performs a manual operation associated with the third-party transmission error.

The term "error escalation request" refers to data or information, sent by a DPPMS to an error handling subsystem of the DPPMS, an error handling system associated with the DPPMS, or a third-party error handling system. In some embodiments, a DPPMS transmits an error escalation request in an error handling event as part of an error handling instructions set executed and/or initiated in response to receiving an escalation error. In some embodiments, a DPPMS transmits an error escalation request in an error handling event as part of an error handling instructions set when a retry attempt number equals a retry maximum threshold.

The term "third-party case" refers to an information set generated, retrieved, and/or otherwise compiled by a third-party system in response to a device incident associated with a subscriber device. For example, a user may report a loss incident (e.g., the loss or theft of a subscriber device) to a third-party system. In an example system, the third-party system generates a third-party case associated with the subscriber device and loss incident. In some embodiments, a third-party case includes "third-party case information." Third-party case information refers to information stored in, or associated with, a third-party case. In an example embodiment, case information includes a third-party case identifier, a subscriber identifier data object and/or subscriber device identifier, a subscriber name, a subscriber report type (e.g., damage, loss, theft, and the like). Additionally, in some embodiments, third-party case information includes subscriber authentication information for validating that the third-party system authenticated the user that reported the device incident.

The term "claim data object" and "claim" refers to electronically managed data comprising an information set generated or received by a DPPMS associated with a request for coverage of a subscriber device in response to a loss or policy incident associated with a device protection program. In some embodiments, a claim data object includes at least (1) device identification information and/or a corresponding subscription profile associated with a particular subscriber device, (2) a date lost timestamp, and (3) a claim type (e.g., loss, theft, accidental damage, mechanical breakdown, and/or the like). In some embodiments, a claim data object further includes (1) third-party case information associated with a corresponding third-party case, and/or (2) additional subscription information, a subscription profile, or a subscription profile identifier. In some embodiments, a claim data object is received directly via a DPPMS, for example via a web portal accessed by a user via a client device. In some embodiments, a claim data object is generated after a DPPMS receives user case information associated with received third-party case information. A claim data object may be associated with a request for compensation, repair, or replacement of a subscriber device.

The term "claim information" refers to data relating to a claim that has been generated associated with a device protection program. Additionally, in some embodiments, claim information includes information associated with the claim, the subscriber associated with the claim, the subscriber information associated with the claim, the subscriber device associated with the claim, and the like. In an example embodiment, claim information includes at least third-party case information received from a third-party system.

The term "claim processing protocol" refers to one or more actions performed to execute, process, or fulfill a claim. In some embodiments, a DPPMS, or a fulfillment subsystem of a DPPMS is configured to identify a claim processing protocol associated with a claim and/or claim information. Additionally or alternatively, in some embodiments, a DPPMS (e.g., a fulfillment subsystem of a DPPMS) is configured to execute a claim processing protocol.

The term "device information" refers to data, information, or the like associated with a subscriber device, one or more components of a subscriber device, and/or usage of a subscriber device. Examples of device information include one or more device identifiers, serial numbers, component identifiers or serial numbers, device model or make information, or the like. Further examples of device information include location data associated with the subscriber device, application access information (e.g., last logged execution of a particular application), subscriber device settings, and/or the like.

The term "real-time" refers to retrieving particular information at a desired time or upon request for immediate or near-immediate use of the data (e.g., within a predetermined timeframe, for example within 5 seconds, within a minute, or the like). In some embodiments, device information may be retrieved in real time, referred to as "real-time device information." In some embodiments, a DPPMS retrieves real-time device information from a third-party device management system, where the third-party device management system is either (1) configured to identify the real-time device information by contacting the subscriber device in real-time, or (2) configured to retrieve and store some or all of the real-time device information from the subscriber device at an earlier time, for example when the third-party device management system is informed of a claim associated with the subscriber device.

In some embodiments, real-time device information includes device identification information retrieved in real-time, such as a device identifier, a MAC address, an IP address, or the like. Alternatively or additionally, in other embodiments, real-time device information refers to information associated with usage of the subscriber device (e.g., whether one or more apps were accessed, when one or more apps were accessed, whether one or more location settings were enabled on the subscriber device, or the like).

For example, in some embodiments, a device location application is accessible from a second user device, where the device location application is configured to provide a location associated with the subscriber device. Accordingly, in some embodiments, real-time device information includes device location application status indicating whether the device location application was enabled at the time the user submitted an incident to the third-party device management system, or DPPMS. In some embodiments, a device loss application is accessible from a second user device, where the device loss application is configured to cause the subscriber device to make inaccessible some, or all, functionality associated with the subscriber device and/or display information associated with the subscriber (e.g., contact information) by setting a device loss status indicating the subscriber device has been lost, and/or restore functionality associated with the device loss application status by setting a device loss status indicating the subscriber device is not lost. Accordingly, in some embodiments, real-time device information includes the device loss status associated with the device loss application. It should be appreciated that, in some embodiments, the device loss application and device location application are provided via a single software application, web module, and/or the like.

Additionally or alternatively in some embodiments, real-time device information refers to information associated with prior incidents reported by associated with the subscriber device and/or associated subscriber. For example, real-time device information includes an open repairs list associated with the subscriber device (which includes the currently pending repairs associated with the subscriber device), an incidents remaining list, and/or a prior replacement status (indicating whether the subscriber device has been replaced previously, such as via a claim associated with the third-party device management system or DPPMS).

The term "fraud protection protocol" refers to one or more actions a DPPMS, or subsystem therein (e.g., a fraud protection subsystem), performs in response to receiving claim information. A fraud protection protocol includes one or more actions designed to detect fraudulent claim information. A particular example of a fraud protection protocol includes one or multiple fraud protection events.

The term "fraud protection event" refers to a data transmission, data transformation, or other action a DPPMS, or subsystem therein (e.g., a fraud protection subsystem), performs as part of a fraud protection protocol. An example particular fraud protection protocol includes the following fraud protection events: [1] retrieving real-time device information, from a subscriber device, associated with a most recent device location application usage, and [2] identifying whether the real-time device information is within an acceptable device search threshold. In an example embodiment, a fraud protection event retrieves, in real-time from the subscriber device or a system linked to the subscriber device, a most recent usage of a software application configured to locate the subscriber device, determine a relationship between the most recent usage information and a device search threshold, and identify whether the most recent usage information, retrieved in real-time, satisfies the device search threshold.

The term "action process" and "action process instance" refers to a microservice, software module instance, or the like, executed or managed by a DPPMS, or a submodule therein, configured to fulfill, or otherwise process, a particular type incoming request transmitted from a third-party system. An example action process is an instance of a software module configured to process one or more new enrollment requests received from a third-party system, such as a mobile carrier system. In some embodiments, an action process is executed with one or more process threads configured to process one or more unprocessed actions stored in one or more action queues.

Multiple action process instances ("action processes") may be executed in parallel at a given time. Accordingly, the term "executed instance number" represents a total number of executed action processes.

The terms "process thread(s)" or "thread(s)" refers to one or more streams of simultaneous or semi-simultaneously executing tasks on one or more processors distributed across a single computing instance or multiple computing instances, for example one or more servers comprising one or more processors, or associated with one or more processing modules therein. An example process thread is configured to complete an enrollment request transmitted from a third-party system. In some embodiments, an executed action process includes one or more process threads for completing requests transmitted to the action process. In some embodiments, an action process is associated with a "process thread count maximum," which represents the total number of process threads that can be executed associated with a particular action process. The term "process thread count" refers to a total number of process threads executed on, or otherwise associated with, a particular action process.

The term "action queue" refers to an unperformed request set, received by one or more third-party systems, to be processed by one or more action processes. An example action queue is configured to store enrollment requests transmitted by a third-party system, such as a third-party device management system, to a DPPMS. An action queue is associated with a queue length, which refers to the number of unperformed requests present in a corresponding action queue.

The term "queue relationship" refers to a particular mathematical or algorithmic comparison between a queue length and a queue length threshold. A queue relationship is associated with a "queue relationship result data object," which refers to electronically managed data, for example a Boolean data value, indicating whether a DPPMS, for example, determined a queue relationship is satisfied. In a particular example, a queue relationship is embodied by a "maximum queue relationship" that represents a comparison between a queue length and a queue length maximum threshold, such that a corresponding queue relationship result data object indicates the relationship is satisfied when the queue length is less than, or equal to or less than, the maximum queue threshold. In another particular example, a queue relationship is embodied by a "minimum queue relationship" that represents a comparison between a queue length and a queue length minimum threshold, such that the corresponding queue relationship result data object indicates the relationship is satisfied when the queue length is greater than, or greater than or equal to, the minimum queue threshold.

The term "queue length threshold" refers to a number, which when satisfied by a queue relationship for a queue length of a particular action queue, triggers the DPPMS to update an action process instance set. In a particular example, a queue length threshold is a "queue length maximum threshold," representing a maximum queue length at which an action process instance set must be updated. In some embodiments, a maximum queue relationship satisfies a queue length maximum threshold when the maximum queue relationship represents the queue length exceeds the queue length maximum threshold. In some embodiments, when the maximum queue relationship satisfies the queue length maximum threshold, such as by exceeding it, a new action process instance is executed by the DPPMS, and/or added to the action process instance set. In a particular example, a queue length threshold is a "queue length minimum threshold," representing a minimum queue length at which an action process instance set must be updated. In some embodiments, a minimum queue relationship satisfies a queue length minimum threshold when the minimum queue relationship represents the queue length is less than a queue length minimum threshold. In some embodiments, when the minimum queue relationship satisfies the queue length minimum threshold, such as when the queue length is lesser than it, a selected action process instance is terminated from the executed action process instance set.

In some embodiments, a queue length threshold, queue length minimum threshold, and/or queue length maximum threshold, are each a determined, identified, or otherwise set number (e.g., 20). In some embodiments, a queue length maximum threshold and a queue length minimum threshold are set to an equivalent number. In some embodiments, a queue length maximum threshold and a queue length minimum threshold are set to unequal numbers. For example, in a particular embodiment, a queue length minimum threshold is less than the queue length maximum threshold (e.g., a queue length minimum threshold of 20 and a queue length maximum threshold of 100). In some embodiments, the queue length minimum threshold is zero, such that executed action process instances are scaled down once all unprocessed actions in an action queue have been resolved.

The term "action process instance count maximum" refers to a maximum number of action processes that may be initialized and executing at one time. In an example embodiment, each action process is associated with a number of executed API transactions, and an action process instance count maximum is set according to a maximum number of allowed API transactions per unit of time for all executed action processes, or all executed action processes associated with a particular action queue or type of unprocessed action.

The term "action process instance count minimum" refers to a minimum number of action processes that may be initialized and executing at one time. Some embodiments determine an action process instance count minimum. In some embodiments, an action process instance count minimum is pre-determined.

The term "maximum process instance relationship" refers to a mathematical or algorithmic comparison between an executed instance number and an action process instance count maximum threshold. A maximum process instance relationship is associated with a "maximum process instance relationship result data object," which refers to electronically managed data, for example a Boolean data value, indicating whether a DPPMS, for example, determined a maximum process instance relationship is satisfied. In some embodiments, a maximum process instance relationship is a comparison that satisfies an action process instance count maximum when a corresponding executed instance number is less than, or less than or equal to, the action process instance count maximum.

The term "minimum process instance relationship" refers to a mathematical or algorithmic comparison between an executed instance number and an action process instance count minimum threshold. A maximum process instance relationship is associated with a "minimum process instance relationship result data object," which refers to electronically managed data, for example a Boolean data value, indicating whether a DPPMS, for example, determined a minimum process instance relationship is satisfied. In some embodiments, a process instance relationship is a comparison that satisfies an action process instance count minimum threshold when a corresponding executed instance number is greater than the action process instance count minimum.

The term "system synchronization event" refers to one or more actions performed by a DPPMS, or by one or more subsystems therein, to synchronize one or more DPPMS subscriber profile data objects according to a third-party subscriber profile data object. For example, in an example embodiment, a DPPMS is configured to identify a third-party subscriber profile data object and a DPPMS subscriber profile data object include inconsistent information and synchronize the DPPMS subscriber profile data object based on the information in the third-party subscriber profile data object. Alternatively or additionally, in another example embodiment, a DPPMS is configured to, based on a received third-party enrollment status response data object, identify a third-party device management system cancelled a third-party subscriber profile data object associated with a subscriber identifier data object, and cancel a DPPMS subscriber profile data object associated with the subscriber identifier data object. In some embodiments, the system synchronization event includes transmitting one or more enrollment management requests. For example, in some embodiments, a DPPMS transmits a third-party subscriber enrollment request data object or a third-party subscriber cancellation request data object to synchronize a third-party device management system. In other embodiments, the DPPMS updates one or more subscriber profiles, or subscriber profiles of one or more subsystems, during a system synchronization event.

System Architecture

Methods, apparatuses, systems, and computer program products of the present disclosure may be embodied by any of a variety of devices in various system architectures. For example, the method, apparatus, system, and computer program product of an example embodiment may be embodied by one or more network devices, such as a server or other entity, configured to communicate with one or more devices, such as subscriber devices, third-party devices, or the like, and one or more third-party servers. Example embodiments include a variety of networked devices operating as servers. Additionally, or alternatively, embodiment methods, apparatuses, systems, and/or computer program product of an example embodiment may be embodied by one or more software modules configured to perform some or all of the operations performed disclosed herein and executed on one or more hardware modules or systems, such as one or more servers connected to a network.

In this regard, FIG. 1 is a block diagram showing a simplified example system within which embodiments of the present disclosure may operate. Specifically, the system includes device protection program management server 102 and third-party device management systems 118A-118C. Each third-party device management system may be connected to at least the device protection program management server 102 via a network, such as communication network 116.

The device protection program management server 102 may be associated with multiple circuitry modules 104-114. In some embodiments, each of the modules 104-114 is embodied by hardware in communication with device protection program management server 102, and specially configured to perform the operations associated with the particular module. In some example systems, some of the modules 104-114 are embodied by software executed on a second server, or hardware component, configured to communicate with device protection program management server 102.

The device protection program management server 102 may be configured, utilizing means such as one or more software and/or hardware modules, to perform various tasks associated with managing subscriptions to device protection programs. Device protection program management server 102 may be configured to store and/or maintain a datastore of subscribers associated with various device protection programs. A subscriber may be a person associated with one or more devices, or a particular device itself. Enrollment subscription and/or cancellation requests associated with a subscriber may be received directly from one or more user and/or subscription devices, such as client device 120, or from one or more third-party servers. For example, device protection program management server 102 may be configured to enroll a new subscriber associated with a device protection plan. Additionally, for example, device protection program management server 102 may be configured to cancel a subscriber associated with a device protection plan.

Device protection program management server 102 may be configured to communicate with one or more third-party device management systems configured for enrollment and/or management of third-party subscriber profile data objects (for example via a third-party profiling system associated with or a subsystem of the third-party device management system), such as third-party device management systems 118A-118C. In some systems, device protection program management server 102 may communicate with the third-party device management systems to verify, validate, receive, and/or synchronize the enrollment status associated with one or more subscribers. For example, third-party device management system 118A-118C may each independently receive enrollment subscription requests and/or enrollment cancellation request data objects associated with one or more device protection programs. Each third-party device management system may be associated with device purchasing and/or protection. For example, a third-party device management system may include a system controlled by a device vendor, device manufacturer, mobile carrier, or other entity, that enrolls users and/or devices in one or more device protection programs fulfilled by the provider entity associated with the device protection program management server 102.

The device protection program management server 102 may additionally provide synchronization and/or processing of enrollment subscription request data object(s) and/or enrollment cancellation request data object(s). For example, the device protection program management server may communicate with one or more other sub-systems and/or components to synchronize subscriber profile(s) and/or corresponding information managed by each sub-system, such that each of the sub-systems may perform one or more actions associated with the stored information. For example, the device protection program management server 102 may synchronize subscriber profile enrollment data with a payment system and/or an invoice processing system (not shown), along with third-party subscriber profile data to ensure that such information is up-to-date and matches. By synchronizing such systems, the device protection program management server 102 enables the systems to communicate to verify enrollment of a particular subscriber at the time a claim arises associated with a device protection program. In this regard, the device protection program management server 102 and/or a third-party device management system may utilize such synchronized data for purposes of validating enrollment in a device protection program and to initiate performance of appropriate service.

When a new device, or device controller, is subscribed to a device protection program through the third-party entity, the third-party device management system may be configured to manage that enrollment and ensure the list reflects the subscribers associated with the corresponding third-party. Accordingly, device protection program management server 102 may be configured to communicate with each third-party device management system to maintain the datastore of all subscribers enrolled through all of the third parties. In other words, device protection program management server 102 may communicate with each of the third-party device management systems 118A-118C to cancel, and/or delete, subscribers from the subscriber datastore associated with the device protection program management server 102 as subscribers cancel via a third-party, and/or may communicate with each of the third-party device management systems 118A-118C to add new subscribers to the subscriber datastore associated with the device protection program management server 102 as new subscribers enroll via a third-party system.

Example processes and operations performed associated with subscriber enrollment management are discussed further herein. Accordingly, the above description is meant to provide an example overview and is not to limit the scope or spirit of embodiments of the present disclosure.

In some embodiments, the device protection program management server 102 of a DPPMS may be configured, utilizing means such as one or more software and/or hardware modules, to perform various tasks associated with managing claims related to device protection programs. Device protection program management server 102 may be configured, for example, to process one or more claims associated with one or more device protection programs. For example, a subscriber may utilize a client device to submit, via a third-party system or directly to the device protection program management server 102, a claim related to a device protection management program. Device protection program management server 102 may then maintain an action queue configured to store one or more actions to be executed associated with a claim.

The device protection program management server 102 may be associated with means, such as the modules 104-114, to perform the operations described above, and further herein. For example, enrollment module 104, or means embodying enrollment module 104, may be configured to perform enrollment subscription and/or cancellation. In some embodiments herein, enrollment module 104, or means embodying enrollment module 104, may include a self-healing submodule, such as self-healing framework 110, configured to perform operations associated with maintaining the subscriber datastore by communicating with one or more third-party device management systems.

Additionally, or alternatively, fraud protection module 106, or means embodying enrollment module 104, may be configured to perform one or more operations for analyzing claims to determine if they are fraudulent, as described further herein. For example, in some embodiments, fraud protection module 106 is configured to identify a fraud protection protocol and execute one or more fraud protection steps in accordance with the fraud protection protocol.

Additionally, or alternatively, fulfillment module 108, or means embodying fulfillment module 108, may be configured to perform one or more operations for fulfilling a claim submitted associated with a device protection program. For example, in some embodiments, fulfillment module 108 is configured to perform one or more fulfilment events associated with a device protection program in response to a claim.

Additionally or alternatively, error classification module 112, or means embodying error classification module 112 may be configured to perform one or more operations for identifying transmission errors. For example, when device protection program management server 102 fails to connect, or loses connection to, a third-party device management system, device protection program management server 102 may receive a transmission error. Error classification module 112 may identify an error classification associated with the received transmission error, and/or execute one or more actions based on the identified error classification. In a particular embodiment, error classification module 112 may be configured to perform one or more operations described below with respect to FIGS. 9 and 10.

Additionally or alternatively, workflow management module 114, or means embodying workflow management module 114, may be configured to perform one or more operations for maintaining one or more action queues. For example, workflow management module 114 may be configured to manage an action queue of unfulfilled claims, an action queue of pending new enrollment subscription requests, and an action queue of pending enrollment cancellation request data objects. In some embodiments, the workflow management module 114 may manage one or more action processes, configured to perform one or more operations associated with managing a corresponding action queue. In a particular embodiment, workflow management module 114 may be configured to perform one or more operations described below with respect to FIGS. 6, 7A, and 7B.

In some embodiments, device protection program management server 102 may be associated with one or more other subsystems for various or specialized purposes. For example, in some embodiments, the device protection program management server 102 is communicable or otherwise associated with a DPPMS payment subsystem for managing payment profiles, transaction information, and/or other payment processing information associated with enrolled subscribers. Additionally or alternatively, in some embodiments, the device protection program management server 102 is communicable or otherwise associated with a DPPMS policy subsystem for managing policy profiles, policy rules and/or requirement information, or other device protection policy information associated with enrolled subscribers. Additionally or alternatively, in some embodiments, the device protection program management server 102 is communicable or otherwise associated with a DPPMS inventory subsystem for managing an inventory of replacement devices (e.g., client devices not in use and/or not configured for use) that may be provided to facilitate fulfilment of a claim associated with a device protection program.

Figure 2:
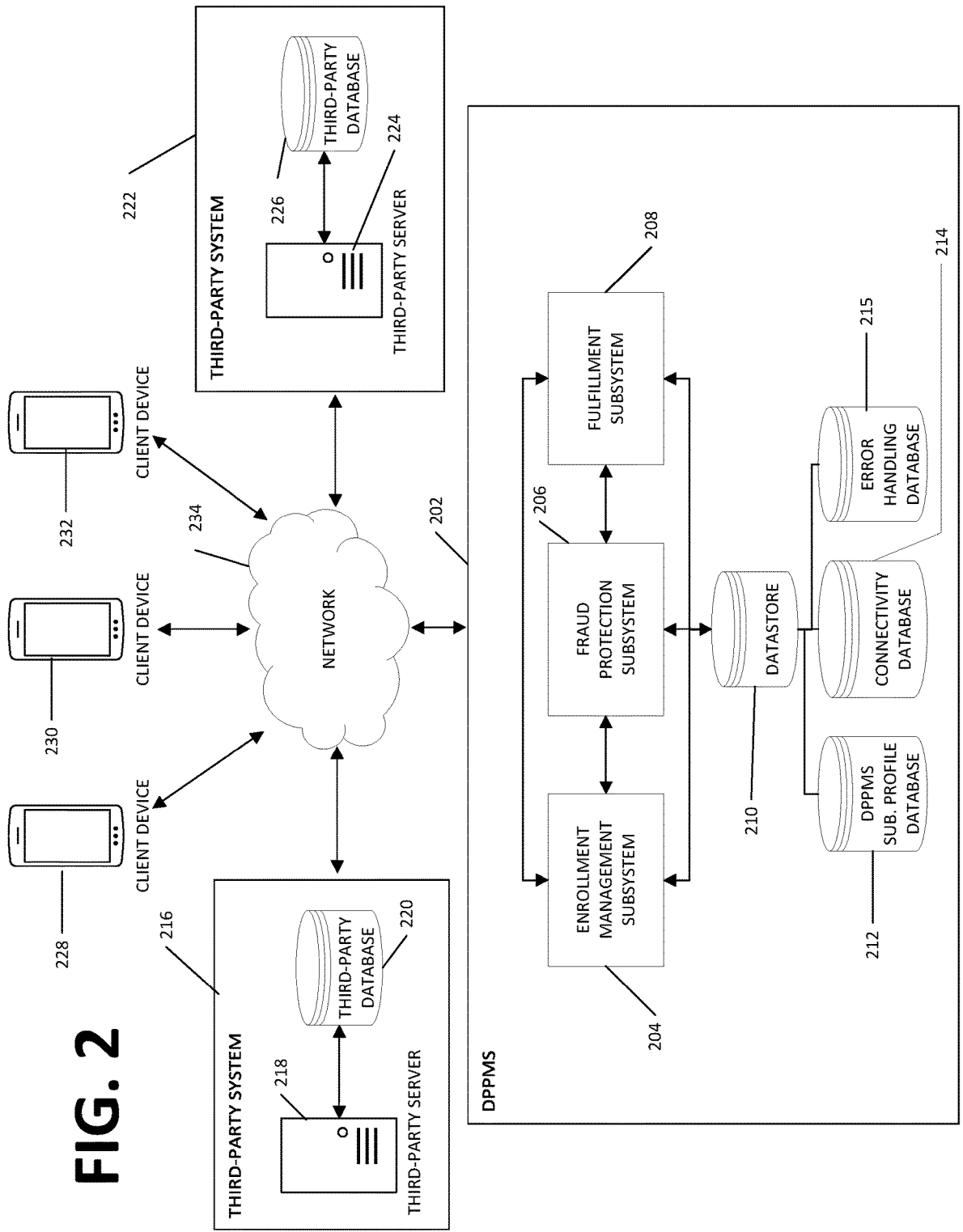
FIG. 2 illustrates a block diagram of a system that may be specially configured, within which embodiments of the present disclosure may operate.

FIG. 2 illustrates a block diagram of an example system that may be specially configured according to embodiments of the present disclosure. Specifically, the depicted system includes DPPMS (DPPMS) 202, third-party system 216, third-party system 222, and client devices 228, 230, and 232. Each of these devices is configured to communicate via a network 234.

The client devices 228, 230, and 232 may be embodied by any computing device known in the art, which may comprise one or more processors, memories, and communications interfaces for interacting with the network. Information received from the client devices 228, 230, and 232 may be provided in various forms and via various methods. For example, the client devices 228, 230, and 232 may be laptop computers, smartphones, netbooks, tablet computers, wearable devices, or the like, including any of the devices described herein, and data may be provided and received through various modes of data transmission provided by these consumer devices. In some systems, one or more of the client devices 228, 230, and 232 may be a subscriber device according to the embodiments described herein. In other embodiments, the client devices 228, 230, and 232 may be other devices controlled by a subscriber user enrolled in at least one device protection program via the DPPMS 202. In some embodiments, one or more of the client devices 228, 230, and 232 may be utilized to transmit a claim, an enrollment subscription request, an enrollment cancellation request data object, or the like, to a third-party system, such as third-party system 216 or 222, and/or to the DPPMS 202. In an example system, client or user device may be both a subscriber device, and a device utilized to transmit a claim.

The third-party systems 216 and 222 may be configured to perform at least one or more operations associated with enrolling in, and/or cancelling enrollment in, a device protection program. As illustrated, each third-party system may include a third-party server, such as the third-party servers 218 and 224, and a third-party database, such as third-party databases 220 and 226. In some embodiments, a third-party system may be configured, utilizing the third-party server and third-party database, for example, to perform additional operations, such as an enrollment status check to determine if a given subscriber is enrolled via the third-party system.

The third-party server, such as third-party servers 218 and 224, may be configured to enable the third-party system, such as third-party systems 216 and 222, to communicate with a network, such as network 234. Each third-party system may be configured to communicate, utilizing the corresponding third-party server, with one or more client devices, such as the client devices 228, 230, and 232. Additionally or alternatively, the third-party system may communicate, utilizing the corresponding third-party server, with DPPMS 202.

Each third-party server may also be associated with, connected to, or otherwise communicable with a corresponding third-party database, such as third-party databases 220 and 226. The third-party databases may be integral with or separate from the corresponding servers. In some systems, third-party database may store at least subscriber information for one or more subscribers associated with the third-party system. For example, each subscriber enrolled via the third-party system may be associated with subscriber information stored in the third-party database, such that the third-party system is configured to function as third-party device management system. Additionally or alternatively, a third-party server may be configured to utilize the corresponding third-party database to perform operations in response to request received from the client devices, such as client devices 228, 230, and 232 (e.g., subscriber devices), or in response to one or more requests received from the DPPMS 202. Specifically, a client device may enroll in a device protection program via the third-party system 222 through communications with the third-party server 224, and the third-party server 224 may enroll the user utilizing third-party database 226 to store subscriber information. The third-party system 222 may, utilizing third-party server 224 and third-party database 226, communicate this new subscriber information with DPPMS 202, such as in response to a third-party subscriber enrollment request data object.

The third-party databases 226 may each be embodied as a data storage device such as a Network Attached Storage (NAS) device or devices, or a separate database server or servers. The third-party databases 220 and 226 may each include, among other data, user data, subscriber data, subscriber information, subscriber identifier data objects, subscriber device information, or other data. It would be readily appreciated that each of the third-party databases 220 and 226 may be a single database, multiple databases, or a combination of several components configured for storing information. In some embodiments, each type of data and/or information stored may be in a separate storage component.

The DPPMS, or DPPMS, 202 may include various means for performing a myriad of actions associated with device protection program management, such as subscriber enrollment, subscriber cancellation, error handling, claims management, and the like. Accordingly, the DPPMS 202 may include various software and/or hardware submodules configured to perform one or more operations described herein. For example, as illustrated, the DPPMS 202 may include an enrollment management subsystem 204, a fraud protection subsystem 206, and a fulfillment subsystem 208. Additionally or alternatively, one or all of the subsystems may be configured to communicate with one or more datastores, such as datastore 210. As described herein, the circuitries and subsystems of the DPPMS 202 may collectively be embodied in one or more physical devices in conjunction with software configuring the devices to perform the operations described herein, which may be local or remotely operated relative to a provider entity.

Enrollment management subsystem 204 may include means, such as software and/or hardware, configured to perform various tasks related to managing subscriber and/or subscriber device enrollment to a device protection program. For example, enrollment management subsystem 204 may be configured to, in conjunction with other subsystems and/or datastore 210, facilitate the enrollment subscription to a device protection program. In other words, enrollment management subsystem 204 may be configured to, in conjunction with other subsystems and/or datastore 210, facilitate the addition of subscribers and/or subscriber devices that are newly covered by and/or enrolled in a device protection program to a list and/or stored data ledger of enrolled subscribers and/or subscriber devices. The enrollment functionality may apply both in a first circumstance to enrollment of a new subscriber, whereby a subscriber is added to the third-party device management system and to the DPPMS, and in a second circumstance to synchronization between the DPPMS and a third-party device management system in the event of an incongruity between the two systems. Additionally, enrollment management subsystem 204 may include means, such as software and/or hardware, configured to perform enrollment cancellation from a device protection program. In other words, enrollment management subsystem 204 may be configured to, in conjunction with other subsystems and/or datastore 210, facilitate the cancellation of a subscriber and/or subscriber device from a device protection program in which the subscriber and/or subscriber device is currently enrolled. In some embodiment systems, enrollment subscription and/or cancellation may occur due to user communication with a third-party system, such as communication between client device 228, 230, or 232, and one or more of the third-party systems 216 and 222. For example, a user may, through the client device 228 (e.g., a mobile device), communicate with third-party system 216 to enroll in a device protection program via the third-party system (e.g., through a mobile device carrier associated with the mobile device), which may subsequently communicate with the DPPMS 202 to communicate that a new subscriber has enrolled. Additionally or alternatively, for cancellation, a user may, through the client device 228 (e.g., a mobile device), communicate with third-party system 216 to cancel enrollment associated with a device protection program via the third-party system (e.g., through a mobile device carrier associated with the mobile device), which may subsequently communicate with the DPPMS 202 to identify that the user has cancelled their subscription to the device protection program. Enrollment management subsystem 204 may be configured to perform other operations for maintaining an accurate subscriber and/or subscriber device list, such that a subscriber and/or subscriber device may be identified, associated with a particular device protection program in which they are enrolled, and subsequent claims may be appropriately handled (e.g., such as via fulfillment).

Fraud protection subsystem 206 may include means, such as software and/or hardware, configured to detect fraudulent claims associated with a device protection program. For example, the fraud protection subsystem 206 may be configured to identify and execute a fraud protection protocol in response to receiving a claim or claim information. The fraud protection subsystem may run in conjunction with the fulfillment subsystem and/or enrollment subsystem to detect fraudulent activity in claim fulfillment and/or enrollment processes. A fraud protection protocol may include one or more fraud protection events, where each fraud protection event may influence the fraud protection subsystem 206 determination of a fraudulent claim. In a particular example system, fraud protection subsystem 206 is configured to perform a particular fraud protection event by retrieve real-time device information associated with, or from, a subscriber device to determine actions performed by a user with regard to the subscriber device.

For example, fraud protection subsystem 206 may retrieve real-time device information from a third-party device management system via one or more APIs in response to submission of a claim or an indication of fraudulent activity. For example, the fraud protection subsystem 206, may, via one or more APIs, communicate with the third-party device management system to retrieve real-time device information captured from the subscriber device at the time a claim was reported to the DPPMS or third-party device management system.

In some embodiments, the fraud protection subsystem 206 retrieves a device location application status from a third-party device management system in real-time, which may indicate whether a device location application was enabled at the time the incident was reported. The fraud protection subsystem 206 may utilize the device location application status to determine deny a claim as a fraudulent claim risk based on at least on the device location application status and third-party identity associated with the third-party device management system. For example, in some embodiments, if the third-party device management system is a device manufacturer system (e.g., an OEM system), the fraud protection subsystem 206 may deny a claim based on fraud risk if the device location application status indicates the device location application is not enabled (and thus the device location application cannot be used to locate the subscriber device location).

In some embodiments, the fraud protection subsystem 206 retrieves, from a third-party device management system in real-time, a device loss status, which indicates whether a device loss application was utilized to set the device loss status as lost before the incident was reported. In some embodiments, the fraud protection subsystem 206 determines a fraudulent claim risk associated with a claim based on at least the device loss status, and/or at least the device loss status and the device location application status. In an example embodiment, if the third-party device management system from which the claim originated is a device manufacturer, the fraud protection subsystem 206 may suspend authorizing a claim when a device location application status indicates the device location application is enabled but a corresponding device loss status has not been set to lost mode. In some embodiments, the device loss status may be stored by a system and/or database associated with the device loss application and may be accessed by the fraud protection subsystem 206 to identify the device loss status. In some such embodiments, the device loss status may be retrieved from the system and/or database in real-time.

In some embodiments, the fraud protection subsystem 206 may determine the allowability of a claim based on a third-party identity associated with the third-party device management system, a claim type (e.g., a loss claim, a stolen claim, a damage claim, or the like), a device location application status, and the device loss status. For example, in some embodiments, if the third-party identity associated with the third-party device management system from which the claim originated is a mobile carrier system and an associated claim is a loss claim or a stolen claim, the associated claim may be approved only if the device location application status indicates the device location application is not accessible. Alternatively or additionally, for example, if the third-party identity associated with the third-party device management system from which the claim originated is a device manufacturer and the associated claim is a loss claim or a stolen claim, the associated claim similarly may be approved only if (1) the device location application status indicates the device location application is inaccessible or (2) the device location application status indicates the device location application is accessible and the device loss status has been set to a lost state. Further, additionally or alternatively in some embodiments, regardless of the third-party identity associated with the third-party device management system from which the claim originated, if the associated claim is a damage claim, the associated claim may be approved only if the device location application status indicates the device location application is inaccessible.

In some embodiments, the fraud protection subsystem 206 may be configured to communicate with one or more third-party device management system(s) to identify whether a subscriber device associated with a pending claim data object is associated with a pending third-party claim data object, or fulfilled third-party claim data object, managed by the third-party device management system. In this regard, the fraud protection subsystem 206 may reject and/or mark an unprocessed claim data object for further review due to possible fraud in a circumstance where the fraud protection subsystem 206 analyzes such data, for example retrieved in real-time at the time of processing a claim data object, to determine a subscriber device is associated with two pending claims data objects maintained via two separate systems, or where such data retrieved and analyzed in real-time indicates a previous claim data object associated with the subscriber device has already been fulfilled. Additionally or alternatively, the fraud protection subsystem 206 may be configured to communicate with one or more third-party device management system(s) to identify whether a subscriber device is associated with one or more repair and/or replacement actions performed by a third-party entity associated with the third-party device management system(s). In this regard, the fraud protection subsystem 206 may be configured to retrieve and analyze such data in real-time, for example during processing of a claim data object by the fulfillment subsystem 208 and/or one or more associated subsystems, to reject and/or mark an unprocessed claim data object for further review due to possible fraud in a circumstance where the retrieved data indicates the subscriber device has already been serviced and should no longer be in the possession of the associated user.

In some embodiments, the fraud protection subsystem 206 retrieves an open repairs list from a third-party device management system in real-time, which includes the currently pending repairs associated with the subscriber device. Accordingly, utilizing the open repairs list, the fraud protection subsystem may determine whether the subscriber has already initiated a claim associated with the subscriber device through the third-party device management system. In some embodiments, the fraud protection subsystem 206 is configured to deny a claim after determining, based on the open repairs list retrieved in real-time, that the subscriber device is already associated with an open claim.

In some embodiments, the fraud protection subsystem 206 retrieves, from a third-party device management system in real-time, an incidents remaining list, which includes incidents available to consume. The incidents available to consume may define a number of claim types permissible under a particular device protection program within a particular time interval. For example, the incidents remaining list may include one or more claim types that remain available and/or have been previously processed under a device protection program that a subscriber profile is enrolled in. In an example context, a device protection program may enable an enrolled subscriber to submit a first number of claim data objects of a first claim type (e.g., unlimited mechanical breakdown claims) and a second number of claim data objects of a second claim type (e.g., 2 accidental damage claims) over a predefined time interval, for example 24 months. It should be appreciated that a device protection program may include limitations on any of myriad of claim types, for example in some embodiments, a third number of claim data objects of a third claim type (e.g., 4 loss claims). In this regard, the incidents remaining list may indicate the number of claim data objects for a particular claim type that were processed by the third-party device management system. The fraud protection subsystem 206 may analyze the incidents remaining list to determine if a newly submitted claim data object exceeds the permitted claim data objects processed for the associated claim type under the device protection program. If the fraud protection subsystem 206 determines that a claim data object is to be processed based on the remaining incidents list, the fraud protection subsystem 206 may adjust the remaining incidents list (for example, by decrementing a remaining instances count in the remaining incidents list associated with the claim type for the newly received claim data object), and store the updated remaining incidents list and/or notify the third-party device management system of the updated remaining incidents list. By retrieving and analyzing the remaining incidents list in real-time, for example upon processing of a claim data object, the fraud protection subsystem 206 may enhances fraud detection utilizing the real-time data analysis to identify when a subscriber enrolled in a device protection program has tried to process two claim data objects in violation of the device protection program to which they are enrolled.

Additionally or alternatively, the fraud protection subsystem 206 may analyze the incidents remaining list to route a received claim data object to an appropriate system. For example, the fraud protection subsystem 206, alone or in conjunction with the fulfillment subsystem 208, may determine if a newly submitted claim data object of a particular claim type should, based on the corresponding device protection program for which the subscriber is enrolled, be forwarded to a third-party system, such as a third-party device management system, for processing, or processed by the DPPMS 202. In an example context, the device protection program may define a claim routing rule set, for example where a number of claim data objects of a particular type to be processed by each system (e.g., the first two accidental damage claim data objects are processed by the third-party device management system and all subsequent accidental damage claim data objects are processed by the DPPMS). The fraud protection subsystem 206 and/or fulfillment subsystem 208 may analyze the incidents remaining list to determine whether the claim data object should be routed to a third-party device management system based on the claim routing rule set.

In some embodiments, the fraud protection subsystem 206 retrieves a prior replacement status from the third-party device management system in real-time, which indicates whether the subscriber device has been replaced previously associated with a claim via the DPPMS and/or third-party device management system. Accordingly, in some embodiments, the fraud protection subsystem 206 is configured to identify, based on the prior replacement status, that the subscriber device associated with a claim has already been replaced, via a previous claim, by the third-party provider entity associated with the third-party device management system, or by the DPPMS. In some embodiments, the fraud protection subsystem 206 is configured to deny received claims associated with an already replaced subscriber device as associated with a fraud risk.

In some embodiments, the fraud protection subsystem 206 may utilize a combination of the received information to identify a fraud risk. In some embodiments, if the fraud protection subsystem 206 determines a claim is fraudulent, based on the identified fraud risk, the fraud protection subsystem 206 may deny the claim or otherwise cause the claim to be denied, such as by another subsystem.

Fulfillment subsystem 208 may include one means, such as software and/or hardware configured to receive a claim and perform necessary actions for fulfilling that claim (e.g., one or more fulfillment events). In other words, fulfillment subsystem 208 may perform one or more steps towards resolving a claim associated with a subscriber device that was lost, damaged, stolen, or otherwise affected such that action must be taken to repair, replace, or otherwise restore the device functionality to the subscriber. For example, to process, track, and/or otherwise complete a claim, the fulfillment subsystem 208 may communicate with one or more associated subsystems of the DPPMS and/or one or more third-party systems, and to avoid fraud and synchronize between systems, the fulfillment subsystem 208 may operate in conjunction with the fraud protection subsystem 206 and/or the enrollment management subsystem 204.

The DPPMS, in some embodiments, includes additional DPPMS subsystems (not shown) for various other specific functionality and/or data management. For example, in some embodiments, the DPPMS includes a DPPMS payment system. Additionally or alternatively, in some embodiments, the DPPMS includes a DPPMS policy system. Alternatively or additionally, in some embodiments, one or more of the DPPMS subsystems is further embodied by a subsystem of one of the enrollment management subsystem 204, the fraud protection subsystem 206, and/or the fulfillment subsystem 208, or a combination thereof.

The datastore 210, as well as the individual component databases such as DPPMS subscriber profile data object database 212, connectivity database 214, and error handling database 215, may each be embodied as a data storage device such as a Network Attached Storage (NAS) device or devices, or a separate database server or servers. Additionally, each of these components may include specific or general data related to subscribers and/or subscriber devices, connectivity to third-party systems (such as third-party device management systems), transmission error classification and/or handling, or the like. For example, in an example system, DPPMS subscriber profile data object database 212 may include, among other data, user data, subscriber data, subscriber information, subscriber identifier data objects, subscriber device information, or other data. Further, in the example system, connectivity database 214 may include, among other data, third-party system data, third-party system identifiers, third-party system IP addresses, or other data. Further, in the example system, error handling database 215 may include an error log, error classification data, error codes, or other data. Datastore 210 may be configured to retrieve data from one or more of these component databases and communicate and/or transmit the received data to one or more component subsystems, such as the enrollment management subsystem 204, fraud protection subsystem 206, and fulfillment subsystem 208. It would be readily appreciated that the datastore 210, and/or each of the DPPMS subscriber profile data object database 212, connectivity database 214, and/or error handling database 215, may be a single database, multiple databases, or a combination of several components configured for storing information. In some embodiments, each type of data and/or information may be stored in a separate storage component.

Figure 3:
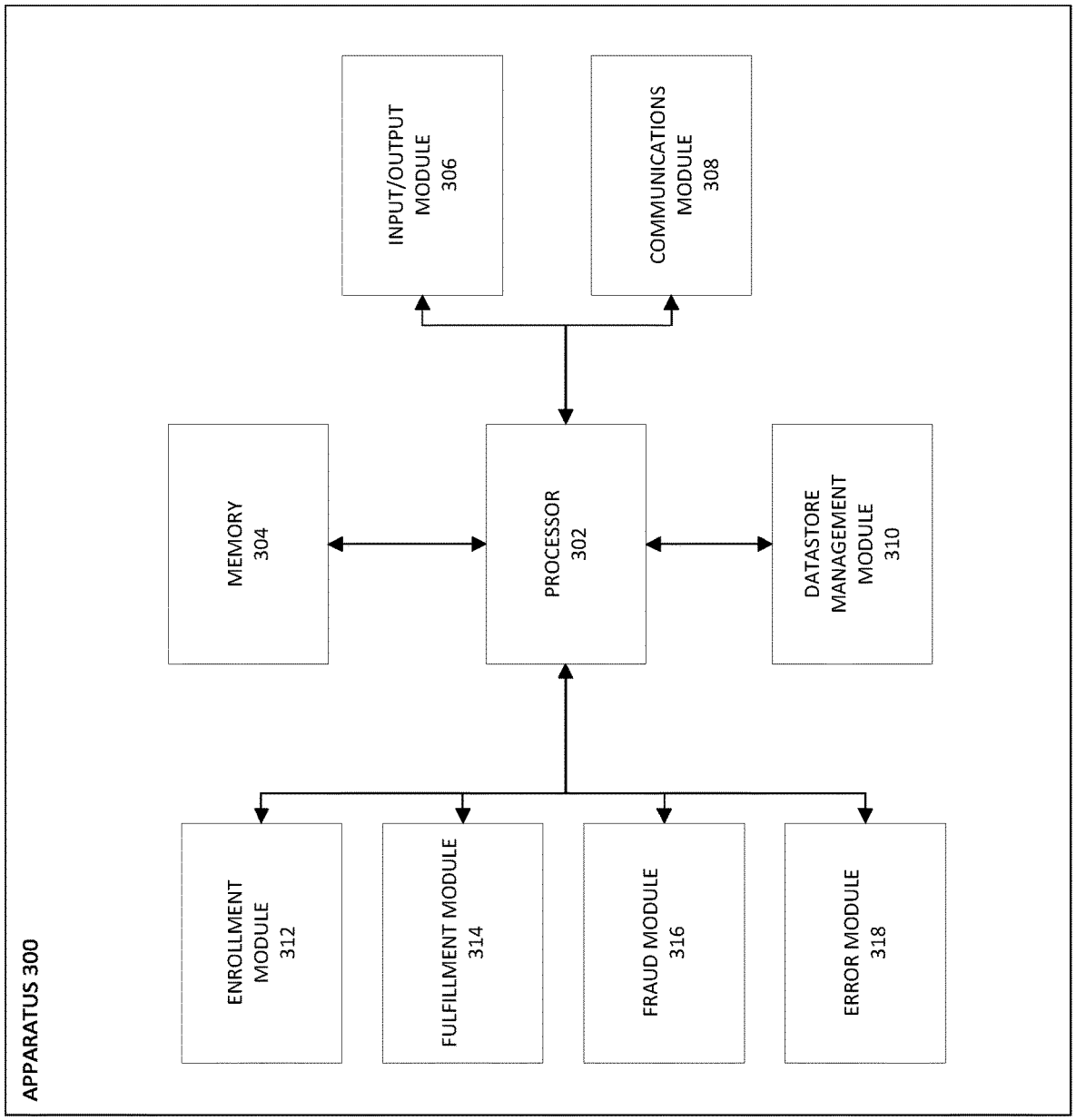
FIG. 3 illustrates a block diagram of an apparatus that may be specially configured in accordance with an example embodiment of the present disclosure.

The DPPMS 202 may be embodied by one or more computing systems, such as one or more of DPPMS apparatus 300 shown in FIG. 3. As illustrated in FIG. 3, the apparatus 300 may include a processor 302, a memory 304, input and/or output module 306, communications module 308, datastore management module 310, enrollment module 312, fulfillment module 314, fraud module 316, and error module 318. The apparatus 300 may be configured to execute some or all of the operations described above with respect to the DPPMS in FIGS. 1 and 2, and below with respect to FIGS. 4A-10. Although these components 302-318 are described with respect to functional limitations, it should be understood that the particular implementations necessarily include the use of particular hardware. It should also be understood that certain of these components 302-318 may include similar or common hardware. For example, two modules may both leverage use of the same processor, network interface, storage medium, or the like, to perform their associated functions, such that duplicate hardware is not required for each module.

The user of the terms "module" and "circuitry" as used herein with respect to components of the apparatus therefore include particular hardware configured to perform the functions associated with the particular module and/or circuitry described. Of course, the terms "module" and "circuitry" should be understood broadly to include hardware, in some embodiments, circuitry and/or module may also include software for configuring the hardware. For example, in some embodiments, "module" and/or "circuitry" may include processing circuitry, storage media, network interfaces, input and/or output devices, and the like. In some embodiments, other elements of the apparatus 30 may provide or supplement the functionality of particular module(s). For example, the processor 302 may provide processing functionality, the memory 304 may provide storage functionality, the communications module 308 may provide network interface functionality, and the like.

Indeed, it should be appreciated that, in some embodiments, one or more modules may be associated with a separate device, server, and/or associated computing hardware, which may be in communication with one or more of the other modules of apparatus 300. For example, in some embodiments, the enrollment module 312 is included in and/or embodied by a separate computing apparatus. The separate computing apparatus, in some embodiments, includes a memory, processor, input/output module, communications module, datastore management module, and/or any combination thereof, that function in a manner similar to the similarly named components as described with respect to apparatus 300. The separate enrollment module 312 computing apparatus may be specially configured, for example via hardware, software, or a combination thereof, to embody one or more action process instances for performing and/or processing enrollment-related actions. Additionally or alternatively in some embodiments, the fulfillment module 314 is included in and/or embodied by a separate computing apparatus, which similarly includes a memory, processor, input/output module, communications module, datastore management module, and/or any combination thereof. The separate fulfillment module 314 computing apparatus may be specially configured, for example via hardware, software, or a combination thereof, to embody one or more action process instances for performing and/or processing fulfillment-related actions. Additionally or alternatively, in some embodiments, the fraud module 316 is included in and/or embodied by a separate computing apparatus, which similarly includes a memory, processor, input/output module, communications module, datastore management module 310, and/or any combination thereof. The separate fraud module 316 computing apparatus may be specially configured, for example via hardware, software, or a combination thereof, to embody one or more action process instances for performing and/or processing fraud-related actions. Each of the separate apparatuses may be specially configured to execute one or more applications for performing the functionality, or a portion thereof, as described herein.

Further, additionally or alternatively in some embodiments, the error module 318 is included in and/or embodied by a separate computing apparatus, which similarly includes a memory, processor, input/output module, communications module, and/or any combination thereof. In yet other embodiments, the error module 318 is included in, and/or shared by, one or more of the separated apparatuses. In this regard, each of the separate apparatuses may, utilizing independent components or shared components, be configured for performing some or all of the error handling functionality described herein with respect to the error module 318.

Each separate computing apparatus, in some embodiments, may be embodied by a plurality of sub-components, sub-devices, sub-systems, and/or the like. For example, in some embodiments, each separate computing apparatus includes a variety of distributed, specially configured cloud servers and/or datastores. In some embodiments, one or more of the computing apparatuses are specially configured as executed action processing instances as described below with respect to FIG. 7. The sub-components, sub-devices, and/or sub-systems of each separate computing apparatus may be communicable with one another, for example via one or more direct connections and/or over one or more networks. Additionally or alternatively, in some embodiments, each of the separate computing apparatuses may be communicable with each of the other separate computing apparatuses.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the terms "processing module" and/or processing circuitry" may be understood to include a single core processor, a multi-core processor, multiple processors internal to the apparatus, and/or one or more separate, remote, or "cloud" processors.

In an example embodiment, the processor 302 may be configured to execute instructions stored in the memory 304 or otherwise accessible to the processor. Alternatively or additionally, the processor 302 may be configured to execute hard-coded functionality. As such, whether configured by hardware or software, or by a combination of hardware with software, the processor may represent an entity (e.g. physically embodied in circuitry) capable of performing operations according to an embodiment of the present disclosure when configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input and/or output module 306 that may, in turn, be in communication with processor 302 to provide output to the user associated with the apparatus 300 and, in some embodiments, receive an indication from the user. The input and/or output module 306 may comprise a user interface and may include a device display that may include a web user interface, a mobile application, a client device, or the like. In some embodiments, the input and/or output module 306 may include a keyboard, a mouse, a joystick, a touch screen, couch areas, soft keys, a microphone, a speaker, or other input and/or output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications module 308 may be any means, such as a device, module or circuitry, embodied in either hardware or a combination of hardware and software that is configured to receive and/or transmit data from and/or to a network and/or any other device, circuitry, or module in communication with the apparatus 300. In this regard, the communications module 308 may include, for example, a network interface for enabling communications with a wired or wireless communications network. For example, the communications module 308 may include one or more network interface cards, antennas, buses, switches, routers, modems, and supporting hardware and/or software, or any other device suitable for enabling communications via a network. Additionally or alternatively, the communications module 308 may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA) FREC, ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

In some embodiments, communications module 308 may facilitate communication with one or more client devices and/or subscriber devices, and/or one or more third-party systems and/or third-party device management systems, as illustrated in FIGS. 1 and 2. For example, communications module 308 may facilitate transmitting information requests and/or responses to a client device and/or third-party system, and/or receiving information requests and/or responses from a client device and/or third-party system.

Datastore management module 310 may be any means that facilitate communication with, and/or management of, a datastore associated with apparatus 300. For example, apparatus 300 may manage a datastore that includes (1) a subscriber list, (2) a third-party system connectivity list, and (3) an error handling data list. Datastore management module 310 may be configured to identify data in these lists, and/or add, cancel, delete, or otherwise manage one or more of these lists. In some embodiment, datastore management module 310 may be associated with one or more of the processor 302, enrollment module 312, fulfillment module 314, fraud module 316, and/or error module 318, to accomplish specific datastore management operations associated with the operations performed by each of the modules 312-318.

Enrollment module 312 may be embodied by any hardware and/or software means that facilitate the addition, cancellation, and other management of subscribers associated with one or more device protection programs. In some embodiments, enrollment module 312 includes hardware and/or software embodying enrollment management subsystem 204, as illustrated in FIG. 2. For example, enrollment module 312 may be configured to, in conjunction with datastore management module 310, processor 302, and/or the like, enroll a new subscriber in a device protection program, such as by adding subscriber information to a subscriber list associated with the new subscriber and/or subscriber device, such that the subscriber information identifies the subscriber device and a corresponding device protection program which the new subscriber enrolled in. Additionally or alternatively, enrollment module 312 may be configured to, in conjunction with datastore management module 310, processor 302, and/or the like, cancel an existing subscriber from a device protection program, such as by marking the subscriber information in the subscriber list associated with the cancelled device protection program, deleting the subscriber information associated with the cancelled device protection program from the subscriber list, or otherwise performing an action such that the subscriber information indicates cancellation of the device protection program.

Enrollment module 312 may also, in conjunction with processor 302, communications module 308, and/or the like, communicate with one or more third-party systems, such as one or more third-party device management systems, to facilitate synchronization with the third-party device management system. For example, enrollment module 312 may be configured to transmit a third-party enrollment status request data object and receive a third-party enrollment status response data object indicating an enrollment status associated with a subscriber or subscriber device in the third-party device management system. Additionally or alternatively, enrollment module 312 may be configured to transmit a third-party enrollment management request data object, and receive a third-party enrollment management response indicating whether a subscriber, subscriber device, or subscriber information was successfully added to the third-party device management system.

In some embodiments, enrollment module 312 may manage an unprocessed enrollment action queue. Additionally or alternatively, in some embodiments, enrollment module 312 may create, execute, delete, distribute to, or otherwise manage one or more action processes associated with the unprocessed enrollment action queue, such that the action processes controlled by the enrollment module 312 process, or otherwise perform the steps to process enrollment management request data objects from the unprocessed enrollment action queue. As the unprocessed enrollment action queue increases in length, the enrollment module 312 may, in accordance with a particular embodiment described herein, be configured to execute additional threads via currently executed action processes, or execute new action processes, to increase the rate at which unprocessed enrollment actions, such as received but unprocessed enrollment management request data objects, are removed from the unprocessed enrollment action queue and processed. Additionally or alternatively, in accordance with a particular embodiment described herein, the enrollment module 312 may be configured to decrease the executed number of threads in a particular executed action process, or terminate an executed action process, when the unprocessed enrollment action queue satisfies a lower threshold, for example when the number of unprocessed enrollment management request data objects falls below a certain lower threshold.

Fulfillment module 314 may be embodied by any hardware and/or software means that facilitate receiving and/or fulfilling a received claim associated with a device protection program. In some embodiments, fulfillment module 314 includes hardware and/or software embodying fulfillment subsystem 206, as illustrated in FIG. 2. For example, fulfillment module 314 may, in conjunction with processor 302, datastore management module 310, and/or the like, identify a device protection program associated with a claim received from a subscriber, and/or identify and execute a claim processing protocol comprising an instruction set associated with the device protection program. In some embodiments, fulfillment module 314 may manage an unprocessed claims action queue. Additionally or alternatively, in some embodiments, fulfillment module 314 may create, execute, delete, distribute to, or otherwise manage one or more action processes associated with the unprocessed claims action queue, such that the action processes controlled by the fulfillment module process, or otherwise perform the steps to fulfill, claim requests from the unprocessed claims action queue. As the unprocessed claims action queue increases in length, the fulfillment module 314 may, in accordance with a particular embodiment described herein, be configured to execute additional threads via currently executed action processes, or execute new action processes, to increase the rate at which unprocessed claims are removed from the unprocessed claims action queue and fulfilled. Additionally or alternatively, in accordance with a particular embodiment described herein, the fulfillment module 314 may be configured to decrease executed number of threads in a particular executed action process, or terminate an executed action process, when the unprocessed claims action queue reaches a lower threshold.

In some embodiments, the fulfillment module 314 is configured to execute one or more device acquisition processes, alone or together with one or more sub-systems, in response to processing a claim data object. For example, the fulfillment module 314 may transmit one or more device acquisition signal(s) to one or more third-party systems, such as a third-party device management system, for purposes of replenishing a device inventory. In a particular example context, the fulfillment module 314 may, in response to fulfilling a claim data object and providing a particular device associated with the claim data object, automatically generate a device acquisition signal and/or transmit the device acquisition signal to a third-party system, where the device acquisition signal causes provision of a new device to a device inventory managed by the fulfillment module 314 or an associated sub-system. In some embodiments, the device acquisition signal is received by the third-party system to prompt a third-party entity associated with the third-party system (e.g., a device manufacturer) to provide a new device that matches certain device specifications associated with a device provided to an enrolled subscriber in response to their claim. Additionally or alternatively, the fulfillment module 314 may automatically retrieve and/or process invoice data associated with a newly acquired device, for example by retrieving invoice data from the third-party system used to acquire the device and storing the invoice data for processing by the fulfillment module 314 and/or an associated invoice management subsystem. In a particular example context, for example, a claim data object may be processed and the fulfillment module 314 may automatically initiate provision of a replace device (e.g., a mobile device having the same model, memory size, and/or other specifications of a subscriber device for a particular device protection program) to a subscriber user in response to a received and processed claim data object. Continuing this example context, in some embodiments, the fulfillment module 314 may additionally or alternatively transmit a device acquisition signal to a third-party system associated with the replacement device (e.g., a third-party system managed by the manufacturer of the replacement device) to automatically initiate provision of a new device having the same device specifications as the replacement device, thus automatically replenishing the inventory of devices matching these device characteristics.

It should be appreciated that, in some embodiments, the executed action processes associated with fulfillment and the executed action processes associated with other actions, such as enrollment, may be separate. In other embodiments, the executed action processes associated with fulfillment and the executed action processes associated with other actions, such as enrollment, may be shared, such that a single executed action process may perform both enrollment and fulfillment actions. Similarly, in some embodiments, a single, combined action queue may store both unprocessed enrollment actions and unprocessed fulfillment actions, while in other embodiments a specific action queue may be dedicated for only unprocessed enrollment actions, and a specific action queue may be dedicated for only unprocessed fulfillment actions. Each action queue may be associated with one or more executed action processing instances configured to process actions of a certain type from one or more corresponding action queues including actions of that type.

Additionally or alternatively, the fulfillment module 314 may be configured to manage one or more scaling services configured for scaling the number of executed action process instances associated with one or more action queues, as described below.

Fraud module 316 may be embodied by any hardware and/or software means that facilitate identifying, or otherwise detecting, fraudulent claims associated with a subscriber to a device protection program. In some embodiments, fraud module 316 includes hardware and/or software embodying fraud protection subsystem 206, as illustrated in FIG. 2. For example, fraud module 316 may, in conjunction with processor 302, datastore management module 310, and/or the like, identify a fraud protection protocol comprising an instruction set associated with a device protection program for which a subscriber submitted a claim. Additionally or alternatively, fraud module 316 may be configured to execute one or more fraud protection events, such as one or more fraud protection events associated with an identified fraud protection protocols. Fraud module 316 may, for example, be configured to extract real-time data associated with, or directly from, a subscriber device. For example, fraud module 316 may be configured to retrieve real-time device information from a third-party device management system via one or more APIs. Examples of real-time device information include a device location application status, a device loss status, an open repairs list, and/or an incidents remaining list. In some embodiments, fraud module 316 utilizes one or more portions of real-time device information to determine a fraud risk associated with a received claim, and/or to accordingly deny or authorize the claim for fulfilment.

Error module 318 be embodied by any hardware and/or software means that enable receiving transmission errors, classifying transmission errors, and/or subsequent error handling associated with transmission errors. Error module 318 may communicate and/or operate in conjunction with one or more modules from the group of enrollment module 312, fulfillment module 314, fraud module 316, and/or communications module 308, to identify transmission errors that result from failed attempted transmissions to third-party systems, such as a third-party device management system. A transmission error may be received, for example, in response to failing to connect to a third-party system, losing connection to a third-party system during, before, or after an information transmission to the third-party system, or as a response to an information transmission to the third-party system. In an example embodiment, error module 318 may be configured to identify an error classification set, including one or more error classifications.

Each error classification may be associated with one or more error handling instructions set. In some embodiments, the error handling instruction set may be identified based on a business rule set for identifying or otherwise determining an error classification. For example, in the error module 318 may maintain one or more error configurations for use in determining an error classification associated with a received transmission error. In some embodiments, each error configuration may include a particular business rule set that, if satisfied, indicates the error classification to be associated with the transmission error. Additionally or alternatively, in some embodiments, the error handling error handling instruction set may be identified based on one or more algorithmic, statistical, and/or machine learning models for identifying an error classification. For example, in some embodiments, an error classification may be identified using a myriad of machine learning implementations. In some example contexts, an unsupervised learning model may be used to identify the error classification. In other example contexts, a supervised learning model may be used to identify the error classification.

In some such embodiments, the algorithmic, statistical, and/or machine learning model utilize various inputs. For example, in some embodiments, the inputs used for error classification include information associated with the transmission error, preferences associated with the DPPMS, preferences associated with the third-party device management system, or the like. In some embodiments, the algorithmic, statistical, and/or machine learning model may, additionally or alternatively, utilize other information associated with the claim, subscriber, DPPMS, or third-party device management system.

In some embodiments, an error may be classified based on various error classifications in an error classification set. For example, an error classification set may include an error classification of "retriable error" and an error classification of "escalation error." A retriable error may be associated with an error handling instruction set representing an error handling protocol including one or more error handling events, such as determining a retry time to wait before putting the failed transmission back in the queue to attempt a subsequent transition, waiting the retry time, and placing the failed transmission in the queue for subsequent transmission. In some embodiments, a retry time may be identified based on the number of failed transmission attempts. For example, a retry time may, upon the first failed transmission, first be identified as a base length of time, such as five minutes. For each subsequent failed transmission, the retry time may double, such that ten minutes is the retry time after the second failed transmission, twenty minutes is the retry time after the third failed transmission, forty minutes is the retry time after the third failed transmission, and so on. In other embodiments, a different relationship may be used to identify the retry time based on the transmission number. In other embodiments still, a relationship may be used to identify the retry time that does not utilize the transmission number, such as by always waiting a pre-determined length of time.

Error module 318 may be able to identify an escalation error handling protocol comprising an instruction set associated with an escalation error, where the escalation handling protocol may include one or more error handling events. An example error handling protocol may be defined by an error handling instructions set comprising including adding the escalation error comprising the failed transmission and/or the transmission error to an escalation queue. For example, an escalation queue may be a queue of transmission errors, and/or the associated failed transmissions, to be transmitted or otherwise communicated to an error handling system and/or third-party handling system for processing. In some embodiments, the transmission error and/or associated failed transmission is transmitted to a third-party error handling system associated with the third-party entity in control of or otherwise associated with the third-party system that communicated and/or is associated with the received transmission error. In an example system, the third-party system that was the intended recipient of the failed transmission is also the third-party system to which escalated errors are transmitted. In other systems, escalated errors, and/or the corresponding failed transmissions, are transmitted to a third-party error handling system for electronic processing by the third-party error handling system. Alternatively or additionally, escalated errors may be transmitted to and/or handled by human operators.

In some embodiments, error module 318 is configured to determine an error configuration associated with the transmission error. The error configuration may include at least an error code, an error classification, and/or an associated retry maximum threshold. In some embodiments, the error module is associated with an error configuration service, such that the error module 318 may identify the error configuration utilizing the error configuration service.

Having described specific components of example embodiment devices and systems involved in the present disclosure, specific example operations performed by embodiments of the present disclosure are described below in connection with the FIGS. 4A-10.

Example Process Operations

Figure 4A:
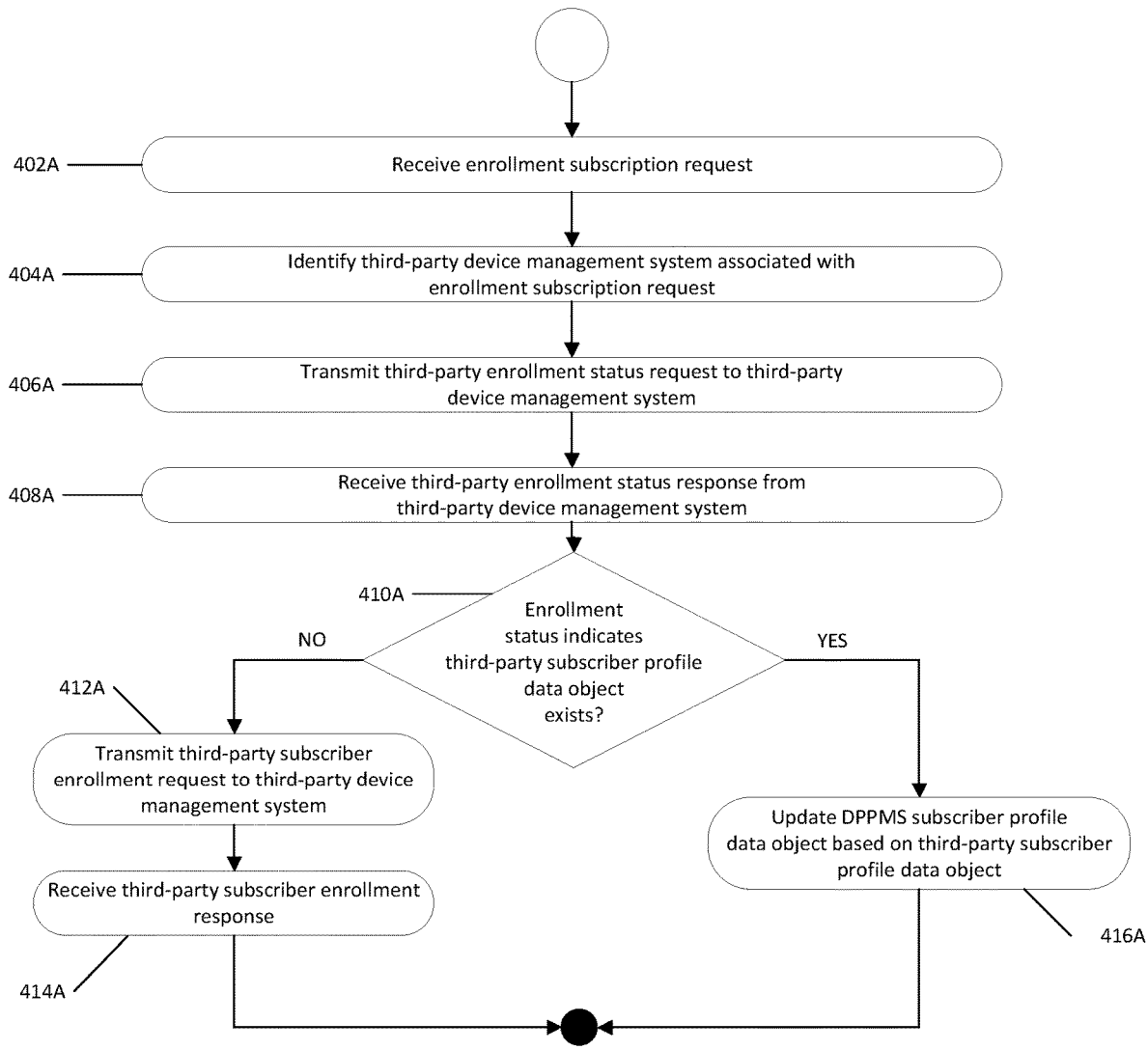
FIGS. 4A and 4B illustrate flowcharts depicting operations performed in accordance with an example embodiment of the present disclosure.
Figure 4B:
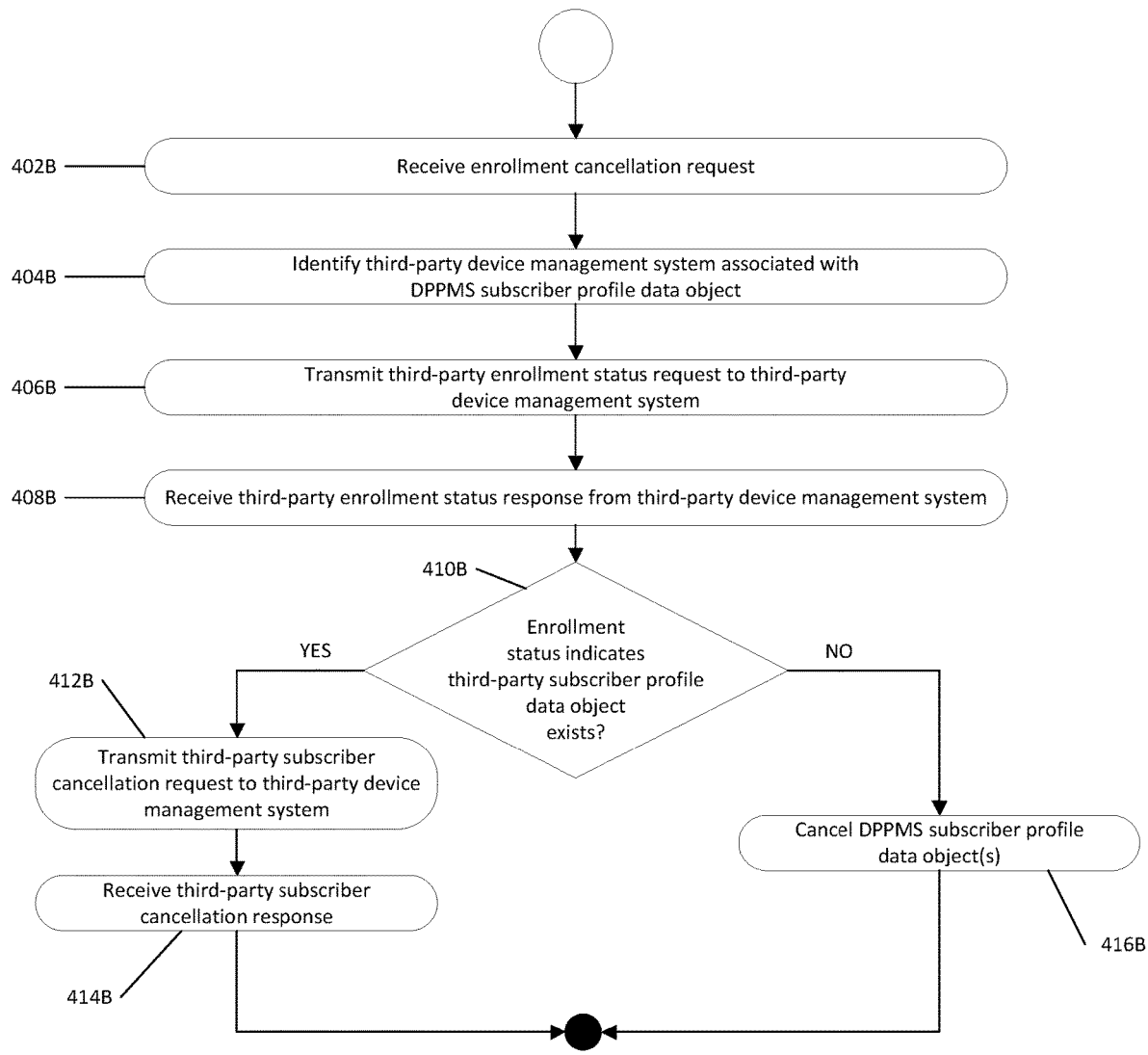

FIGS. 4A and 4B illustrate example operations performed in a process for self-healing enrollment based on a received enrollment management request data object. Specifically, FIG. 4A illustrates example operations for self-healing enrollment based on a received enrollment subscription request, and FIG. 4B illustrates example operations for self-healing enrollment based on a received enrollment cancellation request data object. The operations illustrated in FIGS. 4A and 4B may be performed by various devices and/or apparatuses in a networked system, such as the DPPMS apparatus 300 configured to communicate with one or more third-party systems, such as third-party device management systems, and/or client devices, such as subscriber devices. While the operations discussed below are described with respect to DPPMS apparatus 300, it should be appreciated that the operations may be performed by various devices similar to or distinct from the DPPMS apparatus 300, and/or with alternative components from the DPPMS apparatus 300, within the scope of the disclosure herein.

Additionally or alternatively, in some embodiments, the DPPMS apparatus 300 may be configured to synchronize one or more subscriber profile(s) based on enrollment notifications received from particular third-party device management systems. For example, one or more particular third-party device management systems may be trusted as associated with a device protection program. Thus, in some embodiments, at least one third-party device management system comprises a trusted third-party device management system. In an example context, for example, a third-party device management system may be associated with providing device protect program services to enrolled subscribers, such that new enrollments received by the third-party device management system should be used to synchronized the apparatus 300, and/or subsystems therein, without subsequent verification. In such circumstances, the apparatus 300 may receive, from a third-party device management system, one or more enrollment subscription notifications associated with newly enrolled third-party subscriber profiles and/or one or more enrollment cancellation notifications associated with third-party subscriber profiles that newly cancelled enrollment. The received enrollment subscription notification(s) and/or enrollment cancellation notification(s) may be used by the apparatus 300 to perform one or more synchronization events, for example to synchronize one or more DPPMS subscriber profiles for the apparatus 300 or one or more subsystems thereof. In some embodiments, the apparatus 300 may utilize some or all of the information included in a received notification to identify associated data to use in such synchronization events (for example, the notification may include one or more device identifiers, such as a device serial number, for use in identifying and/or retrieving one or more additional device identifiers for processing, such as an IMEI). In some embodiments, a system synchronization event may comprise updating at least one DPPMS subscriber profile data object to match the third-party enrollment status response object received from a trusted third-party device management system.

In some embodiments, the embodiments provide methods to detect a network communication synchronization error. The network communication synchronization error may be detected based on a detected difference between various enrollment status data objects (e.g., a first and second enrollment status data objects representing enrollment statuses in different systems). Additionally or alternatively, in some embodiments, a system synchronization event is initiated that addresses the detected network communication synchronization error, for example by updating one or more enrollment statuses in one or more of the systems, as described.

Turning first to FIG. 4A, at block 402A, apparatus 300 includes means, such as enrollment module 312, processor 302, communications module 308, and/or the like, to receive an enrollment subscription request. The enrollment subscription request may, for example, indicate that a currently unregistered device and/or unregistered user has subscribed to a device protection program (in other words, a new subscriber has been added associated with a particular device protection program). In some embodiments, the received enrollment subscription request includes subscriber information for enrolling, or otherwise registering, the currently unregistered device to a device protection program. The received subscriber information may include a subscriber identifier data object, which uniquely identifies a human subscriber, or subscriber device, associated with a device protection program. Examples of a received subscriber identifier data object include one or a combination from the group of a subscriber name (e.g., a human or entity name), a subscriber contact information, a subscriber device IP address, a subscriber device International Mobile Equipment Identity (IMEI) number, or the like. In an example embodiment, an enrollment subscription request includes an IMEI that uniquely identifies a client device to be subscribed to a device protection program. In some embodiments, the enrollment subscription request may be made directly at an interface of the DPPMS by the subscriber or a third party, or the enrollment subscription request may be transmitted to the DPPMS by a third-party system, which may be the same or a different third-party system from blocks 404A, 406A, 408A, 410A, 412A, 414A, and 416A. For example, in some embodiments, the request at block 402A may be transmitted by a third-party device management system associated with a wireless carrier or vendor from whom the subscriber device is purchased and a manufacturer system may be verified and synchronized in the subsequent blocks, which may be used to synchronize the DPPMS (and/or subsystems thereof), or a second third-party device management system associated with a device manufacturer or other entity associated with the device protection plan.

At block 404A, apparatus 300 includes means, such as enrollment module 312, processor 302, datastore management module 310, and/or the like, to identify a third-party device management system associated with the received enrollment subscription request. In some embodiments, the apparatus 300 may include means to extract a third-party device management system identifier from the received enrollment subscription request. In other embodiments, the apparatus 300 may determine a third-party device management system identifier based on the received enrollment subscription request. The third-party device management system identifier may be utilized to transmit to the third-party device management system or may be utilized to determine a communications protocol for communicating with the third-party device management system associated with the third-party device management system identifier. In a particular example, the third-party device management system associated with the third-party entity through which a user, or client device, was newly subscribed to a device protection program (e.g., a mobile carrier system, a device manufacturer and sales system, or the like).

At block 406A, the apparatus 300 includes means, such as enrollment module 312, processor 302, communications module 308, and/or the like, to transmit a third-party enrollment status request data object to the third-party device management system. The third-party enrollment status request data object may be configured to cause the third-party device management system to retrieve, and/or otherwise identify, a third-party status associated with information in the enrollment subscription request, such as a subscriber identifier data object or other subscriber information. In an example embodiment, apparatus 300 may generate a third-party enrollment status request data object that determines if a third-party subscriber profile data object exists associated with an extracted subscriber identifier data object, such the an IMEI.

At block 408A, the apparatus 300 includes means, such as enrollment module 312, processor 302, communications module 308, and/or the like, to receive a third-party enrollment status response data object from the third-party device management system. The third-party enrollment status response data object may indicate a third-party enrollment status, such as whether a third-party subscriber profile data object exists associated with information provided in the transmitted third-party enrollment status request data object. For example, if a third-party subscriber profile data object does exist, the third-party enrollment status response data object may include the third-party subscriber profile data object, an information subset of the third-party subscriber profile data object (e.g., a portion of the third-party subscriber profile data object rather than the entire profile), or equivalent information of either the third-party subscriber profile data object or information subset. Additionally or alternatively, the third-party enrollment status response data object may include a status flag associated with the third-party enrollment status, for example a bit flag where 0 represents a third-party subscriber profile data object does not exist in the third-party device management system, and 1 represents the third-party subscriber profile data object exists in the third-party device management system. Additionally or alternatively still, in some embodiments, a third-party enrollment status response data object may include information identifying and/or associated with a covered subscriber device, device status, protection program status (e.g., a warranty status), subscription coverage timestamp(s) (e.g., a coverage interval spanning two timestamps), and/or enrollment agreement information associated with the subscriber profile.

At decision block 410A, flow continues based on whether the received third-party enrollment status indicates the third-party subscriber profile data object exists. In either case, the apparatus 300 may be configured to execute one or more system synchronization events based on the received third-party enrollment status. For illustrative purposes, blocks 412A and 416A provide two specific examples of a system synchronization event.

If, at decision block 410A, the third-party enrollment status indicates a third-party subscriber profile data object does not exist in the third-party device management system, flow continues to block 412A. At block 412A, the apparatus 300 includes means, such as enrollment module 312, processor 302, communications module 308, and/or the like, to perform a system synchronization event, specifically to transmit a third-party subscriber enrollment request data object to the third-party device management system. In some embodiments, the apparatus 300 also includes means to generate the third-party subscriber enrollment request data object and/or configure the third-party enrollment request to cause the third-party device management system to create a third-party subscriber profile data object associated with the extracted subscriber information, such as the subscriber identifier data object. In other embodiments, the apparatus 300 otherwise determines a third-party subscriber enrollment request data object configured to cause the third-party device management system to create a third-party subscriber profile data object associated with the extracted subscriber information, such as the subscriber identifier data object. The generated or determined third-party subscriber enrollment request data object is then transmitted to the third-party device management system, such as over a network.

At block 414A, the apparatus 300 includes means, such as enrollment module 312, processor 302, communications module 308, and/or the like, to receive a third-party subscriber enrollment response. The third-party subscriber enrollment response may include information, data, or the like indicating that the third-party device management system successfully created a third-party subscriber profile data object. The third-party subscriber enrollment response may include information indicating that the third-party subscriber profile data object is associated with the extracted subscriber information, such as the subscriber identifier data object. Accordingly, the third-party subscriber enrollment response may indicate that subsequent third-party enrollment status response data objects associated with the extracted subscriber information, such as the subscriber identifier data object, will identify the created third-party subscriber profile data object. Accordingly, in some embodiments, the apparatus 300 may then be able to utilize the subscriber information, such as the subscriber identifier data object, to retrieve the newly created third-party subscriber profile data object or retrieve a third-party enrollment status associated with the newly created third-party subscriber profile data object.

Returning to decision block 410A, if the third-party enrollment status indicates a third-party subscriber profile data object does exist, flow continues to block 416A. At block 416A, apparatus 300 includes means, such as enrollment module 312, processor 302, and/or the like, to execute a system synchronization event, specifically to update a DPPMS subscriber profile data object based on the third-party subscriber profile data object. In a particular example, apparatus 300 may include means configured to update a DPPMS subscriber profile data object directly managed, or otherwise controlled, by the apparatus 300 based on the third-party subscriber profile data object, or other information received. Alternatively, in some embodiments, apparatus 300 may include means configured to identify one or more subsystems associated with or otherwise communicable with the apparatus 300, and, for some or all of the identified subsystems, update or otherwise cause update of, a DPPMS subscriber profile data object associated with the identified subsystem. In a particular example, the apparatus 300 may identify a payment subsystem associated with the apparatus 300, and a policy subsystem associated with the apparatus 300. Subsequently, the apparatus 300 may be configured to update, or cause update of, a first DPPMS subscriber profile data object associated with the payment subsystem and a second DPPMS subscriber profile data object associated with the policy subsystem. In some embodiments, apparatus 300 may be configured to update a DPPMS subscriber profile data object associated with a specific subsystem thereof, by creating, or causing creation of, a new DPPMS subscriber profile data object associated with the identified DPPMS subsystem. In other embodiments, apparatus 300 may be configured to update a DPPMS subscriber profile data object associated with a DPPMS subsystem by identifying a DPPMS subscriber profile data object associated with the subsystem and synchronizing the DPPMS subscriber profile data object based on the third-party subscriber profile data object. In an example system, apparatus 300 controls each subsystem independently directly and/or communicates with the subsystem such that each subsystem is controllable by the same provider entity.

It should be appreciated that the system synchronization events described above with respect to blocks 412A, 414A, and 416A are examples, and alternative system synchronization events, or system synchronization events utilizing additional steps, may also be performed. For example, in some embodiments, block 416A may be performed after block 414A, such that one or more DPPMS subscriber profile data objects are updated after receiving a third-party subscriber enrollment response. Accordingly, the spirit and scope of the disclosure herein is not limited to the specifics of the example blocks illustrated in FIG. 4A.

Turning next to FIG. 4B, at block 402B, apparatus 300 includes means, such as enrollment module 312, processor 302, communications module 308, and/or the like, to receive an enrollment cancellation request data object. The enrollment cancellation request data object may, for example, indicate that a user and/or client device are cancelling a subscription to a device protection program (in other words, the subscriber should no longer be actively covered by the associated device protection program). In some embodiments, the received enrollment cancellation request data object includes subscriber information. The received subscriber information may include a subscriber identifier data object, which uniquely identifies a human subscriber, or subscriber device, associated with a device protection program. Examples of a received subscriber identifier data object include one or a combination from the group of a subscriber name (e.g., a human or entity name), a subscriber contact information, a subscriber device IP address, a subscriber device International Mobile Equipment Identity (IMEI) number, or the like. In an example embodiment, an enrollment cancellation request data object includes an IMEI that uniquely identifies a client device to be subscribed to a device protection program. Similar to the enrollment function of FIG. 4A, the cancellation request may be made at any At block 404B, apparatus 300 includes means, such as enrollment module 312, processor 302, datastore management module 310, and/or the like, to identify a third-party device management system associated with the received enrollment cancellation request data object. In some embodiments, the apparatus 300 may include means to extract a third-party device management system identifier from the received enrollment cancellation request data object. In other embodiments, the apparatus 300 may determine a third-party device management system identifier based on the received enrollment cancellation request data object. The third-party device management system identifier may be utilized to transmit to the third-party device management system or may be utilized to determine a communications protocol for communicating with the third-party device management system associated with the third-party device management system identifier. In a particular example, the third-party device management system is associated with the third-party entity through which a subscriber, such as a user and/or client device, was subscribed to a device protection program (e.g., through a mobile carrier system, a device manufacturer and sales system, or the like).

At block 406B, the apparatus 300 includes means, such as enrollment module 312, processor 302, communications module 308, and/or the like, to transmit a third-party enrollment status request data object to the third-party device management system. The third-party enrollment status request data object may be configured to cause the third-party device management system to retrieve, and/or identify, a third-party status associated with information in the enrollment subscription request, such as a subscriber identifier data object or other subscriber information. In an example embodiment, apparatus 300 may generate a third-party enrollment status request data object that determines if a third-party subscriber profile data object exists associated with an extracted subscriber identifier data object, such as the IMEI.

At block 408B, the apparatus 300 includes means, such as enrollment module 312, processor 302, communications module 308, and/or the like, to receive a third-party enrollment status response data object from the third-party device management system. The third-party enrollment status response data object may indicate a third-party enrollment status, such as whether a third-party subscriber profile data object exists associated with information provided in the transmitted third-party enrollment status request data object. For example, if a third-party subscriber profile data object does exist, the third-party enrollment status response data object may include the third-party subscriber profile data object, an information subset of the third-party subscriber profile data object (e.g., a portion of the third-party subscriber profile data object rather than the entire profile), or equivalent information of either the third-party subscriber profile data object or information subset. Additionally or alternatively, the third-party enrollment status response data object may include a status flag associated with the third-party enrollment status, for example a bit flag where 0 represents a third-party subscriber profile data object does not exist in the third-party device management system, and 1 represents the third-party subscriber profile data object exists in the third-party device management system.

Flow then continues to decision block 410B. At decision block 410B, flow continues based on whether the received third-party enrollment status indicates the third-party subscriber profile data object exists. In either case, the apparatus 300 may be configured to execute one or more system synchronization events based on the received third-party enrollment status. For illustrative purposes, blocks 412B, 414B, and 416B provide two specific examples of a system synchronization event.

If, at decision block 410B, the third-party enrollment status indicates a third-party subscriber profile data object exists in the third-party device management system, flow continues to block 412B. At block 412B, the apparatus 300 includes means, such as enrollment module 312, processor 302, communications module 308, and/or the like, to perform a system synchronization event, specifically to transmit a third-party subscriber cancellation request data object to the third-party device management system. In some embodiments, the apparatus 300 also includes means to generate the third-party subscriber cancellation request data object and/or configure the third-party enrollment request to cause the third-party device management system to cancel, which may include deleting or otherwise terminating, a third-party subscriber profile data object associated with the extracted subscriber information, such as the subscriber identifier data object. In other embodiments, the apparatus 300 otherwise determines a third-party subscriber cancellation request data object configured to cause the third-party device management system to cancel, which may include deleting or otherwise terminating, a third-party subscriber profile data object associated with the extracted subscriber information, such as the subscriber identifier data object. The generated or determined third-party subscriber cancellation request data object is then transmitted to the third-party device management system, such as over a network.

At block 414B, the apparatus 300 includes means, such as enrollment module 312, processor 302, communications module 308, and/or the like, to receive a third-party subscriber cancellation response. The third-party subscriber enrollment response may include information, data, or the like indicating that the third-party device management system successfully cancelled the third-party subscriber profile data object. Accordingly, the third-party subscriber cancellation response may indicate that subsequent third-party enrollment status response data objects associated with the extracted subscriber information, such as the subscriber identifier data object, will indicate that no third-party subscriber profile data object exists associated with the subscriber information.

Returning to decision block 410B, if the third-party enrollment status indicates a third-party subscriber profile data object does not exist in the third-party device management system, flow continues to block 416B. At block 416B, apparatus 300 includes means, such as enrollment module 312, processor 302, and/or the like, to execute a system synchronization event, specifically to cancel one or more DPPMS subscriber profile data object(s). For example, apparatus 300 may include means configured to identify one or more DPPMS subsystems associated with the apparatus 300, and, for some or all of the identified subsystems, cancel a DPPMS subscriber profile data object associated with the identified subsystem. In a particular example, the apparatus 300 may identify a DPPMS payment subsystem associated with the apparatus 300, and a DPPMS policy subsystem associated with the apparatus 300. Subsequently, the apparatus 300 may be configured cancel a first DPPMS subscriber profile data object associated with the DPPMS payment subsystem, and a second DPPMS subscriber profile data object associated with the DPPMS policy subsystem. In some embodiments, apparatus 300 may be configured to cancel a DPPMS subscriber profile data object associated with a DPPMS subsystem by marking as cancelled, deleting, or otherwise terminating a DPPMS subscriber profile data object associated with the subsystem. As such, in some embodiments, after the system synchronization event, the DPPMS subscriber profile data objects managed by the apparatus 300 and/or one or more subsystems thereof reflect the cancellation of the subscriber form the device protection program. In an example system, apparatus 300 and each associated subsystem is controlled by the same provider entity.

It should be appreciated that the system synchronization events described above with respect to blocks 412B, 414B, and 416B are examples, and alternative system synchronization events, or system synchronization events utilizing additional steps, may also be performed. For example, in some embodiments, block 416B may be performed after block 414B, such that one or more DPPMS subscriber profile data objects are cancelled after receiving a third-party subscriber cancellation response. Accordingly, the spirit and scope of the disclosure herein is not limited to the specifics of the example blocks illustrated in FIG. 4B.

Figure 4C:
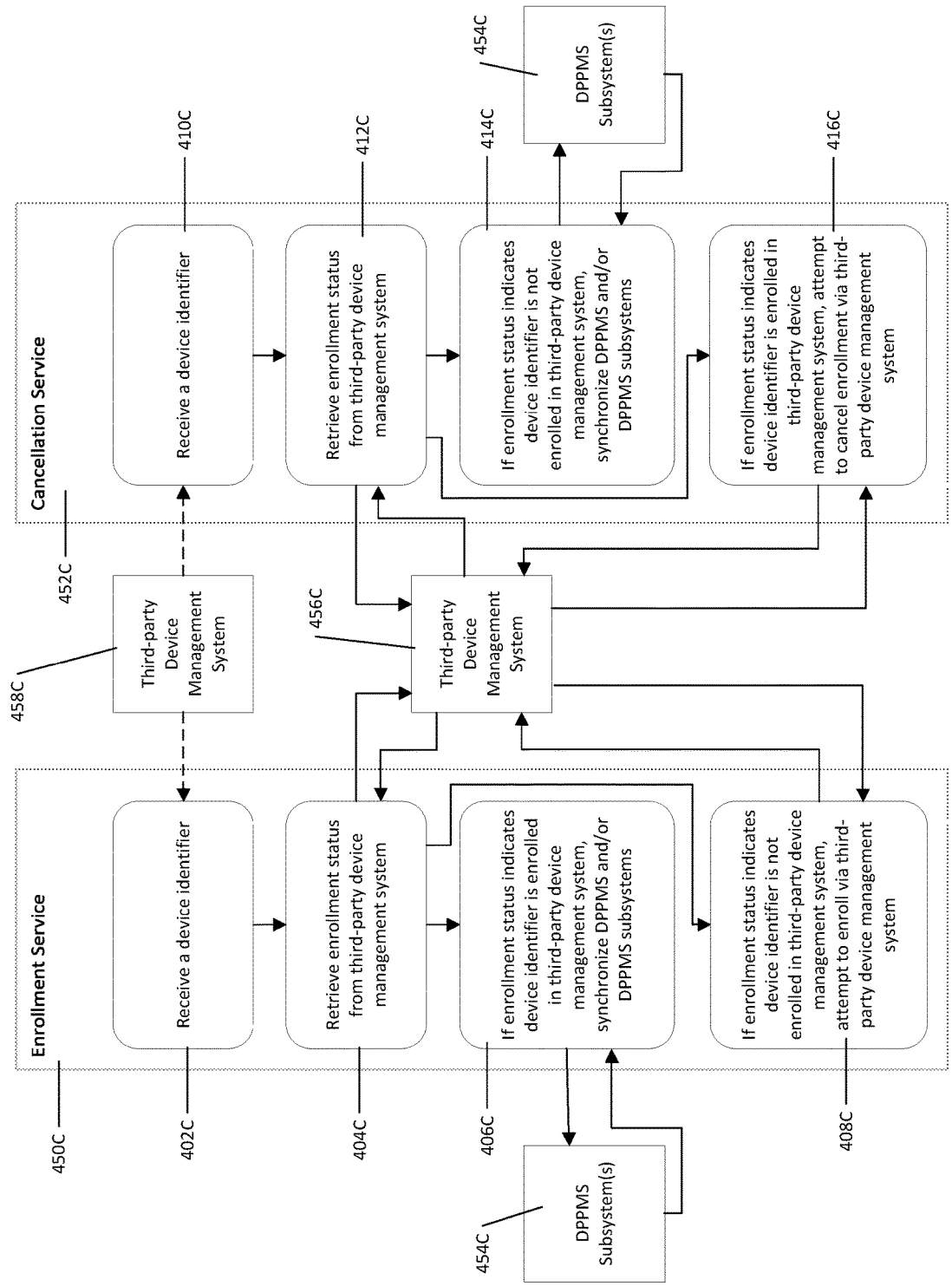
FIG. 4C illustrates an example data flow diagram depicting systems and operations for enrollment synchronization, in accordance with an example embodiment of the present disclosure.

FIG. 4C illustrates an example data flow diagram for enrollment synchronization, in accordance with example embodiments of the present disclosure. The example data flow depicts operations performed by a DPPMS, or a subsystem thereof, to synchronize subscriber profile(s) of a DPPMS and/or third-party device management system. The particular services, or operations therein, may be performed, executed by, or imitated by the DPPMS or any subsystem therein. For example, the enrollment service 450C and/or cancellation service 452C may be executed by a DPPMS embodied by the apparatus 300. The enrollment service 450C may be used to enroll an unregistered device to a device protection program. For example, a device identifier may be received associated with an unregistered device for enrolling the corresponding unregistered device in one or more device protection program(s).

For example, as illustrated, FIG. 4C depicts an enrollment service 450C. The enrollment service 450C may be performed, executed, or initiated by the DPPMS or any subsystem therein to synchronize the DPPMS and third-party systems based on a device identifier, subscriber identifier, or the like (e.g., a particular IMEI). Additionally or alternatively, in some embodiments, the enrollment service 450C may be performed, executed, or initiated by the DPPMS or any subsystem therein to synchronize the DPPMS and third-party systems based on an enrollment subscription request associated with a particular subscriber identifier, device identifier, or the like. Similarly, FIG. 4C depicts a cancellation service 452C. The cancellation service 452C may be performed, executed, or initiated by the DPPMS or any subsystem therein to synchronize the DPPMS and third-party systems based on a device identifier, subscriber, identifier, or the like. Additionally or alternatively in some embodiments, the cancellation service 452C may be performed, executed, or initiated by the DPPMS or any subsystem therein to synchronize the DPPMS and third-party systems based on a cancellation subscription request associated with a particular subscriber identifier, device identifier, or the like. In a particular depicted embodiment, the enrollment service 450C and/or cancellation service 452C may synchronize one or more DPPMS subsystems 452C and/or a third-party device management system 454C.

In an example context, in some embodiments, the enrollment service 450C or cancellation service 452C is initiated during initiation of a subscriber enrollment, claim fraud analysis, or claims processing protocol. For example, in some embodiments, a DPPMS may receive a claim data object associated with a device identifier data object. The device identifier data object may be associated with, or represent, a subscriber identifier data object for processing the claim data object. The DPPMS may query a device protection program subscriber device database for a subscriber profile data object associated with the subscriber identifier data object and receive result data indicative that the device protection program database does not include the subscriber profile data object. In this regard, the enrollment service 450 or cancellation service 452C may be initiated upon receiving and/or upon analysis of the result data.

Turning first to the enrollment service 450C, at block 402C the apparatus 300 includes means, such as any one of the enrollment module 312, fulfillment module 314, fraud module 316, error module 318, processor 302, or the like, or a combination thereof, to receive a device identifier. In some embodiments, the device identifier may be received from a third-party device management system providing information for enrollment of new subscribers, for example third-party device management system 458C. Alternatively, the apparatus 300 may receive the device identifier by identifying or retrieving the device identifier as part of a routine synchronization service. For example, a DPPMS, or subsystem therein, may synchronize enrollment for all currently enrolled device identifiers at a particular interval (e.g., at a particular time every day, every week, or the like).

At block 404C the apparatus 300 includes means, such as any one of the enrollment module 312, fulfillment module 314, fraud module 316, error module 318, processor 302, or the like, or a combination thereof, to receive an enrollment status from a third-party device management system. As illustrated, for example, the enrollment status may be retrieved from third-party device management system 456C. Third-party device management system 456C may embody a particular third-party device management system associated with the device protection program for the device associated with the device identifier retrieved at block 402C. For example, third-party device management system 456C may embody a system, server, or the like associated with a device manufacturer. The third-party device management system 456C may store third-party subscriber profile data objects independently managed from the subscriber profile data objects stored by the DPPMS. In some embodiments, the apparatus 300 retrieves the enrollment status by transmitting an enrollment status request to the third-party device management system.

The enrollment service 450C may then determine the flow of operations based on the retrieved enrollment status. For example, as depicted, flow may continue to block 406C if the enrollment status retrieved indicates the device identifier is enrolled by the third-party device management system 456C (e.g., indicates an associated third-party subscriber profile data object does exist). In such a circumstance, the apparatus 300 includes means, such as any one of the enrollment module 312, fulfillment module 314, fraud module 316, error module 318, processor 302, or the like, or a combination thereof, to synchronize the DPPMS and/or one or more DPPMS subsystems, based on the enrollment status received from the third-party device management system 456C. For example, the enrollment status may include the third-party subscriber profile data object, or corresponding data, that may be used to synchronize a corresponding subscriber profile data object managed by the DPPMS and/or one or more subscriber profile data objects managed by one or more subsystems of the DPPMS. For example, the apparatus 300 may synchronize a subscriber profile data object for each of DPPMS subsystems 454C, such that the information stored in the subscriber profile data object for each of the DPPMS subsystems 454C matches the information associated with the third-party subscriber profile data object.

Flow may, alternatively, continue to block 408C from block 404C if the enrollment status indicates the device identifier is not enrolled by the third-party device management system 456C (e.g., indicates an associated third-party subscriber profile data object does not exist). In an example embodiment, in such a circumstance, the apparatus 300 includes means, such as any one of the enrollment module 312, fulfillment module 314, fraud module 316, error module 318, processor 302, or the like, or a combination thereof, to try to enroll the device identifier via the third-party device management system. In this regard, the apparatus 300 may attempt to transmit one or more requests, signals, or the like, to cause third-party device management system 456C to create a third-party subscriber profile data object associated with the device identifier. In response to such attempt(s), the apparatus 300 may receive in return confirmation information indicating the third-party subscriber profile data object was successfully created, or one or more transmission error(s) occurred.

In some embodiments, the enrollment service 450C may be configured associated with an error handling system for classifying received error(s) and/or performing one or more associated error handling instruction set(s). For example, the received error may be classified and/or handled by one or more operations. The error handling operations may be performed and/or caused by an error handling system associated with the enrollment service 450C.

Additionally or alternatively, in some embodiments, the device identifier may be associated with a claim data object representing a user claim the apparatus may include means to initiate a claims processing instruction set. The claims processing instruction set may be initiated in parallel with one or more system synchronization events. In an example context of mobile device pro, the claims processing instruction set may include one or more claim processing handling events for verifying a claim as non-fraudulent, or processing and/or transmitting information for servicing a mobile device, replacing a mobile device, or the like. The claims processing instruction set may be initiated without a corresponding synchronized subscriber profile data object (which may be created and/or synchronized at a later time).

In some embodiments, the enrollment 450C receives a device identifier in the form of an enrollment subscription notification from a trusted third-party device management system, for example directly from the third-party device management system 456C instead of 458C. In some such embodiments, the enrollment service 450C may perform one or more system synchronization events without subsequent authorizing by the third-party device management system from which it was received. In this regard, in some such embodiments, the enrollment service 450C may immediately proceed to block 406C to synchronize the DPPMS and/or one or more DPPMS subsystems by enrolling new and/or existing subscription profile(s) to one or more new device protection programs identified by the received enrollment subscription notification.

Turning next to the cancellation service 452C, at block 410C the apparatus 300 includes means, such as any one of the enrollment module 312, fulfillment module 314, fraud module 316, error module 318, processor 302, or the like, or a combination thereof, to receive a device identifier. In some embodiments, the device identifier may be received from a third-party device management system providing information for enrollment of new subscribers. For example third-party device management system 458C. Alternatively, the apparatus 300 may receive the device identifier by identifying or retrieving the device identifier as part of a routine synchronization service. For example, a DPPMS, or subsystem therein, may synchronize cancelled enrollment for all device identifiers associated with newly cancelled subscriber profile data objects at a particular interval (e.g., at a particular time every day, every week, or the like).

At block 412C the apparatus 300 includes means, such as any one of the enrollment module 312, fulfillment module 314, fraud module 316, error module 318, processor 302, or the like, or a combination thereof, to receive an enrollment status from a third-party device management system. As illustrated, for example, the enrollment status may be retrieved from third-party device management system 456C. Third-party device management system 456C may embody a particular third-party device management system associated with the device protection program for the device associated with the device identifier retrieved at block 402C. For example, third-party device management system 456C may embody a system, server, or the like associated with a device manufacturer. The third-party device management system 456C may store third-party subscriber profile data objects independently managed from the subscriber profile data objects stored by the DPPMS. In some embodiments, the apparatus 300 retrieves the enrollment status by transmitting an enrollment status request to the third-party device management system.

The cancellation service 452C may then determine the flow of operations based on the retrieved enrollment status. For example, as depicted, flow may continue to block 414C if the enrollment status retrieved indicates the device identifier is not enrolled by the third-party device management system 456C (e.g., indicates an associated third-party subscriber profile data object does not exist). In such a circumstance, the apparatus 300 includes means, such as any one of the enrollment module 312, fulfillment module 314, fraud module 316, error module 318, processor 302, or the like, or a combination thereof, to synchronize the DPPMS and/or one or more DPPMS subsystems, based on the enrollment status received from the third-party device management system 456C. For example, the apparatus 300 may identify one or more existing subscriber profile data objects managed by the DPPMS and/or one or more DPPMS subsystems, and delete the subscriber profile data objects, mark each for deletion, or mark the subscriber profile data objects as not enrolled.

Flow may, alternatively, continue to block 416C from block 412C if the enrollment status indicates the device identifier is not enrolled by the third-party device management system 456C (e.g., indicates an associated third-party subscriber profile data object does not exist). In such a circumstance, the apparatus 300 includes means, such as any one of the enrollment module 312, fulfillment module 314, fraud module 316, error module 318, processor 302, or the like, or a combination thereof, to attempt to cancel enrollment the device identifier via the third-party device management system. In this regard, the apparatus 300 may attempt to transmit one or more requests, signals, or the like, to cause third-party device management system 456C to delete, mark as unenrolled, or otherwise indicate cancellation of a third-party subscriber profile data object associated with the device identifier. In response to such attempt(s), the apparatus 300 may receive in return confirmation information indicating the third-party subscriber profile data object was successfully deleted or otherwise indicated as cancelled, or one or more transmission error(s).

In some embodiments, the cancellation service 452C receives a device identifier in the form of an enrollment cancellation notification from a trusted third-party device management system, for example directly from the third-party device management system 456C instead of 458C. In some such embodiments, the cancellation service 452C may perform one or more system synchronization events without subsequent authorizing by the third-party device management system from which it was received. In this regard, in some such embodiments, the cancellation service 452C may immediately proceed to block 414C to synchronize the DPPMS and/or one or more DPPMS subsystems by cancelling corresponding enrolled subscription profiles.

Error Classification and Handling

Figure 9:
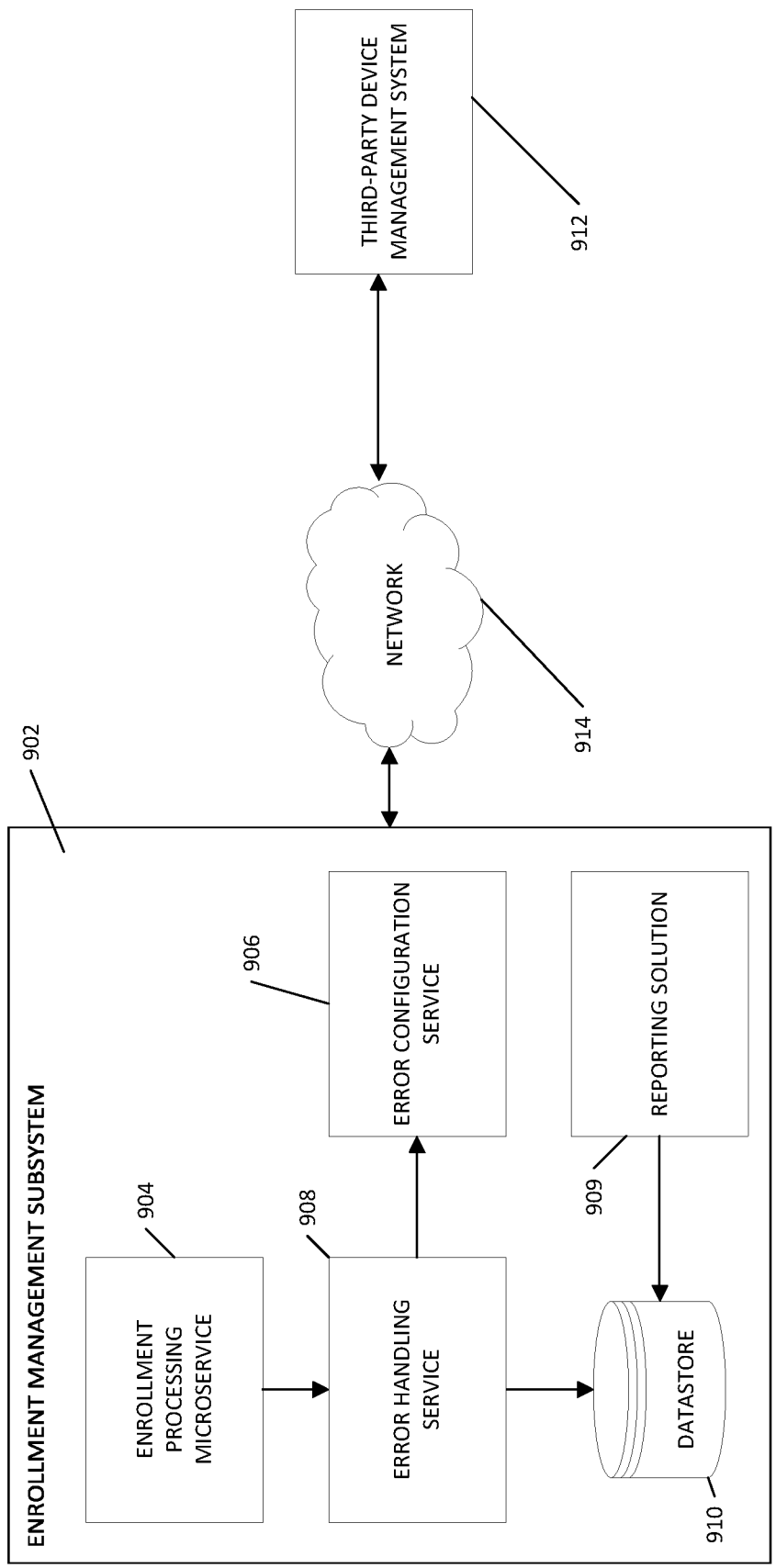
FIG. 9 illustrates a block diagram of a system that may be specially configured, within which embodiments of the present disclosure may operate.

FIG. 9 illustrates a block diagram of an example system within which embodiments of the present disclosure may operate in accordance with the disclosure herein. Specifically, FIG. 9 illustrates an example configuration by which an embodiment of the present disclosure may receive, classify, and/or manage received transmission errors resulting from a failed transmission. As illustrated, enrollment management subsystem 902 may communicate with an example third-party device management system 912. The enrollment management subsystem 902 includes multiple services, which may be embodied by hardware and/or a combination of software executed on hardware, to facilitate error management and reporting as described below. In some embodiments, the enrollment management system 902 may be operated as a separate service that functions and may be maintained independently of one or more other services within a DPPMS, such that maintenance and troubleshooting may be performed on the enrollment management system without losing functionality to the remaining portions of the DPPMS. In some embodiments, the enrollment management subsystem 902 is operated on one or more executed action process instances, for example as described with respect to FIG. 7.

In an example embodiment, enrollment management subsystem 902 may be embodied by the apparatus 300, or one or more modules of the apparatus 300, for example the enrollment module 312, processor 302, error module 318, and/or the like. In other embodiments, the enrollment management subsystem 902 may be a subsystem associated with the apparatus 300. In some embodiments, the enrollment management subsystem 902, and/or one or more components thereof, may be accessed executed to a configured cloud system comprising one or more remote and/or "cloud" servers specially configured with the components described therein. Similarly, in some embodiments, one or more microservice subsystems for fulfillment and/or fraud prevention may similarly be executed on specially configured remote and/or cloud servers.

The enrollment management subsystem 902 may be configured to communicate with the third-party device management system 912 over a network 914. The third-party device management system may manage one or more third-party subscriber profile data objects associated with one or more subscribers enrolled in a device protection program via the third-party device management system. For example, third-party device management system 912 may be configured to maintain a database or list including all third-party subscriber profile data objects that have enrolled in a device protection program via the third-party system or entity.

Enrollment management subsystem 902 may communicate with third-party device management system 912 to validate, verify, or update one or more DPPMS subsystems including one or more DPPMS subscriber profile data objects. For example, enrollment management subsystem 902 may be configured to communicate with third-party device management system 912 to receive new enrollment management request data objects, and/or verify a third-party enrollment status associated with an enrollment management request data object being processed.

As illustrated, enrollment management subsystem 902 may include enrollment processing microservice 904, error handling service 908, error configuration service 906, datastore 910, and reporting solution 909. Enrollment processing microservice 904 may be configured to maintain an action queue configured to store unprocessed enrollment management request data objects. Additionally or alternatively, enrollment processing microservice 904 may be configured to manage one or more action process instances configured to process unprocessed enrollment management request data objects from the action queue.

While processing unprocessed actions, such as enrollment management request data objects, via enrollment processing microservice 904, the enrollment management subsystem 902 may communicate with third-party device management system 912 via network 914. The enrollment management subsystem 902 may, for example, be configured to transmit, to the third-party device management system 912, one or more from the group including a third-party enrollment status request data object, a third-party subscriber enrollment request data object, a third-party subscriber cancellation request data object, or other enrollment management request data object.

However, due to a myriad of computing problems, including networking, communications, power, or other problems, transmissions may fail to be successfully received by the third-party device management system 912, and/or responded to by the third-party device management system 912. As a result of a failed transmission, the enrollment management subsystem 902 may identify, receive, or otherwise determine, a transmission error resulting from the failed transmission. The failed transmission may result from various transmission errors of various types, including, without limitation, software failures, hardware failures, and/or third-party submission failures.

Error handling service 908 may be configured to identify, receive, or otherwise determine occurrence of such transmission errors. Additionally or alternatively, in some embodiments, error handling service 908 may be configured with error handling logic. In a particular embodiment, the error handling logic associated with error handling service 908 may be configured to associate the transmission error with an error configuration. Associating the transmission error with an error configuration may be used to classify the received transmission error and/or identify one or more error handling operations to perform in response to the transmission error.

The error handling service 908 may be configured to identify an error configuration, based on the transmission error, utilizing error configuration service 906. For example, the error handling service 908 may identify an error code and/or error message included in or associated with the transmission error, where the error code, error message, or a combination thereof is used to identify an associated error configuration. The error configuration may be associated with, or include, at least an error code and/or error message for the associated transmission error, and an error classification associated with the transmission error. In some embodiments, the error configuration may also include information associated with, or identifying, an error handling instruction set embodying an error handling protocol. For example, in some embodiments, the error configuration may include a retry maximum threshold for use in an executed error handling instruction set.

The error handling logic, in conjunction with the error configuration service 906, may identify, determine, or retrieve an error handling instructions set representing an error handling protocol that includes one or more error handling events. For example, the error handling service 908 may identify an error handling instructions set associated with information included in the error configuration, or otherwise identified, such as the error classification associated with the transmission error.

The error handling service 908 may be configured to execute one or more error handling events based on the identified error handling instructions set. In a particular example, where the error configuration indicates the transmission error is a retriable error, the error handling service may be configured to identify if the failed transmission has been retried more than an associated retry maximum threshold, and if not, identify a request retry time, and put the failed transmission in the transmission queue again after the determined retry time. In another particular example, where the error configuration indicates the transmission error is an escalation error, the error handling service may be configured to add, or otherwise insert, the failed transmission to an escalation queue. The escalation queue may store one or more failed transmissions requiring attention by a third-party entity or another third-party system for error handling. In some embodiments, error handling service 908 may be configured to generate, or identify, one or more error reports associated with the transmission error.

The error handling service may utilize datastore 910 to store error reports and/or manage one or more action queues. In some embodiments, the datastore 910 is configured to store the error reports such that one or more users may engage with the enrollment management subsystem to retrieve the error reports via reporting solution 909. For example, reporting solution 909 may be configured to enable access to the datastore 910. Reporting solution 909 may be configured to enable the user to escalate one or more transmission errors, such as escalation errors in the escalation queue, to the third-party entity. For example, reporting solution 909 may be configured to enable escalation of a transmission error in the escalation queue by transmitting an error escalation request to the third-party device management system 912, or another third-party system associated with the third-party device management system 912, such as a third-party error system (not shown). In some embodiments, escalation errors in the escalation queue may be handled via one or more human operators, and the queue may be altered, or otherwise updated, via reporting solution 909.

Figure 5:
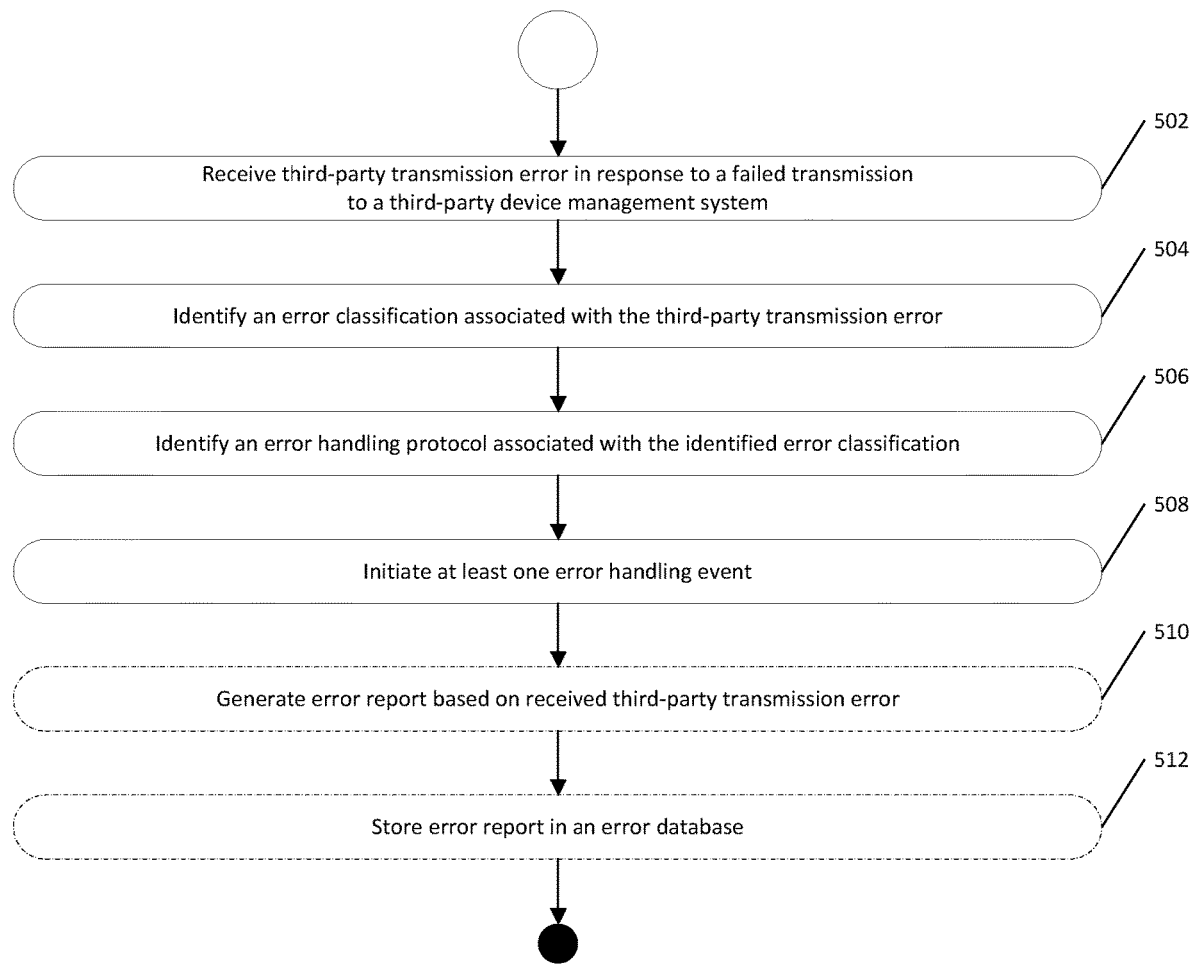
FIG. 5 illustrates a flowchart depicting operations performed in accordance with an example embodiment of the present disclosure.

FIG. 5 illustrates operations in a simplified example process for error classification and handling for transmission errors received by a DPPMS in accordance with the present disclosure herein. The operations illustrated and described with respect to FIG. 5 may be performed by a DPPMS embodied by apparatus 300, including hardware and/or software embodying the enrollment management subsystem 902 as illustrated in FIG. 9 and described above. For example, in a particular example embodiment, the enrollment module 312, error module 318, processor 302, communications module 308, datastore management module 310, and/or a combination thereof, may be configured to embody the enrollment management subsystem 902 as described above with respect to FIG. 9.

At block 502, apparatus 300 includes means, such as error module 318, processor 302, communications module 308, and/or the like, to receive a third-party transmission error in response to a failed transmission to a third-party device management system. As a particular example, the DPPMS embodied by apparatus 300 may transmit a third-party enrollment management request data object to a third-party device management system and lose connection or otherwise be unable to receive a corresponding third-party enrollment management response from the third-party device management system. Accordingly, without receiving such a response, the DPPMS embodied by apparatus 300 may remain unaware as to whether the third-party device management system successfully executed the necessary actions in response to the third-party enrollment management request data object.

At block 504, the apparatus 300 includes means, such as error module 318, processor 302, and/or the like, to identify an error classification associated with the third-party transmission error. In a particular embodiment, apparatus 300 may identify an error classification set including one or more error classifications and identify an error classification from the error classification set. An example error classification set may include a "retriable error" and an "escalation error". In some embodiments, the apparatus 300 may identify an error classification based on the failed transmission, third-party transmission error, subscriber information associated with the failed transmission, and/or various other factors. In some embodiments, the apparatus 300 includes means, such as error module 318, processor 302, and/or the like, to identify an error configuration associated with the transmission error. In some embodiments, the error configuration includes at least an error classification, and a retry maximum threshold, each associated with the transmission error.

In an example context, the error classifications of "retriable error" and "escalation error" may comprise one or more sub-classifications. For example, the apparatus 300 may maintain escalation error classifications that identify a particular third-party error handling device intended to handle the transmission error. Examples of such error classifications include, without limitation, "point of sale escalation error" and "manufacturer escalation error" for a particular subscriber device. The point of sale escalation error may, for example, indicate that poorly formatted, incomplete, or otherwise unusable or bad data was received from a third-party system, such as a third-party device management system embodying a point of sales system. In this regard, the point of sale escalation error may be associated with an error configuration that requires escalation to a third-party error handling system, such as a system controlled by a carrier entity that transmitted an initial request, for manual intervention. A manufacturer escalation error may, for example, indicate that the request requires data that is retrievable from a third-party system associated with a manufacturer entity for a particular subscriber device, and the error may be associated with a configuration that requires escalation of the error to a third-party error handling system controlled by the third-party entity.

Similarly, the apparatus 300 may maintain retriable error classifications that are associated with a particular error handling instruction set, for example where the error handling instruction set further defines an error handling protocol if subsequent retry of the failed transmission is unsuccessful. Examples of such error classifications include, without limitation, "system retriable error" and "ineligible after retry error." The system retriable error may indicate that the field formatting and/or data formatting of a transmission includes an error, and may be continuously retriable based on one or more retry protocols, such as using exponential back-off. The ineligible after retry error may indicate that no action can be taken for an error if not resolved via one or more retry attempts, and may be retried for a limited retry maximum threshold (e.g., 1 retry in some embodiments) before being marked as ineligible or receiving a new ineligible errors. Ineligible errors may not be associated with a particular configuration not including any error handling instruction set, such that no action is required to process such errors. For example, an ineligible error may be received associated with a subscriber device that cannot be enrolled in a particular device protection program.

At block 506, the apparatus 300 includes means, such as error module 318, processor 302, and/or the like, to identify an error handling protocol, for example defined by an error handling instructions set, associated with the identified error classification. Each error classification may be associated with one or more error handling protocols, each including one or more error handling events. For example, an error handling protocol associated with a "retriable" error classification may include at least identifying a retry time, placing the failed transmission in a queue for transmission after the retry time has elapsed, and waiting the retry time. An error handling protocol associated with an "escalation" error classification, for example, may include inserting the transmission error into an escalation queue. In some embodiments, the apparatus 300 may access an error database, for example through a datastore, to identify the error handling protocol associated with the identified error classification.

At block 508, the apparatus 300 includes means, such as error module 318, processor 302, and/or the like, to initiate one or more of the error handling events included in the identified error handling protocol. For example, the apparatus 300 may include means configured to, for a retriable error, identify a retry time, place the failed transmission in a transmission queue for retransmission after the retry time has elapsed, and wait the retry time. The apparatus 300 may also include means configured, for an escalation error, to insert the transmission error into an escalation queue.

At block 510, the apparatus 300 includes means, such as error module 318, processor 302, and/or the like, to generate an error report based on the received third-party transmission error. The error report may include information and/or metadata related to the third-party transmission error, the error classification, the identified error handling instructions set, and/or the like.

At block 512, the apparatus 300 includes means, such as error module 318, processor 302, and/or the like, to store the generated report in an error database. In some embodiments, a single datastore is configured to store error reports along with all other stored data. In other embodiments, an error database is separate from other data types. The error report may be stored associated with information and/or metadata based on the received third-party transmission error, such that the error report may be retrieved when subsequent third-party transmission errors of the same type occur and utilized to improve the efficiency of classifying and/or handling such transmission errors. In other embodiments, the error report is generated and added to the error database such that the error database functions as an error log for received errors.

Figure 6:
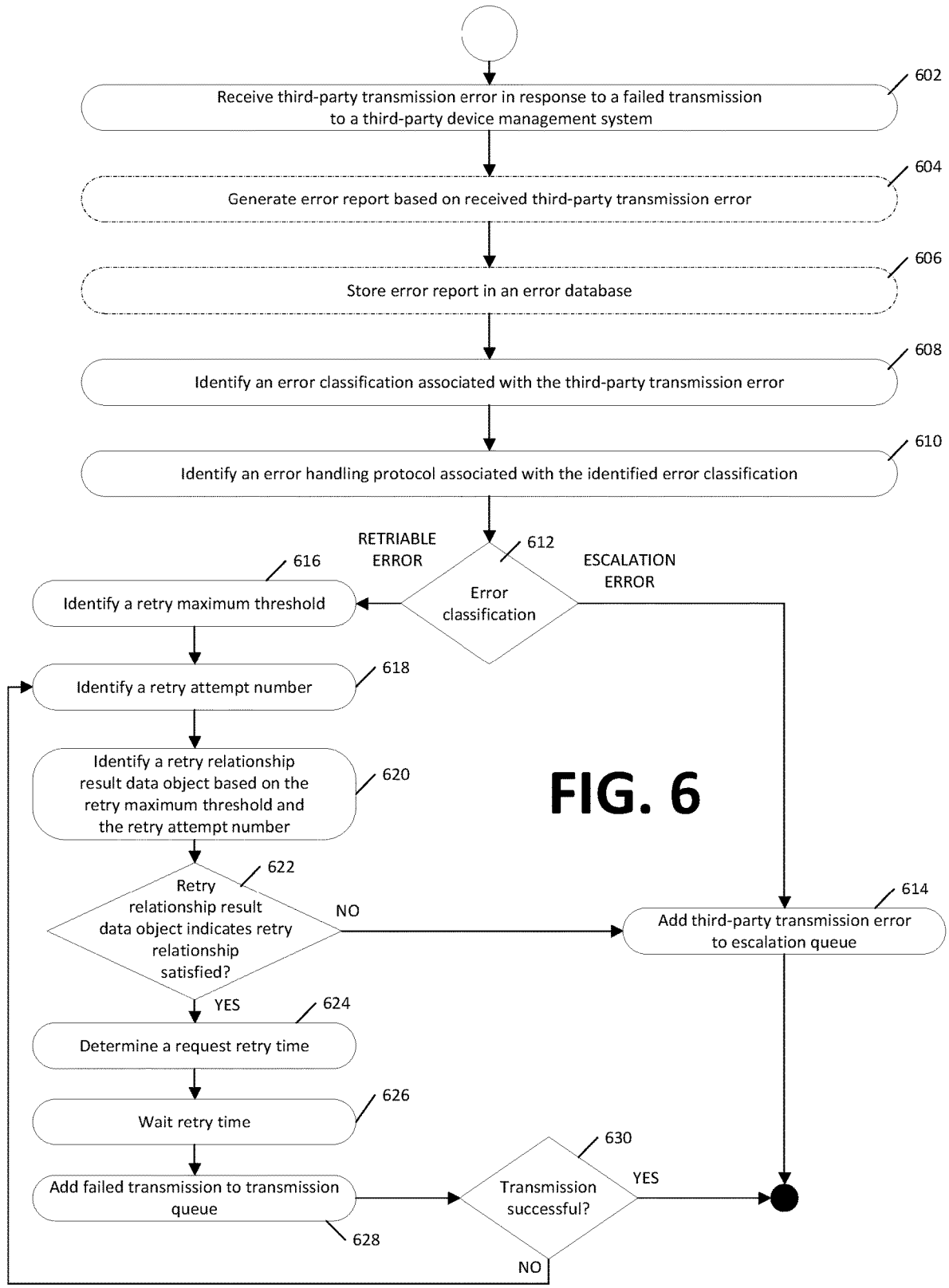
FIG. 6 illustrates a flowchart depicting operations performed in accordance with an example embodiment of the present disclosure.

A DPPMS, such as a DPPMS embodied by the apparatus 300, may perform one or more of the operations illustrated in FIG. 5 for handling transmission errors received in response to an attempted transmission to a third-party system, such as a third-party device management system, for example transmission errors received during the process illustrated by FIGS. 4A and 4B, or in connection with any other message failure or synchronization failure. Accordingly, FIG. 6 illustrates an example detailed process including operations that may be performed by a DPPMS, such as a DPPMS embodied by the apparatus 300, configured for enrollment management and error handling to improve overall system robustness and efficiency.

At block 602, the apparatus 300 includes means, such as error module 318, processor 302, communications module 308, and/or the like, to receive a third-party transmission error in response to a failed transmission to a third-party device management system. As described above, for example, the DPPMS embodied by apparatus 300 may transmit a third-party enrollment management request data object to a third-party device management system and lose connection or otherwise be unable to receive a corresponding third-party enrollment management response from the third-party device management system.

At optional block 604, the apparatus 300 includes means, such as error module 318, processor 302, and/or the like, to generate an error report based on the received third-party transmission error. At optional block 606, the apparatus 300 includes means, such as error module 318, processor 302, datastore management module 310, and/or the like, to store the generated error report in an error database. Accordingly, the error report may be logged in the error database for future auditing and/or error handling. For example, a user may review one or more error reports for received errors but unclassified errors, and assign a corresponding error configuration comprising an error classification and/or error handling instruction set determined by the user as appropriate for handling the transmission error.

At block 608, the apparatus 300 includes means, such as error module 318, processor 302, and/or the like, to identify an error classification associated with the third-party transmission error. In the illustrated example, and as described above, the error classification may be selected from an error classification set including at least a "retriable" error classification and an "escalation" error classification. In other embodiments, additional or alternative error classifications may be included in the error classification set. The error handling classification may be identified based on information and/or metadata associated with the transmission error and/or the failed transmission. For example, in some embodiments, the apparatus 300 may extract an error identifier from a transmission error for use in identifying a transmission error. In other embodiments, the apparatus 300 may determine a transmission type associated with the failed transmission, and utilize the transmission type, alone or in conjunction with other information such as an error identifier, for determining the error classification.

At block 610, the apparatus 300 includes means, such as error module 318, processor 302, and/or the like, to identify an error handling protocol associated with the identified error classification. The error handling protocol may be represented by an instruction set for resolving the error. In some embodiments, the error handling protocol instruction set may include retry and/or escalation instructions, such as the example protocol shown beginning at block 612. The error handling protocol identified may be based on, as illustrated, the error classification determined at decision block 608. For example, as illustrated, an escalation error handling protocol may be identified associated with the escalation error classification, where the escalation error handling protocol includes one or more error handling events, such as at least block 614. Alternatively, as illustrated, a retriable error handling protocol may be identified associated with the retriable error classification, where the retriable error handling protocol includes one or more error handing events, such as at least blocks 616-630, and 614.

Turning to the decision block 612, if the error classification identified is an escalation error (for example, from an error configuration identified based on the error code and/or error message for a received transmission error), flow continues to block 614 embodying the single error handling event in the escalation error handling protocol. At block 614, the third-party transmission error is added to an escalation queue. In some embodiments, the apparatus 300 is configured to manage the escalation queue and transmit errors in the escalation queue to one or more third-party servers. In some embodiments, the apparatus 300 may include means to transmit the error to a third-party error handling system and receive an escalation response either automatically from the third-party error handling system. In other embodiments, escalation errors in the escalation queue are resolved via manual intervention, such as by human operators via the DPPMS, such as a DPPMS embodied by the apparatus 300, or a human operator via a third-party error handling system. While the escalation error handling protocol illustrated in FIG. 6 ends here, it should be appreciated that other escalation error handling protocols may include additional or alternative error escalation steps.

Returning to decision block 612 again, if the error classification is determined to be a retriable error, flow continues to block 616, which embodies the first error handling event in the illustrated error handling protocol associated with retriable errors embodied by blocks 616-630, and 614.

At block 616, the apparatus 300 includes means, such as error module 318, processor 302, and/or the like, configured to identify a retry maximum threshold. The retry maximum threshold defines a maximum number of re-transmission attempts the apparatus 300 may perform for the particular transmission error. In some embodiments, all retriable errors may be associated with a pre-determined retry maximum threshold. In other embodiments, a retry maximum threshold associated with a retriable error may be determined based on various factors, such as the current date timestamp, server load, escalation queue length, retransmission queue length, and/or the like.

In some embodiments, the retry maximum threshold represents a timestamp interval representing a particular length of time for which the apparatus 300 may continue to retry transmission of the failed transmission associated with the received transmission error. The length of time embodied by the retry maximum threshold may represent a predetermined timestamp interval, for example set by a user of the apparatus 300. Alternatively or additionally, the retry maximum threshold may represent a timestamp interval determined by the apparatus 300 based on one or more factors, such as the current date timestamp, server load, escalation queue length, retransmission queue length, and/or the like.

At block 618. the apparatus 300 includes means, such as error module 318, processor 302, and/or the like, to identify a retry attempt number. In some embodiments, the apparatus 300 is configured to track the number of transmission attempts associated with the failed transmission, which represents the retry attempt number. Accordingly, in some embodiments, a retry attempt number of zero may be assigned when the DPPMS embodied by apparatus 300 has not yet attempted to retransmit a failed transmission. In other embodiments, a retry attempt number may be represent the number of retry attempts remaining, such that it is set to a pre-determined number (e.g., 5 retry attempts) and decremented following each retry attempt.

At block 620, the apparatus 300 includes means, such as error module 318, processor 302, and/or the like, to identify a retry relationship result data object based on the retry maximum threshold and the retry attempt number. The retry relationship result data object may be identified or otherwise determined by comparing the retry maximum threshold and the retry attempt number based on a retry relationship. For example, the retry relationship result data object may indicate whether the retry attempt number is greater than (or greater than or equal to), or less than (or less than or equal to) the retry maximum threshold.

Alternatively, in some embodiments, the retry attempt number represents a total time spent on retry attempts for the particular failed transmission. In this regard, the retry attempt number may be incremented by the wait time for the previous retry iteration (if any). In some embodiments, the apparatus 300 is configured to track the retry attempt number, for example using one or more clocks and/or timers embodied in hardware and/or software. In yet other embodiments, the apparatus 300 tracks the number of transmission attempts and uses the number of transmission attempts to determine the previous wait times for one or more previous retry attempts. In some such embodiments, the retry relationship result data object may represent whether the retry attempt number exceeds a retry maximum threshold (e.g., whether data indicating the total time spent on retries exceeds the maximum time allowed). In some embodiments, the retry relationship result data object indicates the retry maximum threshold is satisfied when the retry attempt number is below the retry maximum threshold.

At decision block 622, the apparatus 300 includes means, such as error module 318, processor 302, and/or the like, to determine if the retry relationship result data object indicates the retry relationship is satisfied. In some embodiments, for example, the retry relationship is satisfied when the retry attempt number is less than the retry maximum threshold, as indicated by the retry relationship result data object. In other embodiments, the retry relationship is satisfied when the retry attempt number is greater than the retry maximum threshold (e.g., when the retry attempt number is decremented and the retry maximum threshold is at zero, or boundary number).

In yet other embodiments, for example where the retry maximum threshold represents a timestamp interval and the retry attempt number represents a total time spent on all retry attempts, the retry relationship is satisfied when the retry attempt number is less than (or less than or equal to) the retry maximum threshold, as indicated by the retry relationship result data object. In other embodiments, the retry relationship is satisfied when the retry attempt number is greater than the retry maximum threshold (e.g., when the retry attempt number is decremented based on wait time).

If the retry relationship is determined as not satisfied, flow may continue to block 614. For example, if the retry relationship does not satisfy the retry maximum threshold, the retriable error may be escalated and, as illustrated by block 614, placed in an escalation queue. In other embodiments, the retriable error may be reclassified to an escalation error before being added to the escalation queue.

Alternatively, if the retry relationship is determined as satisfied, such as when the retry attempt number incremented for every transmission attempt is less than a retry maximum threshold, flow may continue to block 624. At block 624, the apparatus 300 includes means, such as error module 318, processor 302, and/or the like, to determine a request retry time. The retry time represents a length of time that the system must wait before attempting to retransmit the failed transmission. In some embodiments, the request retry time is determined based on the retry attempt number. For example, a request retry time may be based on an exponential back-off algorithm that doubles the request retry time associated with the immediately preceding attempt, starting with a minimum retry time. For example, a minimum retry time may be set at five minutes, such that when the retry attempt number is zero (e.g., the wait time before the first retry attempt), the apparatus 300 determines the retry time to be five minutes. Subsequently, the retry time is doubled, such that when the retry attempt number is 1 (e.g., before the second retry attempt), the retry time is ten minutes, and when the retry attempt number is 2 (e.g., before the third retry attempt), the retry time is twenty minutes. In other embodiments, alternative algorithms or rules may be utilized to determine a retry time.

At block 626, the apparatus 300 includes means, such as error module 318, processor 302, and/or the like, for waiting the determined retry time. In some embodiments, the apparatus 300 may track a time elapsed since previous transmission, or re-transmission, attempt. Embodiments may continue to operate, such as by attempting other transmissions, and/or performing other operations, while waiting the retry time.

At block 628, the apparatus 300 includes means, such as error module 318, processor 302, and/or the like, for adding the failed transmission to the transmission queue. The transmission queue may include unprocessed requests to be transmitted to one or more third-party systems, which the apparatus 300 may include means configured to process and transmit as identified above and below herein. After the failed transmission reaches the front of the queue, the DPPMS embodied by the apparatus 300 processes the failed transmission and attempts to transmit it again.

At decision block 630, the apparatus 300 includes means, such as error module 318, processor 302, communications module 308, and/or the like, to determine if the failed transmission was retransmitted successfully. If the transmission was not successful, flow may return to block 618, where the retry attempt number is incremented. In some embodiments, another third-party transmission error may be received and identified as a retriable error based on the previous error classification. Alternatively, in some embodiments, the flow may return to block 602, and the other third-party transmission error may be reclassified to determine if the subsequent third-party transmission error is also a retriable error, or if a new escalation error occurred. Returning to decision 630, if the transmission was successfully transmitted, the process ends.

It should be appreciated that a DPPMS configured to perform the operations described with respect to FIG. 6 advantageously allocates processing resources efficiently and may reduce the amount of errors escalated unnecessarily, thus improving completion times for handling an action, such as an enrollment management request data object or claim.

It should also be appreciated that the error handling protocols illustrated in FIG. 6, and specific error handling events illustrated in FIG. 6, are examples. Alternative error handling protocols may include alternative error handling events, a different arrangement of error handling steps, and/or additional error handling events. Accordingly, the spirit and scope of the disclosure herein is not limited to the specifics of the example error handling protocols illustrated by blocks 612-630 and described above.

Example Scaling Service

The DPPMS embodied by apparatus 300 may include means for processing one or more received and/or triggered actions and/or requests in connection with one or more of the systems, subsystems, and processes described herein. For example, enrollment management request data objects, claims, and the like, may require processing by the DPPMS embodied by the apparatus 300 to accomplish a particular goal. For example, an enrollment subscription request may require processing resources to verify the enrollment with a third-party device management system, create and/or add a DPPMS subscriber profile data object to the DPPMS, and/or cancel a DPPMS subscriber profile data object associated with one or more DPPMS subsystems associated with the DPPMS. An enrollment cancellation request data object may require processing to verify the cancellation with a third-party device management system, cancel a DPPMS subscriber profile data object associated with a DPPMS, and/or cancel a DPPMS subscriber profile data object associated with one or more DPPMS subsystems. A claim may require processing to verify the claim is not fraudulent (such as by executing a fraud protection protocol) and execute a claim processing protocol. In some embodiments, the claim processing protocol includes a claim processing instruction set, which the apparatus initiates associated with the claim data object for a particular claim.

The processing of these actions may require significant processing resources and/or require a significant amount of time. Additionally, in some embodiments, unprocessed actions may be received in significantly large batches, such that an action queue of unprocessed actions may quickly expand from little to no actions in the action queue to a significant number of unprocessed actions within a short time period. For example, one or more of the third-party systems disclosed herein may transmit bulk requests (e.g., at a predetermined time during the day) such that large batches of various activities must be handled quickly and without unreasonable delay or burden on the subscribers or third parties. Accordingly, the DPPMS embodied by apparatus 300 may be configured with a scaling service, as illustrated in FIG. 7, for managing one or more action process instances associated with processing unprocessed actions stored in an action queue.

Figure 7:
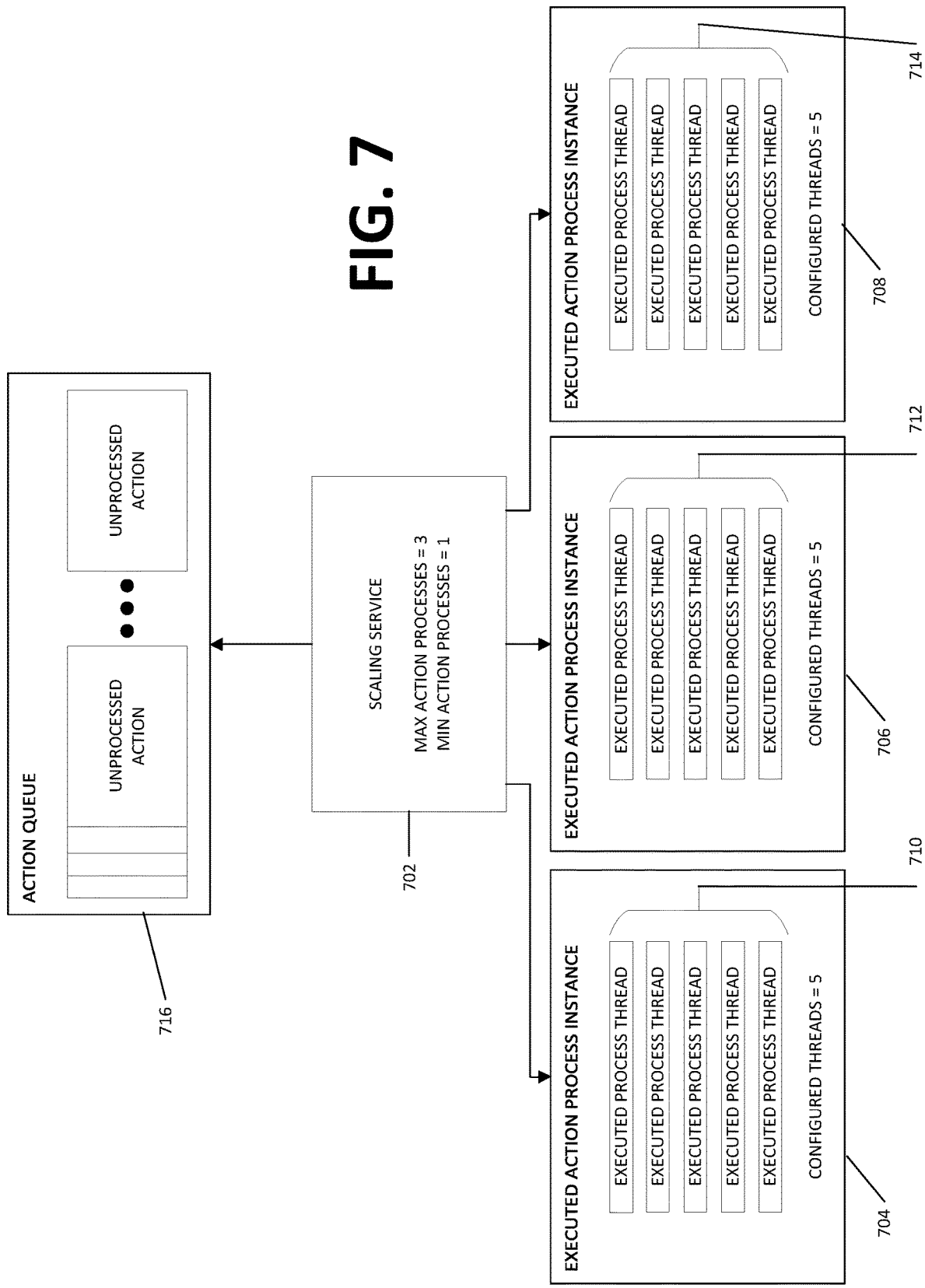
FIG. 7 illustrates a block diagram depicting modules specifically configured in accordance with an example embodiment of the present disclosure.

Turning to FIG. 7, a system illustrated including a scaling service 702, an action queue 716, and an action process instance set, specifically including executed action process instances 704, 706, and 708. Each of the action process instances includes an executed process thread set, such as executed process thread sets 710, 712, and 714. Scaling service 702 is associated with an action process instance count maximum, or "MAX ACTION PROCESSES," which equals three (3) in the illustrated example. Scaling service 702 is also associated with an action process instance count minimum, or "MIN ACTION PROCESSES," which equals one (1) as illustrated. Additionally or alternatively, scaling service 702 may be associated with a process thread count maximum, such that each executed action process instance may comprise a number of process threads less than or equal to, or in some embodiments exclusively less than, the process thread count maximum. In some embodiments, each executed action process instance is initialized and/or otherwise executed with an initial number of threads based on the process thread count maximum. The initial number of threads for a newly executed action process instance may equal the process thread count maximum.

The action queue 716 may be associated with one or more unprocessed actions, and/or unprocessed action types or request type. For example, in a particular embodiment, the action queue 716 may be configured to maintain unprocessed requests associated with a single request type, such as unprocessed enrollment management request data objects. In another embodiment, action queue 716 may be configured to maintain unprocessed requests associated with multiple request types, for example unprocessed enrollment management request data objects, escalated errors transmission requests, and/or other actions that require processing.

Each of the executed action process instances 704, 706, and 708, may be configured to process one or more request types from the action queue 716. For example, executed action process instance 704 may be configured to process unprocessed enrollment management request data objects. Accordingly, scaling service 702 may be configured to maintain an executed action process instance set including at least the executed action process instances 704, 706, and 708.

Each executed action process instance may include an executed process thread set, such as the executed process thread set 710 associated with executed action process instance 704. An executed action process instance utilizes each executed process thread to process unprocessed actions from the action queue 716 at a particular rate. For example, for executed action process instance 704, each executed process thread in the executed process thread set 710 may be configured to process a certain number of unprocessed actions per minute. Accordingly, as the number of process threads executed on a particular executed action process instance increases, the total action processing rate associated with the executed action process instance increases. In some embodiments, an executed process instance is executed with a pre-defined number of process threads automatically configured to process the unprocessed actions associated with the action queue 716 (e.g., the executed process threads are automatically configured to process unprocessed enrollment management request data objects, or another type of unprocessed action type). It should be appreciated that unprocessed actions could be any of a myriad of computational tasks, network calls, data management actions, and/or the like.

The scaling service 702 may be embodied by a software, or combination of software and hardware, controlled by or otherwise associated with one or more of the enrollment module 312, fulfillment module 314, fraud module 316, and/or error module 318, that manages all executed process instances and allocates unprocessed actions from the action queue 716 for processing by one of the executed action process instances, such as executed action process instances 704, 706, or 708. In particular, scaling service 702 may be embodied by apparatus 300, or a combination of submodules therein, along with corresponding software and/or a combination of hardware and software.

In a particular embodiment, scaling service 702 may be configured to identify a queue length associated with the action queue 716, where the action queue length represents the number of unprocessed actions in the action queue 716 at a particular time. The scaling service 702 may be configured to execute a new action process instance, terminate an executed process instance, execute a new process thread on an executed action process instance, and/or terminate an executed process thread on an executed action process instance, based on the queue length. For example, scaling service 702 may receive, or be configured to otherwise identify, a queue length maximum threshold and/or a queue length minimum threshold. Scaling service 702 may, in some embodiments, determine a maximum queue relationship that represents a comparison between the queue length and the queue length maximum threshold. In some embodiments, when the maximum queue relationship satisfies the queue length maximum threshold, such as when the queue length exceeds the queue length maximum threshold, for example, the scaling service 702 updates the executed action process instance set. For example, if the maximum queue relationship satisfies the queue length maximum threshold, such as by exceeding it, the scaling service 702 may execute a new action process instance, if an action process instance count maximum is not reached. For example, in the FIG. 7 as illustrated, a new action process instance cannot be executed, as the max action processes allowed is already met.

In some embodiments, computing resources may be reallocated between specialized action process instances depending on a priority value assigned to each unprocessed action and any available, unused computing resources. In an example context, enrollment requests may be prioritized over cancellation requests, and if a large volume of enrollment requests is received while the system is at the action process instance count maximum or process thread count maximum, the scaling service 702 may reallocate one or more threads from a specialized executed action process instance configured to process cancellation requests to a second specialized executed action process instance configured to process enrollment requests. It should be appreciated that a process thread may be reallocated in any of a myriad of ways, for example by deleting a first process thread and reinitializing a new, second process thread.

Additionally or alternatively, for example, scaling service 702 may, in some embodiments, determine a minimum queue relationship that represents a comparison between the queue length and the queue length minimum threshold. In some embodiments, when the minimum queue relationship satisfies the queue length minimum threshold, such as when the queue length is less than the queue length minimum threshold, for example, the scaling service 702 updates the executed action process instance set. For example, if the minimum queue relationship satisfies the queue length minimum threshold, such as when the queue length is less than the queue length minimum threshold, the scaling service 702 terminates a selected action process instance, if an action process instance count minimum is not reached. For example, in the particular embodiment depicted by FIG. 7 as illustrated, action process 708 may be selected and terminated, such that it ceases processing and is removed from the executed action process instance set.

Additionally or alternatively, for example, the scaling service 702 may, in some embodiments, manage the executed process thread set(s) for one or more executed action process instance(s) based on the queue length. For example, in some embodiments, alternatively to scaling executed action process instances, the scaling service 702 may increase or decrease the number of executed process threads in the executed process thread set for one or more executed action process instances. For example, each executed action process instance may be associated with a maximum executed process thread count (e.g., 5 as illustrated) and/or a minimum executed process thread count (e.g., 1 executed process thread).

In some such embodiments, if the minimum queue relationship results data indicates the minimum process queue relationship is satisfied, such as when the queue length is less than the queue length minimum threshold, the scaling service 702 terminates a selected executed process thread from a selected action process instance, if a minimum executed process thread count is not met (in an example context, if more than one thread is executed). If the minimum executed process thread count is met for the selected action process instance, the scaling service 702 may select another executed action process instance, and determine if an executed process thread may be terminated for the newly selected executed action process instance. In a circumstance where each executed action process instances are associated with an executed process thread count that matches each respective minimum executed process thread count, the scaling service 702 may then attempt to terminate an executed action process instance, as described above depending on the minimum process instance relationship. Alternatively, in some embodiments, a first selected action process instance may have its executed process thread set decreased, and the first selected action process instance may then be terminated before the scaling service 702 terminates any executed process threads from another executed action process instance.

Similarly, in some embodiments, if the maximum queue relationship results data indicates the maximum queue relationship is satisfied, the scaling service 702 may attempt to execute a new process thread on one of the executed action process instances before attempting to execute a new action process instance. For example, the scaling service 702 may select an executed action process instance and determine whether the executed process thread count for the selected executed action process instance satisfies (for example, by being lower than) maximum executed process thread count. In a circumstance where the executed process thread count for the selected action process instance satisfies the maximum executed process thread count for the selected action process instance, the scaling service 702 may execute a new process thread via the selected action process instance. In a circumstance where the executed process thread count for the selected action process instance does not satisfy the maximum executed process thread count for the selected action process instance (for example, by the executed process thread count exceeding or equal to the maximum executed process thread count for the selected action process instance), the scaling service 702 may select another executed action process instance to attempt to execute a new process thread. In a circumstance where each executed action process instance is associated with an executed process thread count that matches each respective maximum executed process thread count, the scaling service 702 may then attempt to initiate and/or otherwise execute a new action process instance, as described above depending on the maximum process instance relationship. In some embodiments, process threads are executed and/or terminated for one selected action process instance at a time (e.g., a selected action process instance is scaled up in threads until it is at maximum and/or subsequently executing a new action process instance that becomes the newly selected action process instance for scaling, or down in threads until it is at minimum and/or subsequently terminated before selecting a new executed action instance process for scaling down, if any).

It should be appreciated that the executed instance number, action process instance count maximum threshold, process thread counts, and process thread count maximum thresholds illustrated in FIG. 7 are merely examples. Embodiments of the present disclosure may include a different executed instance number, action process instance count maximum threshold, process thread counts, and/or process thread count maximum thresholds.

In some embodiments, scaling service 702 is implemented as software, or a combination of hardware and software, associated with one or more computing devices, components, or subsystems. In some embodiments, scaling service 702 is embodied by hardware means configured to execute one or more software modules for performing the operations described below with respect to FIGS. 8A and 8B.

It should be appreciated that the apparatus 300, and/or one or more other systems, may implement one or more scaling services for scaling a myriad of executed action process instances associated with processing a variety of different unprocessed actions. For example, in some embodiments, the apparatus 300 may include a scaling service that manages a first action queue of unprocessed enrollment actions, and scales executed action process instances configured for processing the unprocessed enrollment actions from the first action queue. The apparatus 300 may additionally include the scaling service that manages a second action queue of unprocessed fulfillment actions, and scales executed action process instances configured for processing the unprocessed fulfillment actions from the second action queue. The apparatus 300 may additionally include the scaling service that manages a third action queue of unprocessed fraud actions, and scales executed action process instances configured for processing the unprocessed fraud actions. Alternatively, in some embodiments, the apparatus 300 may implement three scaling services, for example executed via one or more microservices as described above, each configured for managing one of the aforementioned action queues and corresponding executed action process instance set.

In other embodiments, the apparatus 300 may further split action queues for enhanced processing. For example, the apparatus 300 may include a first scaling service that manages a first action queue of unprocessed enrollment actions associated with a first third-party device management system (e.g., a mobile device carrier system associated with a first carrier), and a second scaling service that manages a second action queue of unprocessed enrollment actions associated with a second third-party device management system (e.g., a mobile device carrier system associated with a second carrier). Similarly, the apparatus 300 may include a first scaling service that manages a first action queue of unprocessed fulfillment actions associated with claim data objects for the first third-party device management system (or alternatively, a different third-party device management system), and a second action queue of unprocessed fulfillment actions associated with claim data objects for the second third-party device management system (or alternatively, a different third-party device management system). In this regard, the apparatus 300 may scale executed process instances to perform process actions on a per-third-party device management system basis (or alternatively, a per-third-party entity basis) for each type of unprocessed action.

Figure 8A:
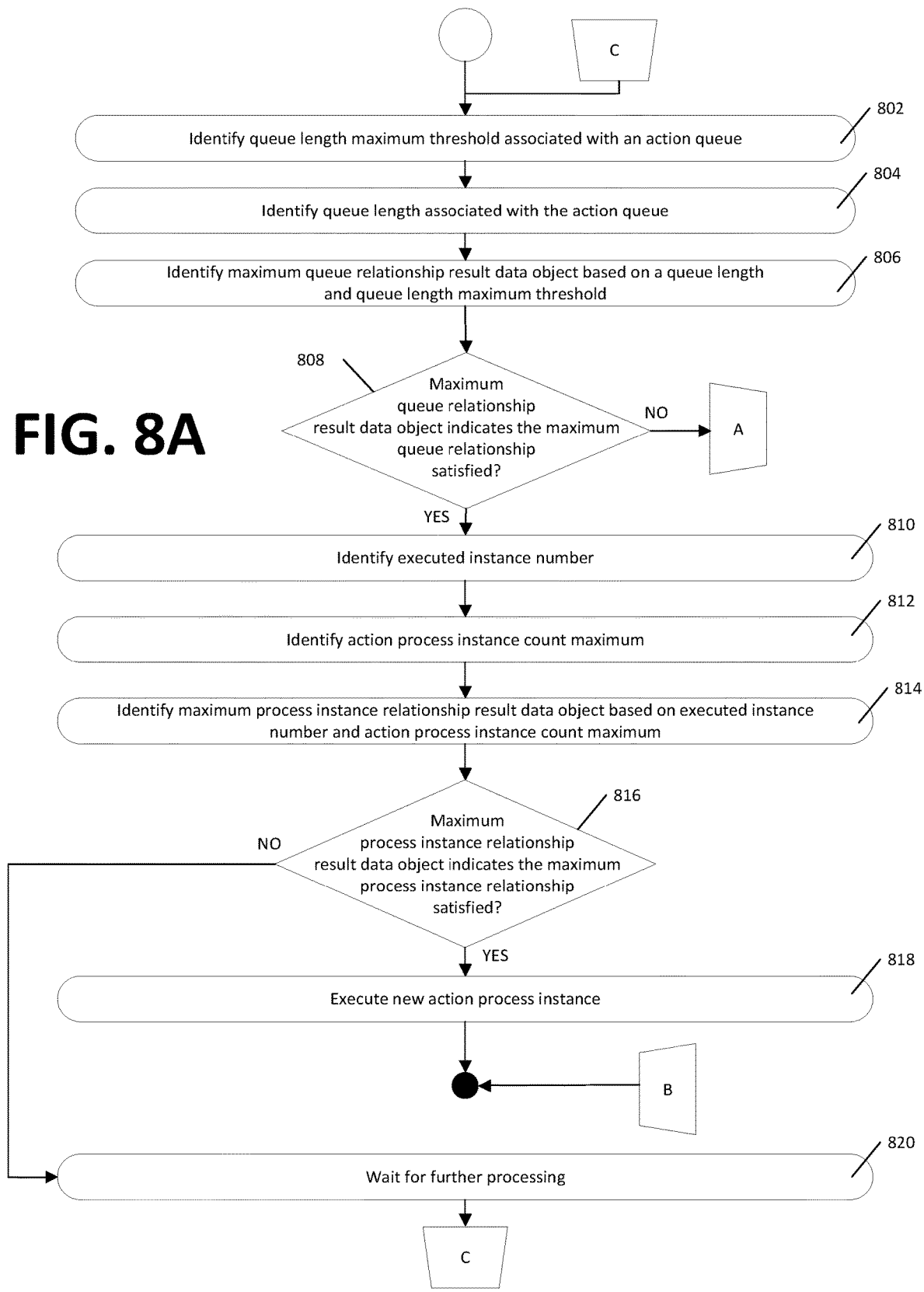

FIGS. 8A and 8B illustrate operations for managing executed action process instances configured to process unprocessed actions stored in an associated action queue, in accordance with an embodiment of the present disclosure. For example, the operations depicted in FIGS. 8A and 8B may be performed by an embodiment of the present disclosure that includes hardware and/or software for executing the scaling service 702. As a particular example, the operations illustrated in FIGS. 8A and 8B may be performed by apparatus 300, utilizing various hardware means for executing and/or otherwise maintaining a scaling service, such as scaling service 702. It should be appreciated that the blocks illustrated with respect to FIGS. 8A and 8B may be performed as depicted, or in other embodiments may be performed in another order, with additional blocks, with alternative blocks, and/or with less blocks than depicted.

At block 802, the apparatus 300 includes means, such as enrollment module 312, fulfillment module 314, fraud module 316, processor 302, and/or the like, to identify a queue length maximum threshold associated with an action queue. The action queue may be configured to store one or more unprocessed actions, for example unprocessed enrollment management request data objects, unprocessed claims, and/or unprocessed error escalation requests. The apparatus 300 may be configured to maintain, or otherwise control, one or more action queues associated with unprocessed actions. In some embodiments, the queue length maximum threshold is pre-determined, such as by the apparatus 300. In some embodiments, the apparatus 300 is configured to determine the queue length maximum threshold based on various factors. For example, the apparatus 300 may determine the queue length maximum threshold based on server load, queue length associated with the action queue, time, date, or the like, or any combination thereof.

At block 804, the apparatus 300 includes means, such as enrollment module 312, fulfillment module 314, fraud module 316, processor 302, and/or the like, to identify a queue length associated with the action queue. In some embodiments, the apparatus 300 is configured to total the number of unprocessed actions in an action queue to determine the queue length. In other embodiments, the apparatus 300 maintains the queue length as actions are processed from the action queue, such as by one or more executed action process instances, and new unprocessed actions are inserted into the queue.

At block 806, the apparatus 300 includes means, such as enrollment module 312, fulfillment module 314, fraud module 316, processor 302, and/or the like, to identify a maximum queue relationship result data object based on the queue length and the queue length maximum threshold. The maximum queue relationship result data may indicate whether a particular maximum queue relationship is satisfied. The maximum queue relationship may represent a comparison between the queue length and the queue length maximum threshold. Accordingly, in some embodiments, the maximum queue relationship may be satisfied when that the queue length is less than the queue length maximum threshold, the queue length is equal to the queue length maximum threshold or exceeds the queue length maximum threshold.

At block 808, the apparatus 300 includes means, such as enrollment module 312, fulfillment module 314, fraud module 316, processor 302, and/or the like, to determine if the maximum queue relationship result data object indicates the maximum queue relationship is satisfied. In a particular example, the maximum queue relationship result data object indicates the maximum queue relationship is satisfied when the maximum queue when the queue length exceeds the queue length maximum threshold. In another example embodiment, the maximum queue relationship result data object indicates the maximum queue relationship is satisfied when the queue length is equal to the queue length maximum threshold, or the queue length exceeds the queue length maximum threshold. If the maximum queue relationship is satisfied, embodiments of the present disclosure may attempt to increase the total processing associated with the executed processing instances, such as by increasing the number of executed action process instances as described below.

If the maximum queue relationship result data object indicates the maximum queue relationship is satisfied, flow continues to block 810. At block 810, the apparatus 300 includes means, such as enrollment module 312, fulfillment module 314, fraud module 316, processor 302, and/or the like, to identify an executed instance number. In some embodiments, the apparatus 300 is configured to maintain an executed instance number as new action process instances are executed, and executed process instances are terminated.

In some embodiments, the apparatus 300 is configured to maintain an executed process instance list that includes all executed process instances and identifies the executed instance number based on the executed process instance list.

At block 812, the apparatus 300 includes means, such as enrollment module 312, fulfillment module 314, fraud module 316, processor 302, and/or the like, to identify an action process instance count maximum. In some embodiments, the action process instance count maximum is pre-determined, such as by the apparatus 300. In some embodiments, the apparatus 300 is configured to determine the action process instance count maximum. The apparatus 300 may, in some embodiments, determine the action process instance count maximum based on various factors, such as server load, queue length associated with the action queue, time, date, available processing resources, or the like, or any combination thereof.

In some embodiments, the apparatus 300 includes means to identify a total processing rate associated with the executed action process instances. The total processing rate represent a number of transactions via an application programming interface (API) associated with a third-party system. The apparatus 300 may determine an action process instance count maximum based on the total processing rate, such that the total processing rate does not exceed a determined, or pre-defined, allowed threshold. For example, the total processing rate may not exceed an allowed threshold of API transactions per unit of time.

The apparatus 300 may be configured to maintain, or otherwise control, one or more action queues associated with unprocessed actions. In some embodiments, the queue length maximum threshold is pre-determined, such as by the apparatus 300. In some embodiments, the apparatus 300 is configured to determine the action process instance count maximum based on various factors. For example, the apparatus 300 may determine the action process instance count maximum based on server load, a current total processing rate associated with the executed processing instances and/or an associated allowed threshold, queue length associated with the action queue, time, date, or the like, or any combination thereof.

At block 814, the apparatus 300 includes means, such as enrollment module 312, fulfillment module 314, fraud module 316, processor 302, and/or the like, to identify a maximum process instance relationship result data object based on the executed instance number and the action process instance count maximum.

The maximum process instance relationship result data object may be identified based on a comparison between the executed instance number and the action process instance count maximum. Accordingly, in some embodiments, the maximum process instance relationship result data object may indicate whether the maximum process instance relationship is satisfied. The maximum process instance relationship may represent a comparison between the executed instance number and the action process instance count maximum. For example, in some embodiments, the maximum process instance relationship is satisfied when the executed instance number is less than the action process instance count maximum, or the executed instance number is equal to the action process instance count maximum.

At block 816, the apparatus 300 includes means, such as enrollment module 312, fulfillment module 314, fraud module 316, processor 302, and/or the like, to determine if the maximum process instance relationship result data object indicates the maximum process instance relationship is satisfied. In a particular example embodiment, the maximum process instance relationship is satisfied when the executed instance number is less than the action process instance count maximum. In some embodiments, if the maximum process instance relationship result data object indicates the maximum process instance relationship is satisfied, a new action process instance may be executed.

At block 818, the apparatus 300 includes means, such as enrollment module 312, fulfillment module 314, fraud module 316, processor 302, and/or the like, to execute a new action process instance. In some embodiments, a new action process instance is executed by allocating processing resources to the new action process instance, such that the allocated processing resources are utilized to process one or more unprocessed actions in the action queue. In a parpicular example, the apparatus 300 is configured to create the new action process instance with one or more pre-configured process threads. The process threads may be configured to execute one or more protocols for processing unprocessed actions stored in the action queue.

If, at decision 816, the maximum process instance relationship result data object indicates the maximum process instance relationship is not satisfied, flow continues to block 820. In some embodiments, for example, the maximum process instance relationship is not satisfied when the maximum process instance relationship indicates that the executed instance number is equal to the process instance count maximum.

At block 820, the apparatus 300 includes means, such as enrollment module 312, fulfillment module 314, fraud module 316, processor 302, and/or the like, to wait for further processing. In some embodiments, the apparatus 300 is configured to wait for a pre-determined length of time. In other embodiments, the apparatus 300 is configured to wait until the next processing cycle or clock cycle.

Returning to decision 808, if the apparatus determines the maximum queue relationship result data object indicates the maximum queue relationship is not satisfied, flow continues to block 822 in FIG. 8B. In an example embodiment, the maximum queue relationship does not satisfy the queue length maximum threshold when the maximum queue relationship indicates the queue length is equal to the queue length maximum threshold or exceeds the queue length maximum threshold.

At block 822, the apparatus 300 includes means, such as enrollment module 312, fulfillment module 314, fraud module 316, processor 302, and/or the like, to identify a queue length minimum threshold associated with the action queue. In some embodiments, the queue length minimum threshold is pre-determined, such as by the apparatus 300. In some embodiments, the apparatus 300 is configured to determine the queue length minimum threshold based on various factors. For example, the apparatus 300 may determine the queue length minimum threshold based on server load, queue length associated with the action queue, time, date, or the like, or any combination thereof.

At block 824, the apparatus 300 includes means, such as enrollment module 312, fulfillment module 314, fraud module 316, processor 302, and/or the like, to identify a minimum queue relationship result data object based on the queue length and the queue length minimum threshold. The minimum queue relationship result data object may be identified based on a comparison between the queue length and the queue length minimum threshold. The minimum queue relationship result data object may indicate whether the minimum queue relationship is satisfied. The minimum queue relationship may represent a comparison between the queue length and the queue length minimum threshold Accordingly, in some embodiments, the minimum queue relationship may be satisfied when the queue length is less than (or less than or equal to) the queue length minimum threshold, the queue length is equal to the queue length minimum threshold, or exceeds/is greater than (or greater than or equal to) the queue length minimum threshold.

At block 826, the apparatus 300 includes means, such as enrollment module 312, fulfillment module 314, fraud module 316, processor 302, and/or the like, to determine if the minimum queue relationship result data object indicates the minimum queue relationship is satisfied. In a particular example, the minimum queue relationship result data object indicates the minimum queue relationship is satisfied where the queue length is less than the queue length minimum threshold. In another example embodiment, the minimum queue relationship result data object indicates the minimum queue relationship is satisfied when the queue length is less than the queue length minimum threshold, or when the minimum queue relationship indicates the queue length equals the queue length minimum threshold. If the minimum queue relationship result data object indicates the minimum queue relationship is satisfied, some embodiments of the present disclosure may attempt to conserve processing resources and decrease the total processing associated with the executed processing instances, such as by decreasing the number of executed action process instances as described below. If the minimum queue relationship result data object indicates the minimum queue relationship is not satisfied, the flow may continue to block 838 to wait for further processing.

If the minimum queue relationship result data object indicates the minimum queue relationship is satisfied, at decision 826, flow continues to block 828. At block 828, the apparatus 300 includes means, such as enrollment module 312, fulfillment module 314, fraud module 316, processor 302, and/or the like, to identify an executed instance number. As described above with respect to block 810, in some embodiments, the apparatus 300 is configured to maintain an executed instance number as new action process instances are executed, and executed process instances are terminated. In some embodiments, the apparatus 300 is configured to maintain an executed process instance list that includes all executed process instances and identifies the executed instance number based on the executed process instance list.

At block 830, the apparatus 300 includes means, such as enrollment module 312, fulfillment module 314, fraud module 316, processor 302, and/or the like, to identify an action process instance count minimum. In some embodiments, the action process instance count minimum is pre-determined, such as by the apparatus 300. In some embodiments, the apparatus 300 is configured to determine the action process instance count minimum. The apparatus 300 may, in some embodiments, determine the action process instance count minimum based on various factors, such as server load, queue length associated with the action queue, time, date, available processing resources, or the like, or any combination thereof.

In some embodiments, the apparatus 300 includes means to identify a total processing rate associated with the executed action process instances, as described above with respect to block 812. The total processing rate represents a number of transactions performed via an API associated with a third-party system per unit of time. The apparatus 300 may determine an action process instance count minimum based on the total processing rate, such that the total processing rate does not fall below a determined, or pre-defined, lower threshold.

The apparatus 300 may be configured to maintain, or otherwise control, one or more action queues associated with unprocessed actions. In some embodiments, the action process instance count minimum is pre-determined, such as by the apparatus 300. In some embodiments, the action process instance count minimum is configured to determine the action process instance count minimum based on various factors. For example, the apparatus 300 may determine the action process instance count minimum based on server load, a current total processing rate associated with the executed processing instances and/or an associated lower threshold, the queue length associated with the action queue, time, date, or the like, or any combination thereof.

At block 832, the apparatus 300 includes means, such as enrollment module 312, fulfillment module 314, fraud module 316, processor 302, and/or the like, to identify a minimum process instance relationship result data object based on the executed instance number and the action process instance count minimum. The minimum process instance relationship data object may indicate whether a minimum process instance relationship is satisfied. The minimum process instance relationship may represent a comparison between the executed instance number and the action process instance count minimum. Accordingly, in some embodiments, the minimum process instance relationship may be satisfied when the executed instance number is greater than the action process instance count minimum, or the action process instance count minimum is equal to the action process instance count minimum.

At decision 834, the apparatus 300 includes means, such as enrollment module 312, fulfillment module 314, fraud module 316, processor 302, and/or the like, to determine if the minimum process instance relationship result data object indicates the minimum process instance relationship is satisfied. In a particular example embodiment, the minimum process instance relationship result data object indicates the minimum process instance relationship is satisfied when the executed instance number is greater than the action process instance count minimum. In some embodiments, if the apparatus determines the minimum process instance relationship result data object indicates the minimum process instance relationship is satisfied, a currently executed action process instance is terminated, deleted, or otherwise caused to cease processing.

At block 836, the apparatus 300 includes means, such as enrollment module 312, fulfillment module 314, fraud module 316, processor 302, and/or the like, to terminate a selected executed action process instance. In some embodiments, the apparatus 300 selects an executed action process instance for de-initialization based on various factors. For example, the executed action process instance may be terminated or de-initialized based on seniority (e.g., newest or oldest instance terminated first), processing resource amount (e.g., most resources terminated first, least resources terminated first, or based on a calculation), or the like.

If, at decision 834, the minimum process instance relationship result data object indicates the minimum process instance relationship is not satisfied, flow continues to block 838. In some embodiments, the minimum process instance relationship is not satisfied when the minimum process instance relationship indicates that the executed instance number is equal to the process instance count minimum.

At block 838, the apparatus 300 includes means, such as enrollment module 312, fulfillment module 314, fraud module 316, processor 302, and/or the like, to wait for further processing. Similar to block 820, the apparatus 300 may be configured to wait for a pre-determined length of time. In other embodiments, the apparatus 300 is configured to wait until the next processing cycle or clock cycle.

By performing the operations depicted in FIGS. 8A and 8B, embodiments of the present disclosure may increase efficiency associated with allocating computing resources by managing executed action process instances based on queue length. Additionally, embodiments of the present disclosure may allocate computing resources efficiently within defined, or determined, parameters (e.g., without increasing the executed action process instances such that total processing exceeds an allowed maximum threshold of API transactions).

CONCLUSION

In some embodiments, some of the operations above with respect to the above flowcharts and data flow diagrams may be modified or further amplified. Furthermore, in some embodiments, additional optional operations may be included. Modifications, amplifications, or additions to the operations above may be performed in any order and in any combination. For example, in some embodiments, several or all steps in the illustrated figures are performed in an arrangement different than the arrangement described above.

Many modifications and other embodiments of the disclosure set forth herein will come to mind to one skilled in the art to which these inventions pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only, and not for purposes of limitation.

What is claimed is:

1. A computer-implemented method to detect a network communication synchronization error, the computer-implemented method comprising:
   receiving, from a first third-party system comprising an external device manufacturer system or an external mobile carrier system, an enrollment management request data object comprising a subscriber data object indicative of a device protection program and comprising a subscriber identifier data object of a subscriber;
   transmitting a third-party enrollment status request data object to a third-party device management system, the third-party enrollment status request data object requesting a status identifier representing confirmation of existence of data corresponding to the subscriber identifier data object of the subscriber extracted from the enrollment management request data object;
   receiving a third-party enrollment status response data object from the third-party device management system in response to transmission of the third-party enrollment status request data object, the third-party enrollment status response data object comprising a third-party enrollment status data object representing the status identifier of the subscriber;

comparing the third-party enrollment status response data object representing a third-party enrollment status of the subscriber with a second enrollment status data object representing an enrollment status of the subscriber in a device protection program management system (DPPMS);

detecting a network communication synchronization error based on a difference between the third-party enrollment status data object representing the third-party enrollment status of the subscriber and the second enrollment status data object representing the enrollment status in the device protection program management system; and initiating a system synchronization event that updates a profile of the subscriber in the DPPMS or a second profile of the subscriber in the third-party device management system based at least in part on the network communication synchronization error.

2. The computer-implemented method of claim 1, wherein the enrollment management request data object comprises an enrollment subscription request or an enrollment cancellation request data object, wherein the apparatus is configured to trust the third-party device management system over the DPPMS, and wherein initiating a system synchronization event comprises:

identifying a DPPMS subscriber profile data object based on the subscriber identifier data object; and updating the DPPMS subscriber profile data object based on the third-party enrollment status response data object.

3. The computer-implemented method of claim 1, wherein comparing the third-party enrollment status data object with the second enrollment status data object is performed in real-time.

4. The computer-implemented method of claim 1, wherein the enrollment management request data object comprises an enrollment subscription request, and wherein the identified third-party enrollment status data object is indicative that the third-party device management system does not include a third-party subscriber profile data object associated with the subscriber identifier data object, and wherein initiating the system synchronization event comprises:

transmitting, to the third-party device management system, a third-party subscriber enrollment request data object configured to cause the third-party device management system to create the third-party subscriber profile data object associated with the subscriber identifier data object.

5. The computer-implemented method of claim 1, wherein the enrollment management request data object comprises an enrollment cancellation request data object, and wherein the identified third-party enrollment status data object is indicative that the third-party device management system includes a third-party subscriber profile data object associated with the subscriber identifier data object, and wherein initiating the system synchronization event comprises:

transmitting, to the third-party device management system, a third-party subscriber cancellation request data object configured to cause the third-party device management system to cancel the third-party subscriber profile data object associated with the subscriber identifier data object.

6. A computer program product comprising at least one non-transitory computer-readable medium having computer-readable program instructions stored therein, the computer-readable program instructions comprising instructions, which when performed by an apparatus, are configured to cause the apparatus to:

receive, from a first third-party system comprising an external device manufacturer system or an external mobile carrier system, an enrollment management request data object comprising a subscriber data object indicative of a device protection program and comprising a subscriber identifier data object of a subscriber;

transmit a third-party enrollment status request data object to a third-party device management system, the third-party enrollment status request data object requesting a status identifier representing confirmation of existence of data corresponding to the subscriber identifier data object of the subscriber extracted from the enrollment management request data object;

receive a third-party enrollment status response data object of the subscriber from the third-party device management system in response to transmission of the third-party enrollment status request data object, the third-party enrollment status response data object comprising a third-party enrollment status data object representing the status identifier of the subscriber;

compare the third-party enrollment status response data object representing a third-party enrollment status of the subscriber with a second enrollment status data object representing an enrollment status of the subscriber in a device protection program management system (DPPMS);

detect a network communication synchronization error based on a difference between the third-party enrollment status data object representing the third-party enrollment status of the subscriber and the second enrollment status data object representing the enrollment status in the device protection program management system; and initiate a system synchronization event that updates a profile of the subscriber the DPPMS or a second profile of the subscriber the third-party device management system based at least in part on the network communication synchronization error.

7. The computer program product of claim 6, wherein comparing the third-party enrollment status data object with the second enrollment status data object is performed in real-time.

8. An apparatus comprising at least one processor and at least one memory including computer program code, the at least one memory and the computer program code configured to, with the at least one processor, cause the apparatus to:

receive, from a first third-party system comprising an external device manufacturer system or an external mobile carrier system, an enrollment management request data object comprising a subscriber data object indicative of a device protection program and comprising a subscriber identifier data object of a subscriber;

transmit a third-party enrollment status request data object to a third-party device management system, the third-party enrollment status request data object requesting a status identifier representing confirmation of existence of data corresponding to the subscriber identifier data object of the subscriber extracted from the enrollment management request data object;

receive a third-party enrollment status response data object of the subscriber from the third-party device management system in response to transmission of the third-party enrollment status request data object, the third-party enrollment status response data object comprising third-party enrollment status data object representing the status identifier of the subscriber;
compare the third-party enrollment status response data object representing a third-party enrollment status of the subscriber with a second enrollment status data object representing an enrollment status of the subscriber in a device protection program management system (DPPMS);
detect a network communication synchronization error based on a difference between the third-party enrollment status data object representing the third-party enrollment status of the subscriber and the second enrollment status data object representing the enrollment status in the device protection program management system; and
initiate a system synchronization event that updates a profile of the subscriber in the DPPMS or a second profile of the subscriber in the third-party device management system based at least in part on the network communication synchronization error.

9. The apparatus of claim 8, wherein the enrollment management request data object comprises an enrollment subscription request or an enrollment cancellation request data object, wherein the apparatus is configured to trust the third-party device management system over the DPPMS, and wherein initiating the system synchronization event comprises:
identifying a DPPMS subscriber profile data object based on the subscriber identifier data object; and
updating the DPPMS subscriber profile data object based on the third-party enrollment status response data object.

10. The apparatus of claim 8, wherein comparing the third-party enrollment status data object with the second enrollment status data object is configured to be performed in real-time.

11. The apparatus of claim 8, wherein the enrollment management request data object comprises an enrollment subscription request, and wherein the identified third-party enrollment status data object is indicative that the third-party device management system does not include a third-party subscriber profile data object associated with the subscriber identifier data object, and wherein initiating the system synchronization event comprises:
transmitting, to the third-party device management system, a third-party subscriber enrollment request data object configured to cause the third-party device management system to create the third-party subscriber profile data object associated with the subscriber identifier data object.

12. The apparatus of claim 8, wherein the enrollment management request data object comprises an enrollment cancellation request data object, and wherein the identified third-party enrollment status data object is indicative that the third-party device management system includes a third-party subscriber profile data object associated with the subscriber identifier data object, and wherein initiating the system synchronization event comprises:
transmitting, to the third-party device management system, a third-party subscriber cancellation request data object configured to cause the third-party device management system to cancel the third-party subscriber profile data object associated with the subscriber identifier data object.

13. The apparatus of claim 8, the apparatus further configured to:
attempt to transmit a third-party enrollment management request data object to the third-party device management system;
receive a transmission error in response to the attempt to transmit the third-party enrollment management request data object to the third-party device management system indicative of an error in communicating with the third-party device management system;
identify an error classification associated with the transmission error, wherein the error classification comprises a retriable error;
determine a request retry time;
transmit a second third-party enrollment status request data object to the third-party device management system after the request retry time has elapsed;
receive a second third-party enrollment status response data object from the third-party device management system;
analyze, in real time, the second third-party enrollment status response data object to identify a second third-party enrollment status associated with the subscriber identifier data object; and
initiate a second system synchronization event based on the second identified third-party enrollment status data object.

14. The apparatus of claim 8, wherein the third-party device management system comprises a second third-party device management system, and wherein the apparatus is configured to receive the enrollment management request data object from a first third-party device management system.

15. The apparatus of claim 8, the apparatus further configured to:
identify the third-party device management system based on the subscriber identifier data object.

16. The apparatus of claim 8, the apparatus further configured to:
receive a queue length associated with an action queue, the action queue comprising at least the third-party enrollment status request identify a queue length threshold;
identify a queue relationship based on the queue length and the queue length threshold;
determine the queue relationship satisfies the queue length threshold;
identify an executed action process instance set comprising at least one executed action process instance; and
update the executed action process instance set based on the queue length.

17. The apparatus of claim 8, the apparatus further caused to:
transmit a response to the enrollment management request data object based at least in part on the system synchronization event.

18. The apparatus of claim 8, wherein to receive the enrollment management request data object, the apparatus is caused to:
receive, from the first third-party system, a program subscription request comprising at least the enrollment management request data object;
trust the third-party enrollment status response data object in a circumstance where the third-party enrollment status response data object does not match the enrollment status in the DPPMS; and in response to trusting the third-party enrollment status response data object, initiate the program subscription request to update the DPPMS to match the third-party enrollment status response data object.

19. The apparatus of claim 8, wherein the third-party device management system comprises a third-party enrollment data repository that stores at least the third-party enrollment status data object and is maintained by a first entity associated with the third-party device management system, and wherein the DPPMS comprises a second data repository that stores at least the enrollment status in the DPPMS and is maintained by a second entity associated with the DPPMS.

20. The apparatus of claim 8, wherein the enrollment management request data object is associated with a request to initiate a particular action performed via the DPPMS, and wherein the apparatus is further caused to:

initiate the action via the DPPMS in response to initiation of the system synchronization event.

* * * * *